United States Patent [19]

Stratton et al.

[11] 4,318,176

[45] Mar. 2, 1982

[54] COMPUTERIZED PRESS CONTROLS

[75] Inventors: Larry J. Stratton, Catlin; Richard A. Norini, Danville; Peter G. Davis, Danville; Steve M. Dyskievicz, Danville; Frederic W. Cowap, Danville; Roger L. Haskin, Urbana; Mark B. Gagner, Mokena, all of Ill.; Thomas M. Mynett, Huntsville, Ala.

[73] Assignee: HurletronAltair, Inc., Danville, Ill.

[21] Appl. No.: 126,823

[22] Filed: Mar. 3, 1980

[51] Int. Cl.[3] ........................ G06F 15/46; B65H 23/18

[52] U.S. Cl. ........................................ 364/469; 101/248; 226/28; 364/900

[58] Field of Search ............... 364/469, 118, 560, 562, 364/559, 505, 506, 550, 551, 200 MS File, 900 MS File; 318/85, 603, 6, 7; 226/3, 27, 28; 101/248, 181, 183, 184, 226, DIG. 21; 340/675

[56] References Cited

U.S. PATENT DOCUMENTS

| | | | |
|---|---|---|---|
| 2,654,599 | 10/1953 | Frisbie et al. | 226/15 |
| 2,768,827 | 10/1956 | Noble | 226/28 |
| 2,840,370 | 6/1958 | Noble et al. | 226/28 |
| 2,840,721 | 6/1958 | Frommer | 250/571 |
| 2,840,722 | 6/1958 | Frommer | 250/571 |
| 3,090,534 | 5/1963 | Frommer et al. | 226/31 |
| 3,468,201 | 9/1969 | Adamson et al. | 83/74 |
| 3,525,858 | 8/1970 | Thiede et al. | 226/28 X |
| 3,594,552 | 7/1971 | Adamson et al. | 235/92 MP |
| 3,601,587 | 8/1971 | Thiede | 226/28 X |
| 3,624,359 | 11/1971 | Roote | 226/28 X |
| 3,870,936 | 3/1975 | Coberly | 318/85 |
| 3,914,582 | 10/1975 | Coberly et al. | 235/92 MP |
| 3,919,561 | 11/1975 | Coberly | 250/571 X |
| 3,949,282 | 4/1976 | Coberly | 318/85 |
| 4,135,664 | 1/1979 | Resh | 226/3 X |
| 4,264,957 | 4/1981 | Pautzke | 364/469 |

OTHER PUBLICATIONS

Lebenson–"Programmed Press Control"–Gavure Research Institute 28th Annual Meeting, Key Biscayne, FL, Nov. 2-5-1975–pp. 1-7.

Oppenheimer et al.–"Computer Press Monitoring and Control System"–Project No. P74-1, Report No. P-39, Nov. 7-8, 1974–pp. 1-36.

Camhi et al.–"Computer Press Control"–Project No. S71-1, Report No. S-11–Nov. 4, 1971.

Oppenheimer et al.–"The computer in Gravure-Press Control Integration"–Project No. P74-1, Report No. P-44–Nov. 10-13, 1976.

*Primary Examiner*—Joseph F. Ruggiero

*Attorney, Agent, or Firm*—Hill, Van Santen, Steadman, Chiara & Simpson

[57] ABSTRACT

A computerized press control includes a set of counters countable in real time as the associated press cylinder rotates to enable the press control system to readjust the inspection zone, wherein the mark to be sensed on the web can be expected to be found, on a per revolution basis of that cylinder and to dynamically alter the length of the inspection window on a per revolution basis to enable the press control system to control color registration in spite of wide variations in press speed or conditions of the web.

34 Claims, 36 Drawing Figures

TO FIG. 2D

RST CS
IO/M
ALE
WR
RD
PORT A
PORT B
PORT C
265 BYTES RAM
164
T0
T1
166
160
18
25
168
29
35
36
170
MC1408
Vee
+5
13
171a
5K
171b
10K
171c
171d
172
174
5Ω
.001μf
100pf
2K
470Ω
1μf
-12
182
183a
LS 04
183b
LS 07
184
LS74 PST
CLK
196
194
186
L574
CLR
188
LS 38
198
190
200
FROM FIG.5
120 HZ IN
171e
171f
171g
171h
171i
178
176
180
TO DC MOTOR DRIVE CIRCUIT
TO AC MOTOR DRIVE CIRCUIT
202
204
206
208
4.7K
220Ω
TO FIG. 2F
47μf
47K
214
Cx Rx CLR
9602
212
215
216
218
+V
TO FIG. 2F

FIG. 15
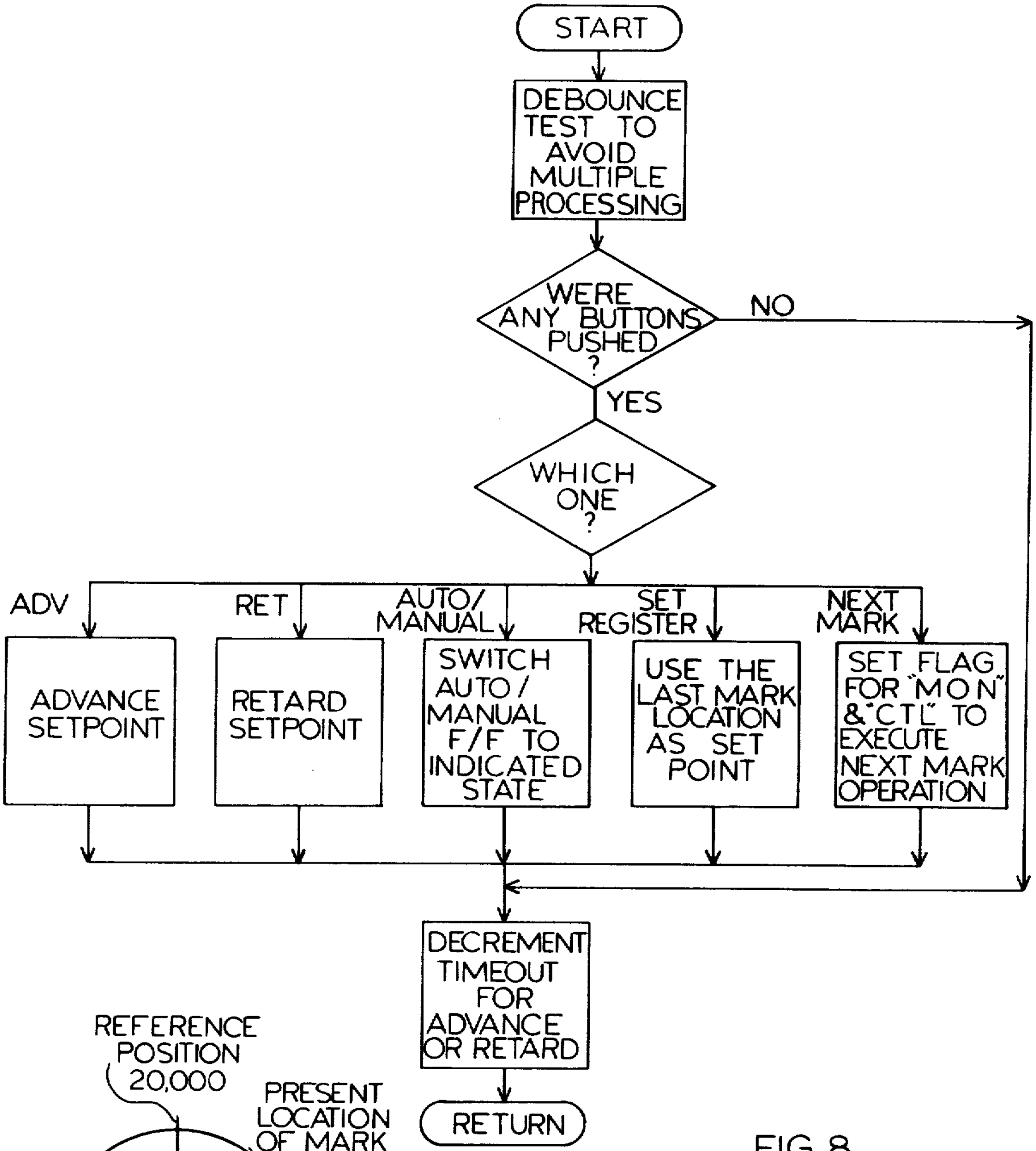
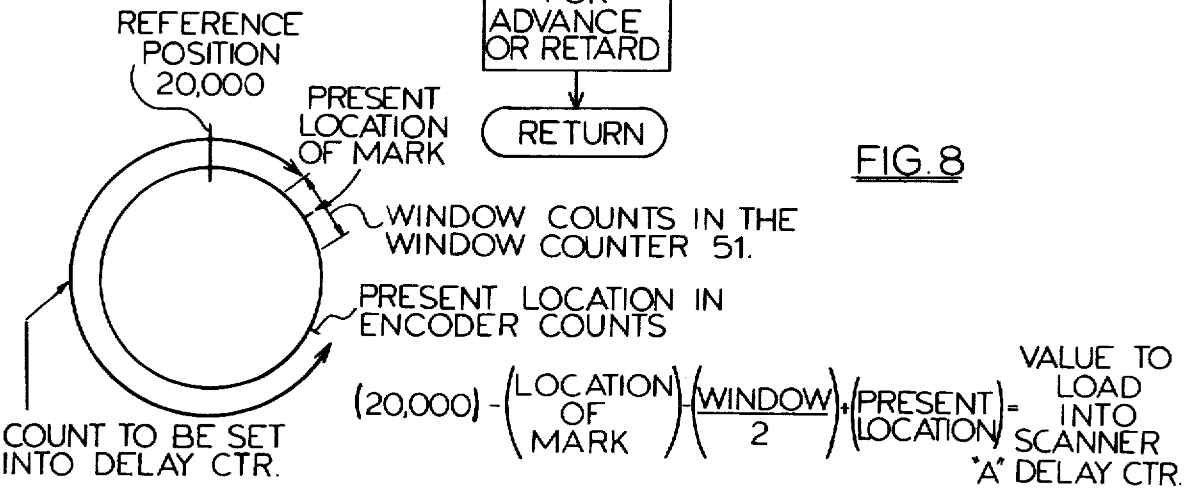
FIG. 8

FIG. 12
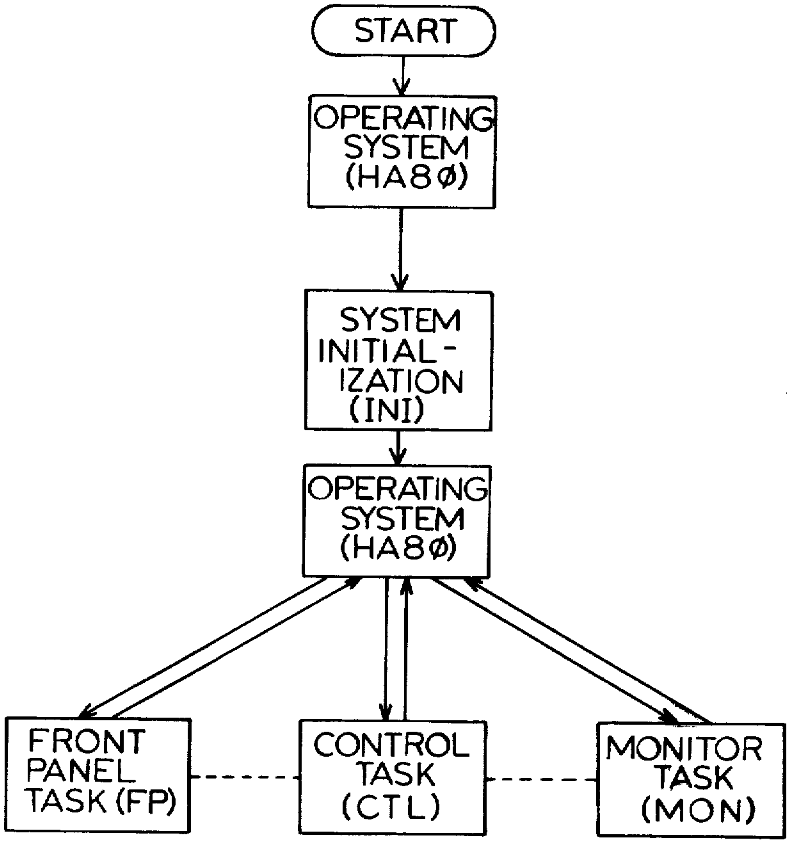
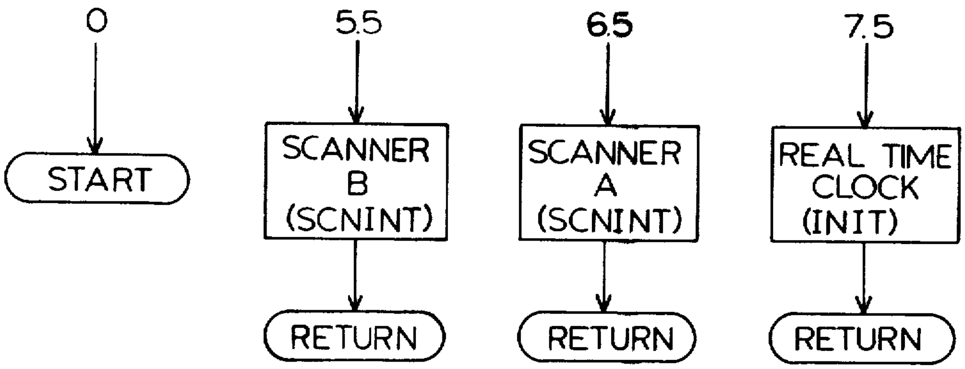
FIG. 13

Best Available Copy

COMPUTERIZED PRESS CONTROLS

BACKGROUND OF THE INVENTION

1. Field of the Invention

The invention pertains to an apparatus for the purpose of monitoring or controlling the register of a printing press or cut-off unit.

2. The Prior Art

Devices for controlling the register of printing presses are known from the prior art. A circumferential control system is disclosed in U.S. Pat. No. 3,949,282. A lateral register control system is disclosed in U.S. Pat. No. 4,135,664.

Additionally, the Gravure-Research Institute has conducted research into the problem of improved control of printing presses and has issued a series of reports disclosing the results of these research efforts. Report No. M-52, which was presented in November of 1975, deals with the problem of programmed printing press control. Report No. P-39, which was presented in November of 1974, deals with the problem of monitoring and controlling printing presses by means of a computer system.

Previous attempts at improved digital press controls have either been controls of fairly limited capability such as disclosed in the '664 and '282 patents or have been guite elaborate and expensive digital control systems. There has been a need for an improved control system, which is relatively inexpensive, but which provides improved control and which could be connected into a higher level supervisory apparatus.

SUMMARY OF THE INVENTION

The invention comprises an apparatus and a method for monitoring or controlling an associated printing press or cut-off unit where marks printed on the web are to be sensed and compared to a pre-stored set-point.

The inventive apparatus includes a digital processor with a parallel, bidirectional data bus and a parallel, unidirectional address bus. Read-only memory units, and read/write memory units can communicate with the processor by means of the address and data buses. A switch input port and a display panel output port are also connected to the address and the data buses. The switch input port provides a means whereby switch settings can be used to establish system control parameters. The display panel output port provides a means where the control system can turn on and off indicator lights to inform the operator of the status of the unit. A motor control port, also connected to the address bus and data bus, converts an error signal generated by the digital processor into appropriate motor control signals to drive a web or cylinder compensator so as to minimize the magnitude of the error. A communication port connected to the address bus and the data bus provides a facility whereby the digital processor can communicate with a higher level press monitoring apparatus. A real time data input port including a plurality of counters provides a means whereby encoder signals, generated as the cylinder of the associated press or cut-off unit rotates may be counted, on a real time basis. The counted encoder pulses enable the processor to determine where, with respect to a given revolution of the associated cylinder, a sensed mark on the web is located.

An operator can establish a set-point when the associated printing press or cut-off unit is running with an acceptable register. Once a set-point has been established, the processor determines, on a per revolution basis, of the associated printing press or cut-off cylinder where the next mark on the web is to be expected. Having determined where the mark is to be expected, which corresponds to the position, with respect to the cylinder, of the previous mark, a window is established. The window is centered with respect to the expected location of the mark. Signals from the sensor unit at the web, corresponding to the latest mark on the web that is being sensed, are enabled during the time interval of the window to interrupt the processor. After being interrupted, the processor determines the location of the sensed mark on the web based on the number of encoder counts in a counter. This value may be compared to the set-point value and the difference between the two used to establish an error indicator. The error indicator can be used to then drive a compensator motor for the purpose of minimizing that error. Alternately, the difference between the set-point and the sensed mark can be merely monitored and transmitted to a supervisory system through the communications port.

The inventive apparatus recalculates the position of the window for each revolution of the cylinder of the associated press or cut-off unit. The inventive control system can thus respond to movement of the sensed mark on the web due to transient conditions such as speed changes of the press or pasted-oversections of web due to the start of a new roll of web material. Additionally, the inventive control system reinitializes the width of the window on a per revolution basis and can dynamically adjust the width of the window on a per revolution basis of the associated cylinder. Further, the inventive control can on a per revolution basis transmit data to its associated supervisory control system concerning the performance of the press or cut-off unit which it is monitoring or controlling. The inventive control system can also receive data from its associated supervisory control system for the purpose of dynamically readjusting its control parameters.

If the inventive control system is operating as a mark-to-mark register control, the two marks being sensed on the web can be located on opposite sides of the cylinder of the associated printing press or cut-off unit.

The inventive control method includes the steps of; establishing the length of an inspection window, for each revolution of the cylinder; enabling the web sensor at a predetermined cylinder position for an amount of cylinder rotation corresponding to the length of the inspection window; determining the location of the mark sensed on the web during the time interval corresponding to the inspection window; storing the determined location of the mark; determining the selected cylinder position, at which the inspection window starts, to be used during the next revolution of the cylinder; and comparing the set-point to the determined position of the sensed mark on the web.

A plurality of the inventive control systems may be connected together by a means for linking so as to be able to communicate with a remote means for supervision. Each control system may be ordered by the remote means for supervision to either send selected data to the remote means for supervision or receive selected data from that remote means for supervision. In this manner, by means of the remote means for supervision, the operation of each member of the plurality of control systems can be monitored and new parameters can be supplied to any member of the plurality of control systems as desired.

BRIEF DESCRIPTION OF THE DRAWINGS

FIG. 8 is a schematic diagram illustrating the method of dynamically resetting the inspection zone for each revolution of the cylinder.

FIG. 12 is an over-all flow chart of the control sequence.

FIG. 13 is a flow chart of the interrupt handler control sequences.

FIG. 15 is a flow chart of the front panel task.

TABLE 1

| HEX ADDRESS | DEVICE |
|---|---|
| 0000–07FF | 2716A |
| 0800–0FFF | 2716B |
| 1000–17FF | 2716C |
| 1800–1FFF | 2716D |
| 2000–20FF | $8155_A$ (RAM) |
| 2100–21FF | $8155_B$ (RAM) |
| 2200–22FF | 5101 (CMOS RAM) |
| 2300 | 8255 Port A (HIB) |
| 2301 | 8255 Port B (HIB) |
| 2302 | 8255 Port C (HIB) |
| 2303 | 8255 CONTROL (HIB) |
| 2406 | DISPLAY STROBE |
| 2405 | DISPLAY STROBE |
| 2403 | DISPLAY STROBE |
| 3800 | HIB ACK - |
| 3900 | HIB DAV |
| 3A00 | AUTO/MAN |
| 3B00 | - START STEPPER |
| 3C00 | START DELAY-A |
| 3D00 | CLR INTERRUPT-A |
| 3E00 | START DELAY-B |
| 3F00 | CLR INTERRUPT-B |
| 4000 | $8253_B$ COUNTER-0 |
| 4001 | $8253_B$ COUNTER-1 |
| 4002 | $8253_B$ COUNTER-2 |
| 4003 | $8253_B$ MODE |
| 8000 | $8253_A$ COUNTER-0 |
| 8001 | $8253_A$ COUNTER-1 |
| 8002 | $8253_A$ COUNTER-2 |
| 8003 | $8253_A$ MODE |
| C003 | $8253_{A+B}$ LATCH |

TABLE 2

[DC MOTOR TABLE]

| Press Speed | GAIN | | | |
|---|---|---|---|---|
| RPM's | 1 | 2 | 3 | 4 |
| RPM 50 | 0 | 0 | 0 | 0 |
| 50 ≦ RPM < 100 | 14 | 23 | 45 | 90 |
| 100 ≦ RPM < 150 | 15 | 28 | 52 | 95 |
| 150 ≦ RPM < 200 | 17 | 33 | 60 | 100 |
| 200 ≦ RPM < 250 | 20 | 38 | 64 | 105 |
| 250 ≦ RPM < 300 | 23 | 43 | 68 | 110 |
| 300 ≦ RPM < 350 | 25 | 46 | 69 | 113 |
| 350 ≦ RPM < 400 | 28 | 50 | 71 | 117 |
| 400 ≦ RPM < 450 | 30 | 53 | 77 | 120 |
| 450 ≦ RPM < 500 | 33 | 57 | 83 | 123 |
| 500 ≦ RPM < 550 | 34 | 60 | 84 | 124 |
| 550 ≦ RPM < 600 | 36 | 63 | 86 | 126 |
| 600 ≦ RPM < 650 | 38 | 66 | 87 | 126 |
| 650 ≦ RPM < 700 | 40 | 70 | 88 | 127 |
| 700 ≦ RPM < 750 | 40 | 72 | 89 | 127 |
| 750 ≦ RPM | 40 | 75 | 90 | 127 |

DETAILED DESCRIPTION OF THE PREFERRED EMBODIMENTS

Not by way of limitation but by way of disclosing the best mode of practicing our invention and by way of enabling one of ordinary skill in the art to practice our invention there are disclosed in FIGS. 1 through 24 several different embodiments of our invention.

Figure 1:
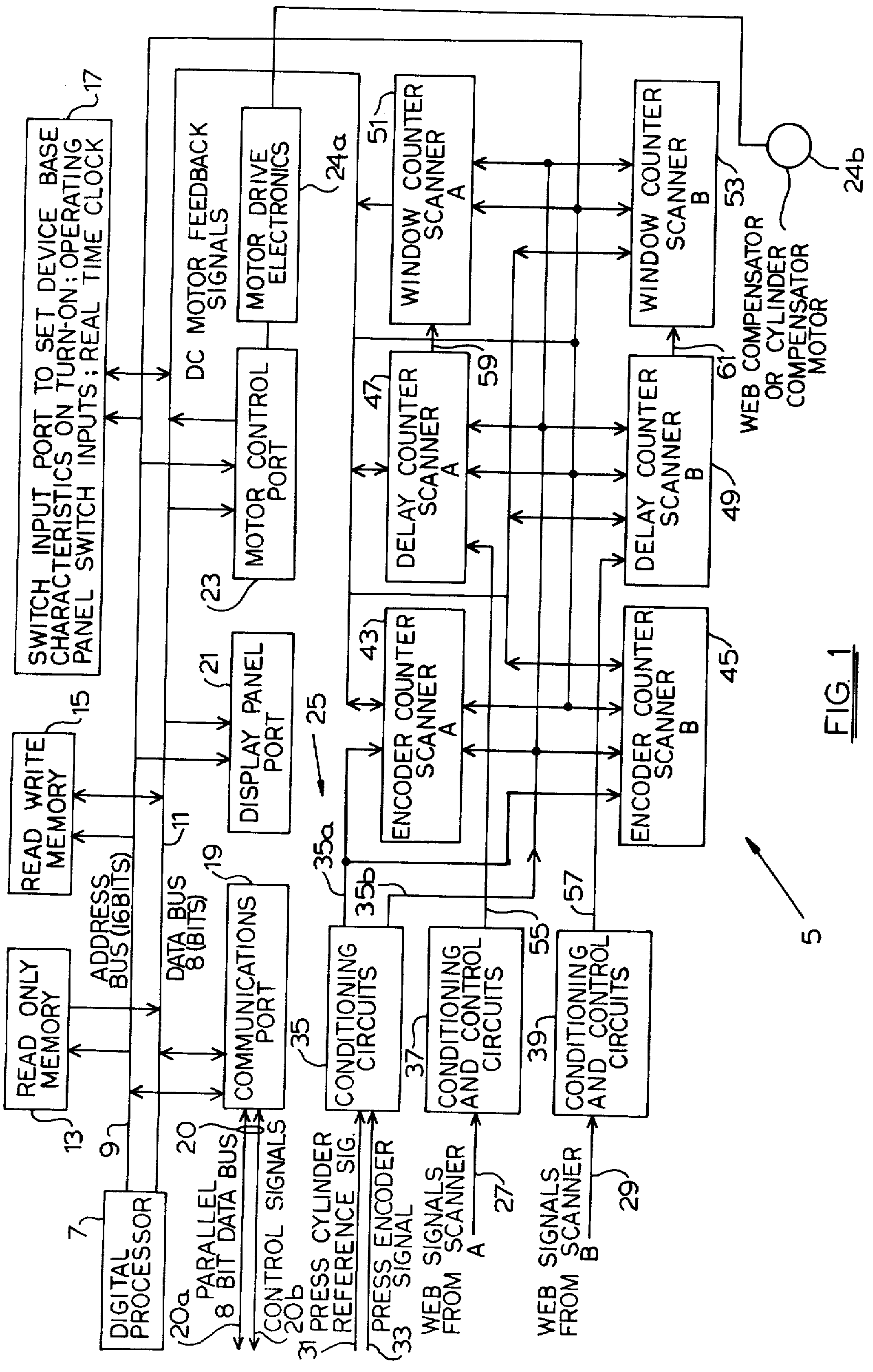
FIG. 1 is a control system block diagram.

FIG. 1 is a system block diagram of a printing press or cut-off control 5 organized around a digital processor 7. The processor 7 has a parallel, sixteen-bit, address bus 9, and a parallel, eight-bit, data bus 11. The address bus 9 and the data bus 11 interconnect a read-only memory 13, a read-write memory 15, a switch input and real-time clock port 17, a communications port 19 connected to an external, parallel data bus 20, a display panel port 21, a motor control port 23, connected via motor drive electronics 24*a* to a compensator motor 24*b*, and a real-time input port 25 which receives real time information from an associated printing press or cut-off apparatus.

The real-time input port 25 receives information signals on lines 27 and 29 from a web scanner A or from a pair of scanners A and B. The scanners are located adjacent the web at the press or cut-off apparatus. The real-time port 25 also receives a press cylinder reference signal on a line 31, and a pulse stream from a press encoder on a line 33. The signals on the lines 27 through 33 are conditioned by signal conditioning circuits 35, 37, 39.

A conditioned press cylinder reference signal on a line 31 provides gating signals to an encloder counter 43, associated with Scanner A and an encoder counter 45, associated with Scanner B. A press cylinder reference signal on the line 35*a* will force encoder counters 43, 45 to an initial preset count. Conditioned encoder pulses on a line 35*b* are utilized to count down the encoder counters 43, 45, a pair of delay counters 47, 49 for Scanner A and Scanner B, and window counters 51, 53 for Scanner A and Scanner B, respectively.

The conditioning circuit 37 associated with Scanner A provides gating signals on a line 55 which can be utilized to trigger down-counting of the delay counter 47 for Scanner A from a preset value. Similarly, the conditioning circuit 39 associated with Scanner B provides gating signals on a line 57 to initiate down-counting the delay counter 49 associated with Scanner B from a preset value.

The delay counter 47 associated with Scanner A provides gating signals on a line 59 to initiate down counting of the window counter 51 associated with Scanner A from a preset value. The delay counter 49 for Scanner B provides gating signals on a line 61 to initiate down-counting of the window counter 53 associated with Scanner B from a preset value.

The control system 5 of FIG. 1 may be utilized to control both circumferential and lateral mark-to-mark register of the image being placed on the web at an adjacent printing press. The control system 5 can be used to control circumferential mark-to-reference register of the associated web. Additionally, the control system 5 of FIG. 1 can be utilized to control the register at an adjacent cut-off station or to continuously monitor the quality of the graphic arts product being produced on an overall basis at a final quality control station. Finally, the communications port 19 of the control system 5 of FIG. 1 permits that system to be interrogated with respect to the press related parameters which are being measured during each repeat of the graphics art material which is being laid down by the adjacent press or cut-off input. This information may be supplied to a supervisory system which is connected to the communications port 19 via the external communications bus 20.

CONTROL SYSTEM ELECTRONICS

FIG. 2 is a detailed electronic schematic of the control system 5 shown in block diagram form in FIG. 1. FIG. 2 includes sheets FIG. 2A–2G which can be assembled as indicated to form a complete schematic. In FIG. 2 the processor 7, which in the exemplary system is an Intel 8085A type processor is shown connected to the data bus 11. The data bus 11 is a parallel eight-bit bidirectional data bus. In the case of the exemplary system of FIG. 2 the eight-bit parallel data bus 11 is shown connected to data bits D0 to D7 of the processor 7. The address bus 9 of FIG. 1 is shown in two parts 9*a*, 9*b* in FIG. 2. Section 9*a* is generated through an eight-bit parallel D-type latch 63 which is enabled by a timing control line 65 when the processor 7 puts Address Bits 0 through 7 out on the same eight pins as are used to provide signals for the data bus 11. The second section 9*b* of the address bus 9 which represents the higher order eight-bits of the address is brought out on a separate set of lines from the processor 7.

Connected to the data bus 11 and the address bus 9 of the processor 7 in FIG. 2 is the read-only memory 13. The read-only memory 13 comprises a series of programmed read-only memories [PROMS] each of which is 2048 words long by eight-bits wide. Each of the memories 67, 69 could be an Intel 2716 type read-only memory. Other types of plug compatable read-only memories can also be used. Additional address and control signals are brought into the memories 67, 69 through a series of address and control lines 71. Additional read-only memory modules 70*a*, 70*b* can be added to expand the control storage to 8k , eight-bit words. Stored in the read-only memory chips 67, 69 and unalterable by the processor 7 is a predetermined control sequence of binary ones and zeroes.

The read-write memory 15 in FIG. 1 is shown in FIG. 2 as a pair of 256 word by four-bit random access memories 73, 75. The memories 73, 75 operate in parallel and provide 256 bytes of read-write storage. Each of the memories 73, 75 is connected to the data bus 11 and the lower order part 9*a* of the address bus. A set of additional control lines 77*a*, 77*b* is associated with each of the memories 73, 75. The memories 73, 75 are shown in FIG. 2B as Intel type 5101L-1 Memories. Any other compatable read-write memory type could also be used. The read-write memories 73, 75 are used to store various parameters of the control system 5 which might be changed from time to time.

Additionally, a circuit 15 is associated with the two memories 73, 75. The circuit 15 includes a 3.4 volt lithium battery 81*a*, a filter capacitor 81*b*, and two diodes 81*c* and *d*. The purpose of the circuit 15 is to provide a source of fail-safe voltage to retain the state of the volatile memories 73, 75 in case the system power supply, represented schematically at 83, is turned off or for some other reason power fails. In this instance, the diode 81*d* would decouple the circuit 15 from the failed power supply 83 and the battery 81*a* would continue to provide a supply of DC power to the memories 73, 75 insuring that their contents remain intact. This is a particularly important feature in those cases where it is for some reason desirable to shut down control system 5 and then bring it back up with exactly the same set of parameters and in exactly the same condition it was in at the time it was shut down.

Figure 2A:
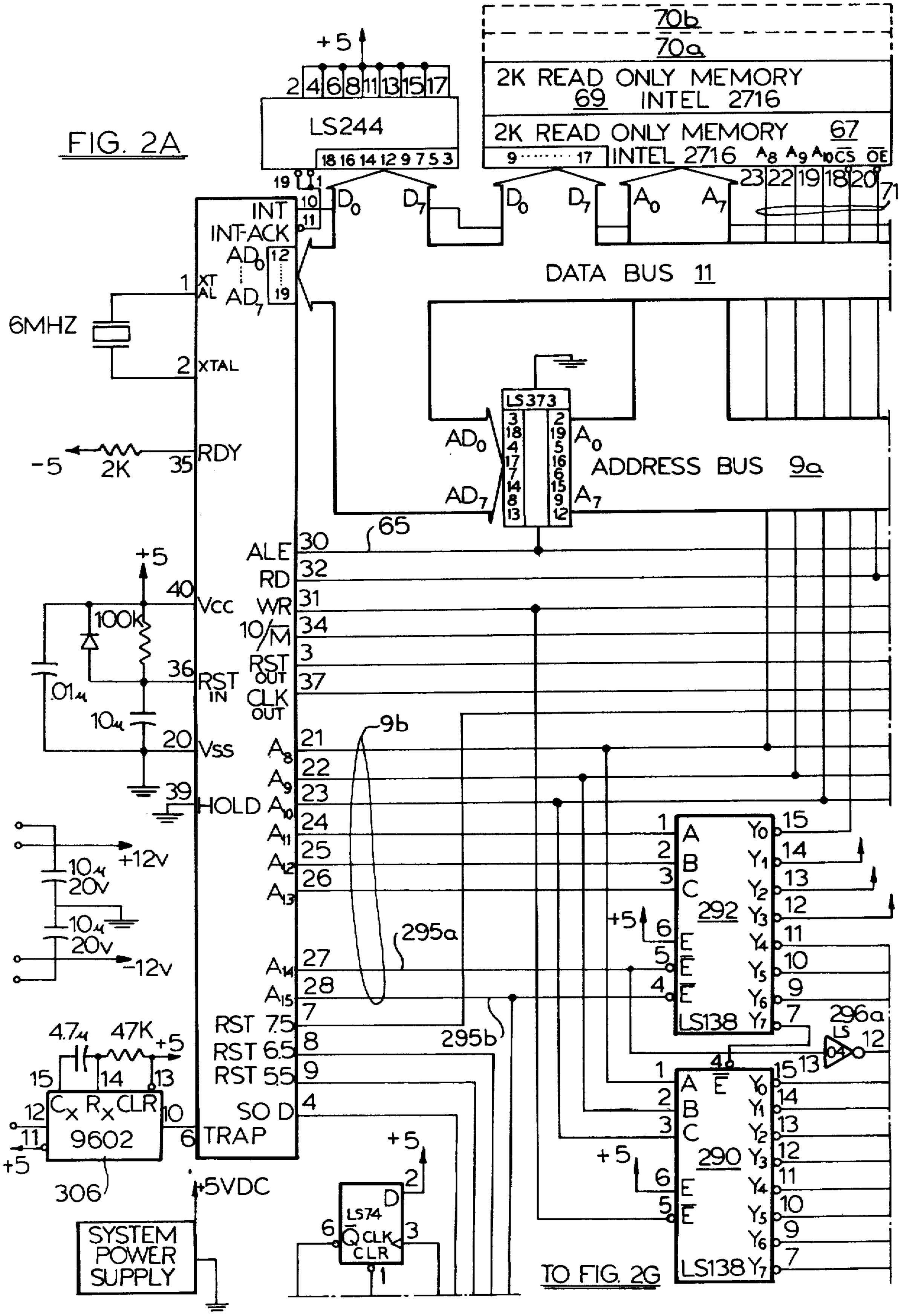
FIGS. 2A–G disclose a control system schematic diagram.
Figure 2B:
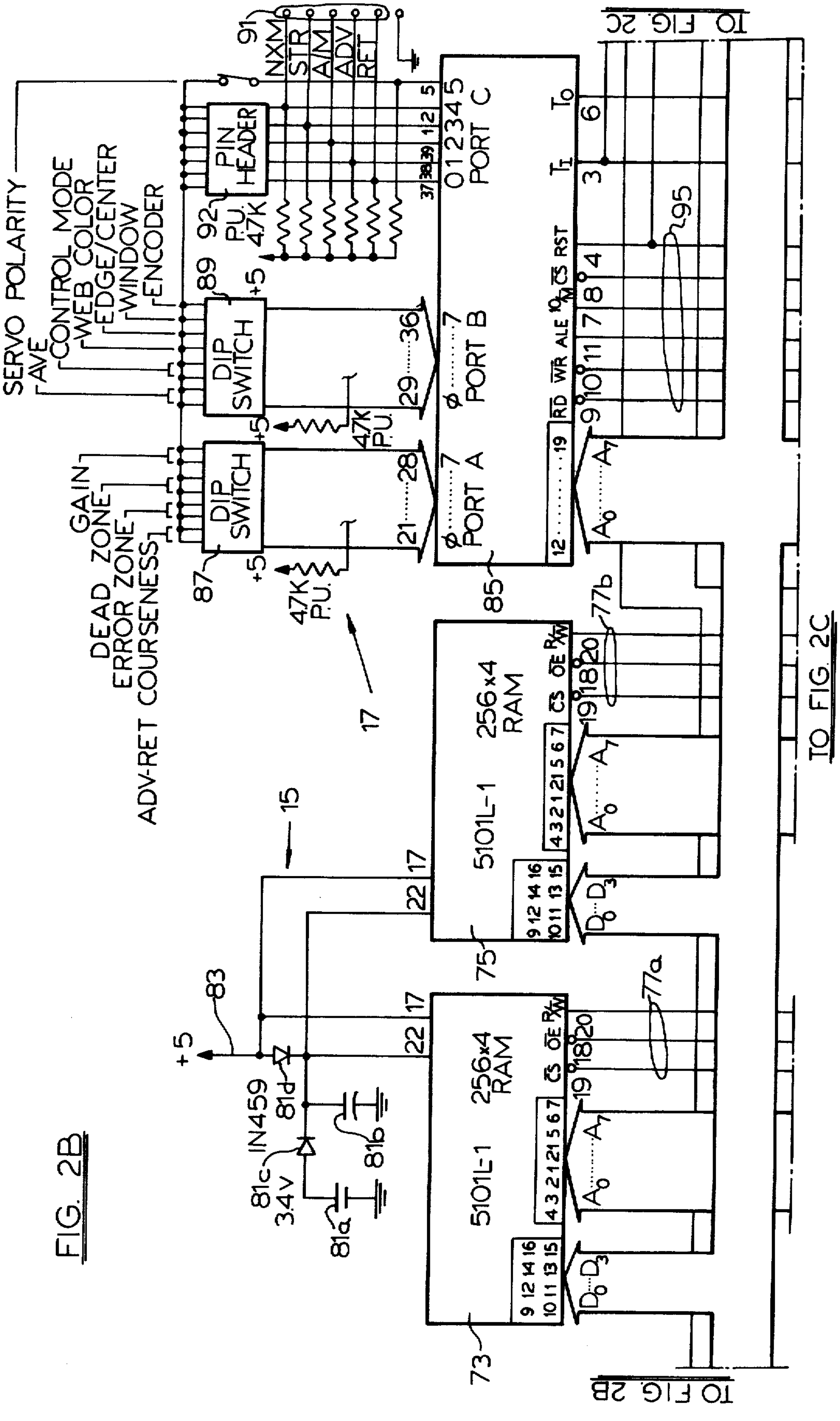
Figure 2C:
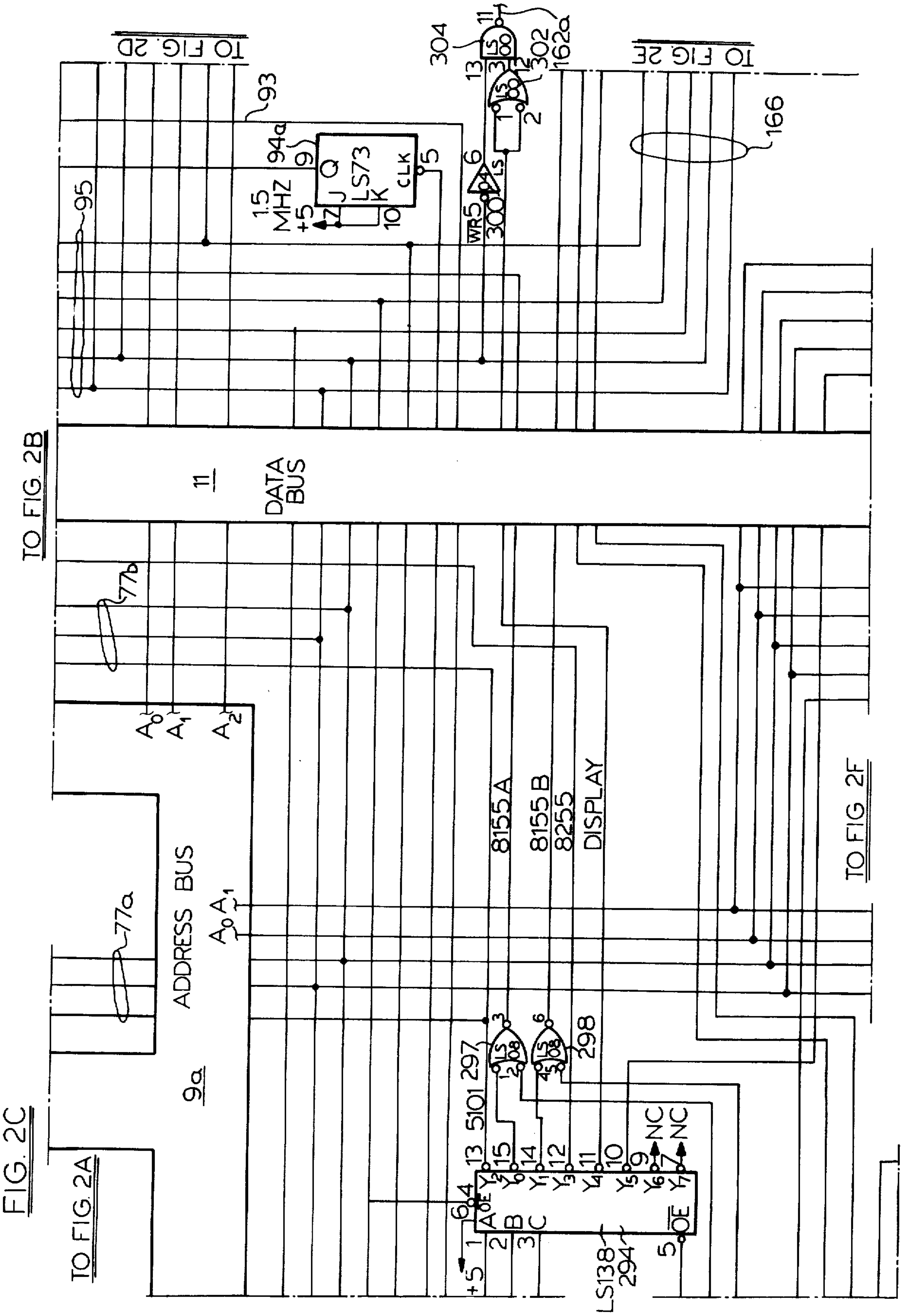

The switch input and real time clock port 17 of FIG. 1 is shown in FIG. 2B as comprising an Intel type 8155 input/output port 85. Dip switches 87, 89 and switch cable connectors 91 with associated header 92 provide a source of switch inputs to the port 85. The input/output port 85 is used exclusively as an input port to receive information from the digital input switch modules 87, 89 and the set of lines 91 which are connected to what is effectively a set of five switches on the operator panel of the control system 5. Connected to the input port 85 in parallel with the lines 91 is the header or cable connector 92 which would permit an additional source of signals to be connected in parallel with the five lines 91 for maintenance or test purposes. The settings of the switches 87, 89 are determined by the control system installer and represent a default set of parameters which are initially read each time the control system has power applied to it. The bits which can be set by the switch 87 correspond to:

(1) The Advance—retard offset value associated with each sensed depression of the advance-retard rocker switch on the operator panel.
(2) The Error zone of the system.
(3) The Dead zone of the system.
(4) The system Gain.

The bits which can be set by the switch 89 correspond to:

(1) Number of averages to be used in calculating error signal to be sent to the press compensator.

(2) The control mode, circumferential mark-to-reference, mark-to-mark or lateral.
(3) Web color.
(4) Edge or center. Scanning Mode.
(5) Width of the Window.
(6) The number of encoder pulses/revolution of the press cylinder.

Additionally, the input port 85 includes a fourteen bit down counter which is utilized by the control system 5 as a real time clock. The real time clock within the input port 85 generates an interrupt on a line 93 (See FIG. 2C) every ten milliseconds. The line 93 is connected to a vectored interrupt RST 7.5 of the processor 7. The value which is set into the fourteen bit down counter in the input port 85 is determined by the system control sequence which is hardwired into the PROMS 67 through 69. A down-counting clock signal is provided to the clock on the input port chip 85 by a flip-flop 94*a* (See FIG. 2C) which is connected to the clock-out signal line of the processor 7. In addition to the eight bit bidirectional data bus 11 which is connected to the input port 85 for the purpose of receiving signals from either the port A, port B or the port C of the 8155 chip a group of control signals 95 is also provided to the input port 85.

Figure 2D:
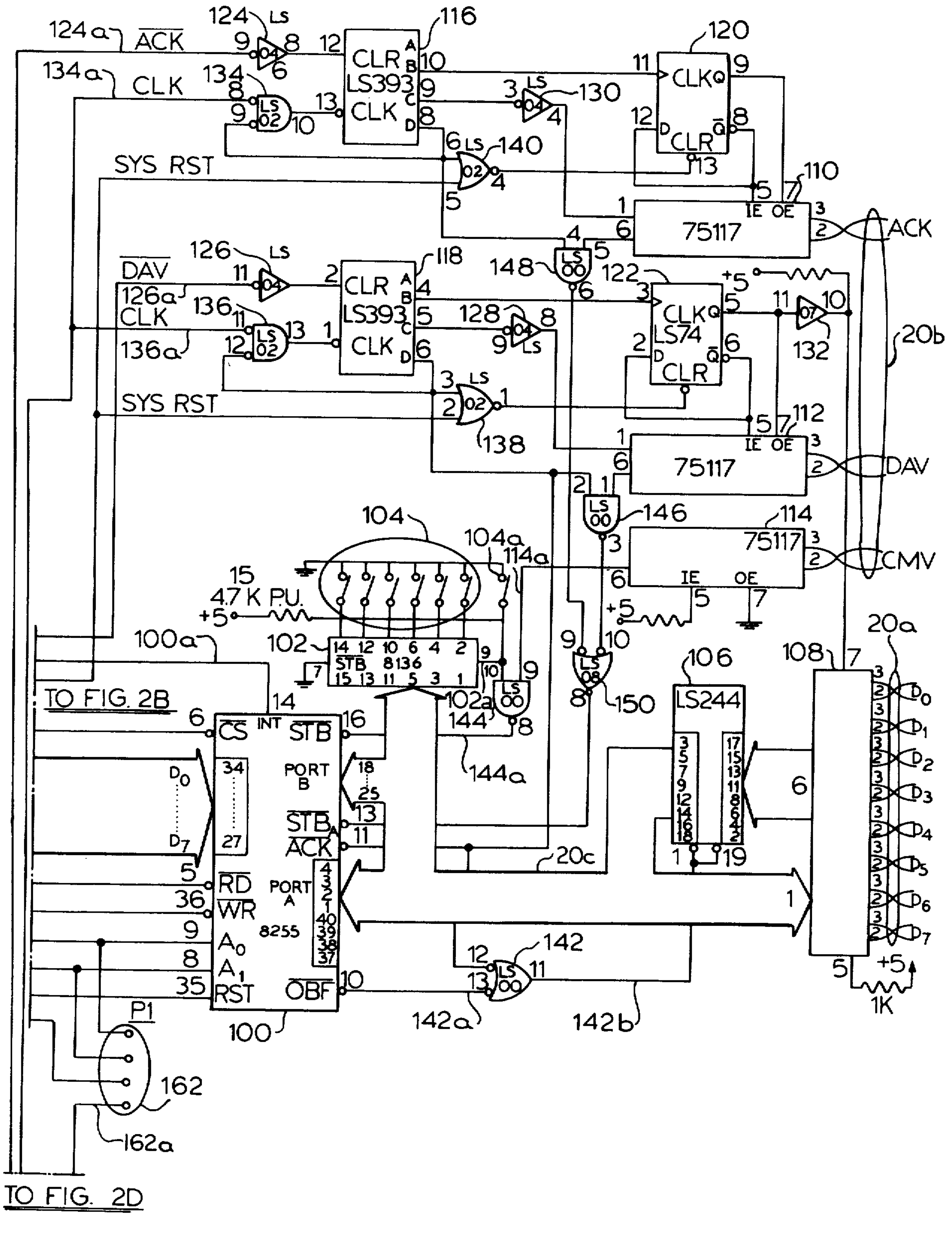

The communications port 19 of FIG. 1 is shown in FIG. 2D as comprising an input/output port 100, an Intel type 8255 chip, a six bit comparator 102, National type 8136, a set of address switches 104 which establish an address of the control system 5 with respect to the external data bus 20, an eight bit buffer chip 106 type 74LS244, a set of eight differential driver receiver circuits 108, type 75117, which buffer the eight bit parallel data section 20*a* of the external data bus 20, a set of three additional line driver receiver elements 110 through 114, type 75117, which buffer the command lines 20*b* for the external data bus 20, the four-bit counter elements 116, 118, type 74LS393, two D-flip-flop elements 120, 122, type SN74LS74, a set of inverters 124 through 132, type SN74LS04, a set of NOR gates 134 through 140, type SN74LS02, and a set of NAND gates 142 through 148, type SN74LS00, and an AND gate 150, type SN74LS08. The detailed operation of the communications port 19 will be discussed subsequently.

Figure 2E:
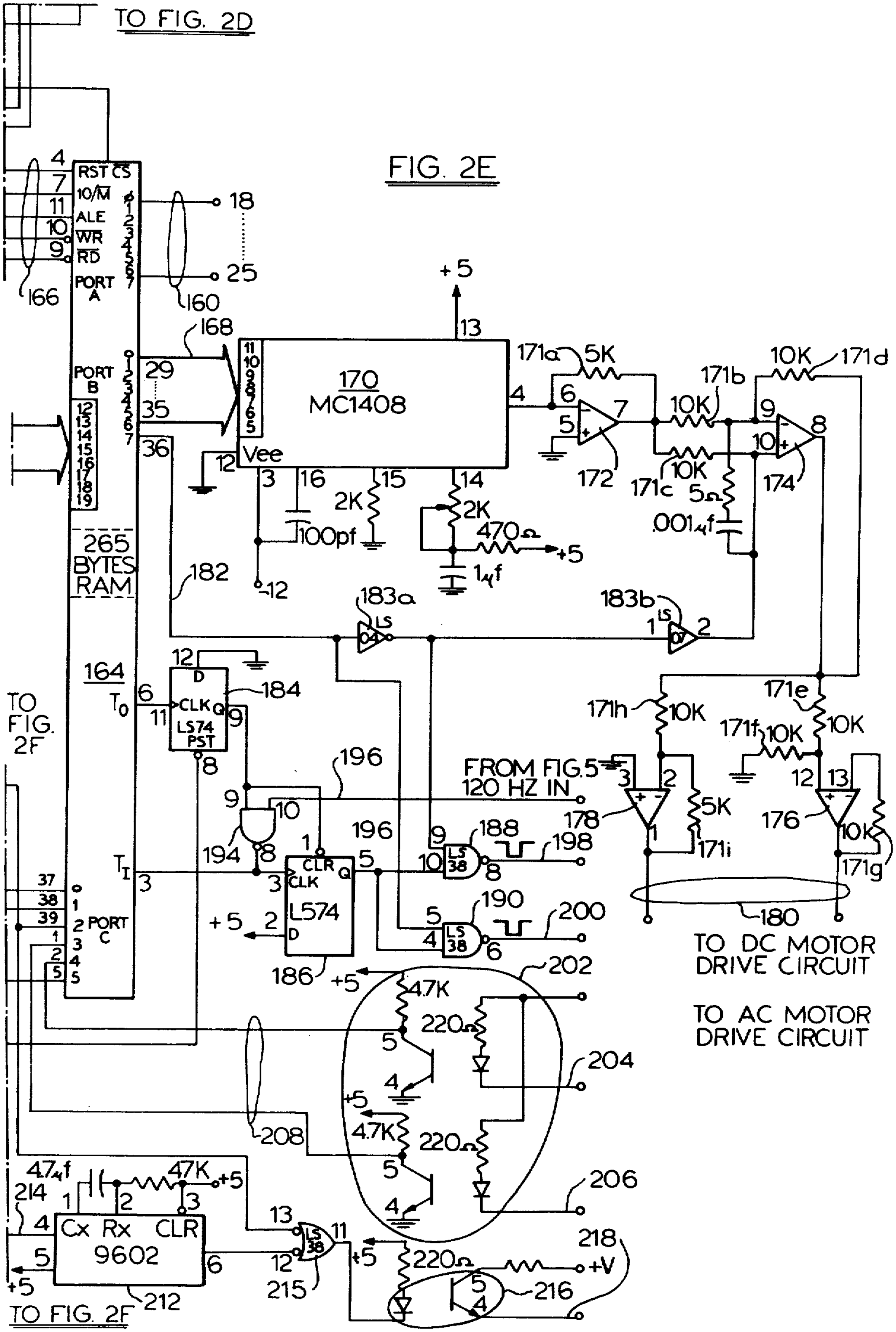

The display panel port 21 of FIG. 1 is shown in FIGS. 2D and 2E as a set of twelve lines, eight data lines 160 and four control lines 162 which are connected to selected lights on the display panel.

The motor control port 23 of FIG. 1, shown in FIG. 2E comprises an Intel 8155 type input/output port chip 164 which is connected to the data bus 11 and which also is connected to a group of control lines 166. The input/output port chip 164 has an eight-bit parallel output Port A to which is connected the set of data lines 160 (FIG. 2E) which is in turn connected to the display panel to specify which light or indicator is to be energized. A second bus 162 (FIG. 2D) specifies which of the columns of lights at the display panel is to be illuminated and also includes a strobe line 162*a* to be used by the display panel electronics.

The control system 5 can use as the compensator motor 24*b* either a DC or an AC motor. The DC drive output will be described first. The input/output port chip 164 includes a Port B with a seven-bit parallel output bus 168 which is connected to a digital to analog converter 170, a Motorola chip type MC1408. The output Port B provides seven bits of magnitude on the bus 168 to the digital to analog converter 170. The digital magnitude is converted to an error voltage in an operational amplifier 172, buffered in a second operational amplifier 174, and divided so as to provide a differential DC drive signal in a pair of operational amplifiers 176, 178. A series of resistor elements 171 provides feedback and biasing for the operational amplifiers 172-178. The operational amplifiers 176, 178 provide differential drive for a DC motor on a pair of lines 180. The lines 180 are connected to a DC motor drive circuit. The DC motor can, in turn, be connected to a web compensator or a cylinder compensator on the associated press. Polarity information is brought out on a line 182 which is also connected through Port B of the input/output port chip 164. The signal on line 182 is inverted by the element 183 and buffered by the element 183*b*.

A second source of output to drive an AC motor is provided from the input/output chip 164 by a pair of D-flip-flops 184, 186, type SN74LS74, a Schmitt Trigger gate 194, and a set of open collector NAND gates 188, 190, type SN74LS38.

A 120-Hertz clock input signal is applied on a line 196 to the gate 194. A pair of output lines 198, 200 provide switching signals to an AC motor control circuit. By means of triggering a pair of triacs from the signals on the lines 198, 200, an AC synchronous motor may be stepped a number of pulses corresponding to the count loaded into the down counter of the input/output port chip 164. Each pulse on the line 196 causes the AC motor to move, in a selected direction, one step and also counts down the motor displacement count in the output chip 164. Polarity is again dictated by the value of the signal on the line 182. As in the case of the DC motor, the AC motor may be connected to a web compensator or to a cylinder compensator.

A set of circuits 202 receives inputs on a pair of lines 204, 206 from the tachometer of the associated DC motor and provides outputs on a pair of lines 208 which contain directional feedback information. The lines 208 can be sensed through a Port C of the input/output port 164. The feedback information on the lines 208 can be examiner by the digital processor 7 and can, in turn, be used to drive the display panel to indicate the direction that the DC drive motor is turning.

The circuit 5 includes an auto/manual flip-flop 210 (FIG. 2F) which is set and/or reset through an auto/manual switch on the display panel. Additionally, there is a one-shop 212 (FIG. 2E) type 9602, which is triggered by the processor 7 on a line 214 each time there is a real time clock interrupt. If the oneshot 212 has been triggered and if the flip-flop 210 is set in the auto position, a gate 215 will drive an optically coupled diode-transistor combination 216 to cause the transistor 216 to conduct which is, in turn connected to an auto relay circuit in the motor drive electronics to permit the control system 5 to run the compensator motor.

Figure 2F:
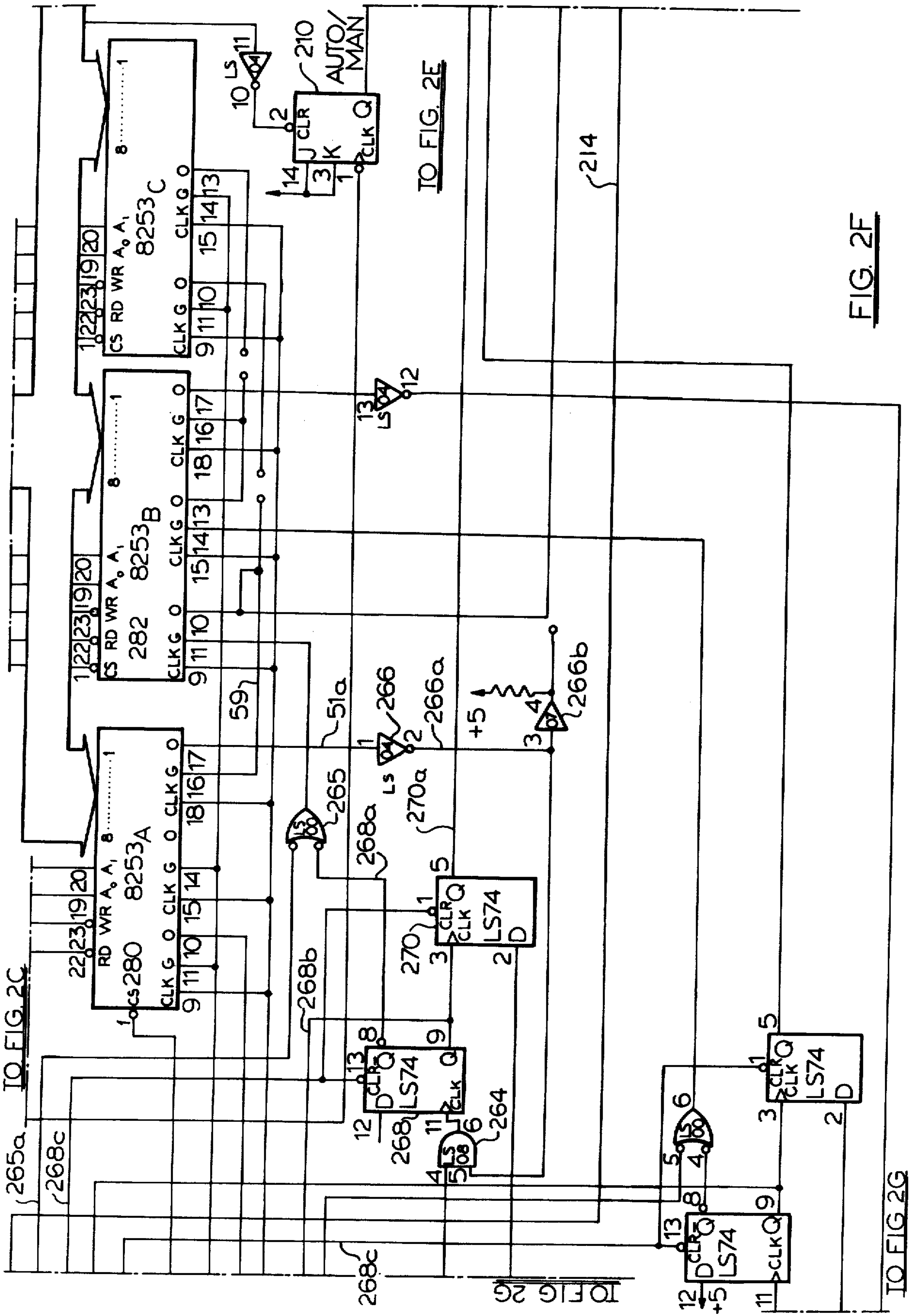
Figure 2G:
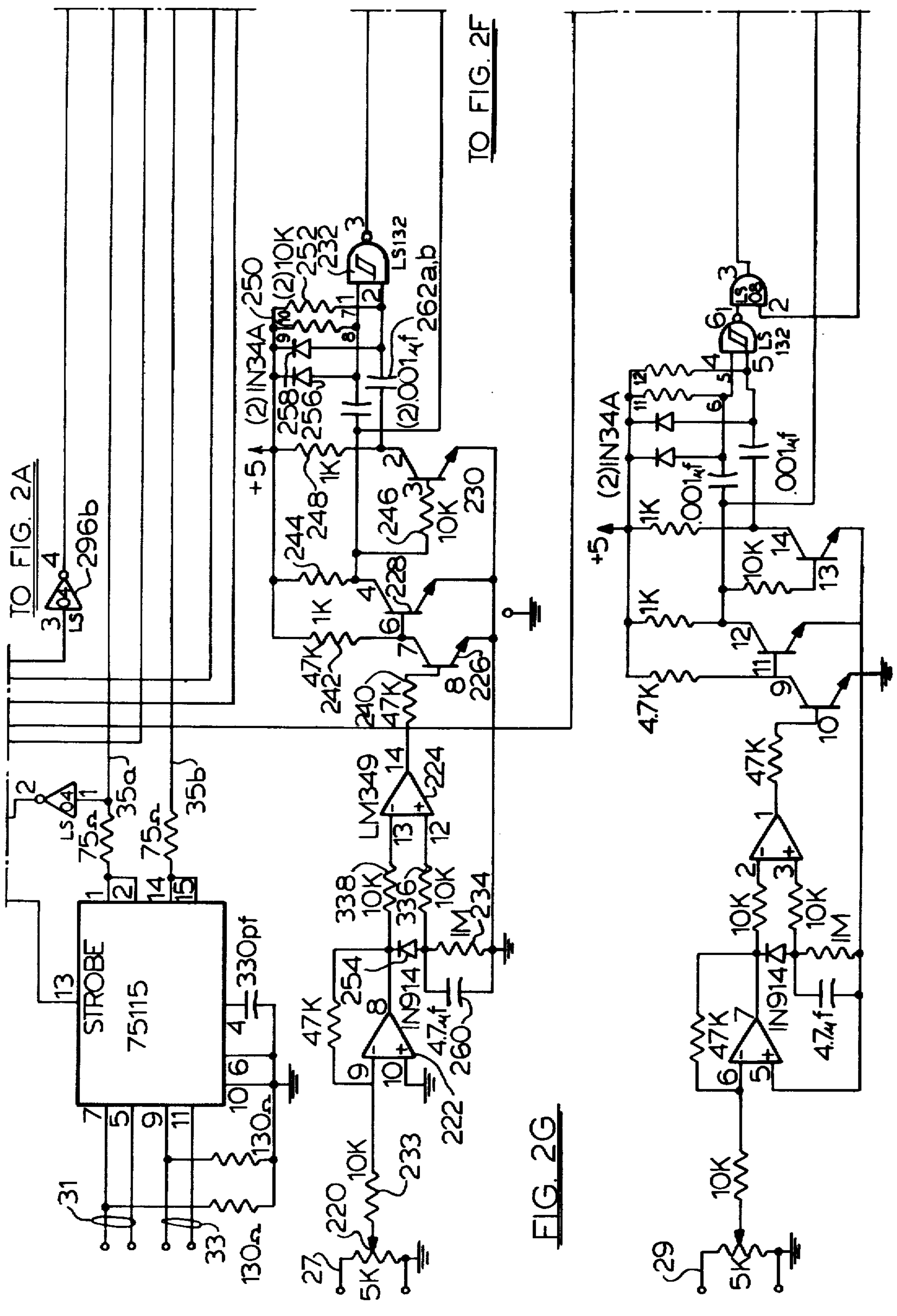

The conditioning circuits 35 of FIG. 1 are shown in FIG. 2G as a 75115 dual differential receiver circuit. Differential reference signals are received on the lines 31 and differential encoder pulses are received on the lines 33 by the conditioning circuits 35.

The conditioning and control circuits 37 of FIG. 1 are shown in FIG. 2G and include a potentiometer 220, operation amplifiers 222, 224, transistors 226 through 230, a Schmitt trigger 232, a series of resistors 233 through 252, a series of diodes 254 through 258, a series of capacitors 260 through 262, a gate 264, an inverter 266 and a pair of flip-flops 268 and 270. The conditioning and control circuits 39 are identical to the conditioning and control circuits 37.

The real time counters 43 through 53 of FIG. 1 are shown in FIG. 2F as a pair of counter chips 280, 282. Each of the chips 280, 282 is an 8253 Intel type chip which includes three down counters. The 280 chip includes the encoder counter 43 for Scanner A, the encoder counter 45 for Scanner B, and the window counter 51 for Scanner A. The chip 282 includes the delay counter 47 for Scanner A, the delay counter 49 for Scanner B, and the window counter 53 for Scanner B.

The control circuit 5 as shown in FIG. 2 also includes a set of three address decode elements 290 through 294. Each of the elements 290 through 294 is connected to selected members of the address lines in the higher order portion **9*b* of the address bus 9. The decoder chips 290-294 generate decoded address signals to be utilized by the remainder of the control circuitry in the control 5. Each of the chips 290 through 294 is an SN74LS138 type chip. Additional gates 296 through 304 are connected to the processor 7 and the address decoder chip 294 to further decode addresses placed on the address bus 9 by the processor 7. Gates 300-304 provide decoded address signals for the strobe line 162*a***.

Table I lists a sample set of device addresses.

A power fail interrupt is available through a one-shot 306 which detects a power failure and which generates a trap signal which can be sensed by the processor 7.

The processor 7 requires a selected source of clock signals which is shown in FIG. 2. It will be understood that the various electronic elements of FIG. 2 require one or more sources of power to operate properly. These sources of power are frequently indicated on FIG. 2 in a conventional fashion. Where no power indication is shown with respect to a given element, such as the Auto-Manual flip-flop 210, it will be understood that the power required to operate that chip properly, as specified by the manufacturer is to be provided.

OPERATION OF THE COMMUNICATIONS PORT 19

The communications port 19 of the control system 5 provides a facility whereby the control system 5 can communicate with and receive information from other units. In particular, the external data and control line bus 20 may be connected to a master unit which has a communications port which is comparable in structure to the port 19.

When the communications port 19 is in a quiescent, or a non-active state, a remote processor or a master control unit can be caused to apply an eight-bit byte of data to the parallel external data bus **20*a* and a signal to the command valid line, CMV, of the control signal bus 20*b*. The byte of eight-bit parallel data includes a two-bit command code and a six-bit device address. The byte is sensed by the differntial driver chips 108, passed through the tri-state buffer devices 106, and appears at an internal data bus 20*c***.

If the upper six bits of the eight-bit data word, the address portion, on the bus **20*c* correspond to the setting of the switches 104, the six-bit comparator 102 senses this equality and generates a signal on a line 102*a* which is one input to the NAND gate 144. A second input to the NAND gate 144 on a line 114*a* comes from the differential line driver and receiver 114** which sense the signal on the CMV line from the remote control unit.

The high signals on the lines **102*a* and 114*a* generate a downgoing signal on an output line 144*a* of the NAND gate 144. The downgoing signal on the line 144*a* strobes the eight bits on the bus 20*c* into the port B of the input-/output chip 100. The operation of strobing the eight bits of data from the parallel data bus 20*c* into the port B of the chip 100, generates an interrupt on line 100*a* which is connected to the interrupt input INT of the processor 7**.

The process of strobing data into the port B of the input chip 100 is the only action which generates the INT interrupt signal to the processor 7. In response to that signal, the processor is trapped to the location 38 HEX and reads the data in port B of the input chip 100 which corresponds to reading the data at HEX address 2301.

Upon receipt of the eight bits of data from the port B, the processor examines at the two least significant bits, bits 0, 1, which can have one of the four states: 00, 01 (listen command), 10 (talk command), 11. The commands 00, 11 are not used.

The listen mode corresponds to the control system 5 being ordered to receive data from the external bus **20*a*. The talk command requires the control system 5 to supply data to the remote processor on the external bus 20*a***.

If the processor 7 determines that a listen command has been issued, it will enter the listen mode and prepare to receive two bytes of data from the external data bus **20*a*. Immediately upon receipt of the listen command, the processor 7 will address the location 3800 HEX. This produces a downgoing signal on a line 124*a* which clears the four-bit counter 116. So long as the most significant bit, the D-bit, of the four-bit counter 116 is reset, clock pulses on a line 134*a* are permitted to pass through the NOR gate 134 and count the counter 116. When the C-bit of the counter 116 goes high, the gate 130 provides an outgoing signal to the differential driver 110 generating an acknowledge (ACK) signal on the ACK line of the control bus 20*b*. The outgoing differential driver 110 is enabled whenever the flip-flop 120 is set by an upgoing signal from the B-bit of the counter 116**.

Figure 3:
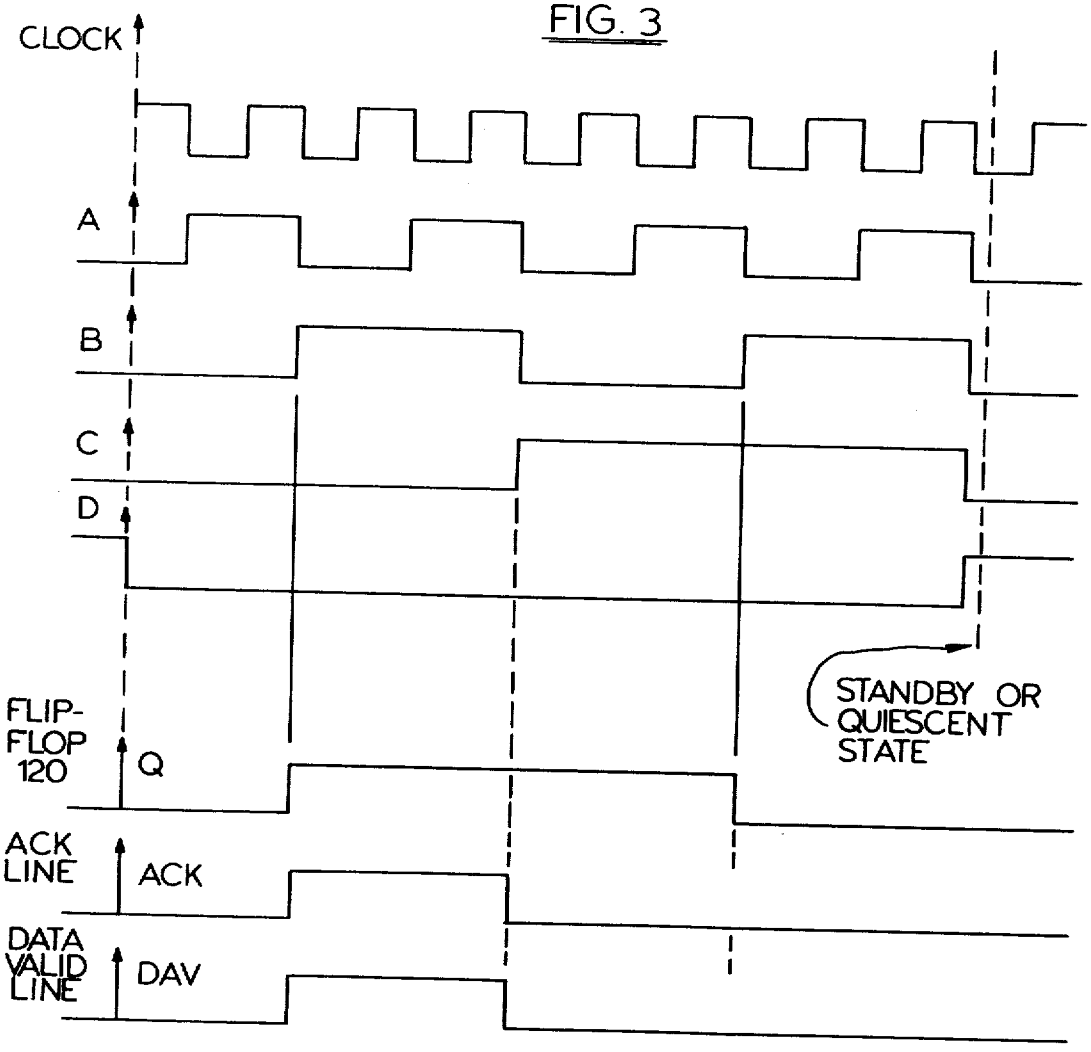
FIG. 3 is a timing diagram disclosing the operation of the communications port.

FIG. 3 is a timing diagram which shows the counting sequence of the flip-flops A, B, C, D in the four-bit counter 116, the flip-flop 120 and the related generation of the acknowledge signal on the ACK line by the differential transmitter 110.

The remote processor then puts the first of the two bytes of data expected by the located processor 7 onto the parallel data bus **20*a*. Simultaneously, it supplies a data valid signal on the command line DAV. The data valid signal on the line DAV is sensed by the differential receiver 112 which is enabled normally, passed through the NAND gate 146 as the D-bit of the four-bit counter 118 is normally in a high state, passed through the AND gate 150 and used to strobe the port A of the input chip 100. The eight bits of data on the bus 20*a* have concurrently passed through the buffer circuits 106 and appear in parallel on the bus 20*c*. The processor 7 has been polling the chip 100 and when it senses that its input buffer full flag has been set due to the fact that the port A has been strobed, it will read the port A by reading the address 2300 HEX which will gate the eight bits in the port A onto the eight-bit data bus 11 and into the processor 7. Having received the first of the two expected bytes of data, the processor 7 again reads the address 3800 HEX which generates a second signal on the ACK line to the remote processor. The remote processor places the second byte on the external data bus lines 20***a* along with a second data available signal on the DAV lines which again strobes the port A. The processor again reads the second of the two expected bytes of data and generates a signal on the ACK line to complete the incoming data transfer. At this point, the processor 7 reverts to its standby state of listening again.

Figure 4B:
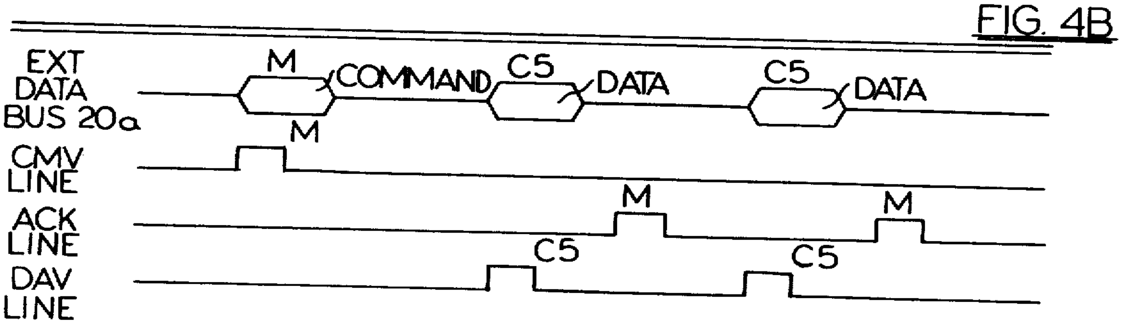
FIGS. 4A and 4B are timing diagrams showing the transmission of the external data bus.
Figure 4A:
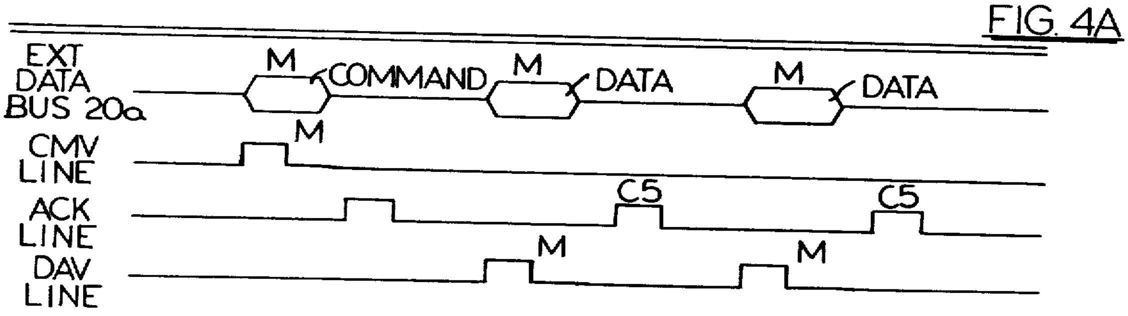

The data receipt sequence is summarized in FIG. 4A. Signals generate by a remote unit are identified with a capitol "M". Signals generated by the control unit 5 are identified with a label "C5". The "COMMAND" byte from the remote unit is followed by two data bytes from the remote unit. In the instance where the command code detected by the processor 7 is a "talk" or transmit code, each byte of date to be transferred is written to HEX location 2300 which corresponds to port A of the input/output port chip 100. When port A of the chip 100 is loaded, a line 142*a* connected to one input of the gate 142 has a low signal thereon. The processor 7 then generates a 3900 HEX address which corresponds to generating a downgoing signal on a line 126*a* which provides an input to the inverter 126 which clears the four-bit counter 118. Immediately thereafter, the clock signal on a line 136*a* starts counting the counter 118. As shown in FIG. 3, a data available signal, DAV is generated during a time interval where the C-bit of the 118 counter is low and when the B-bit of that same counter is high. Simultaneously, since the D-bit of the 118 counter is low, the gate 142 is enabled which outputs a high signal on a line 142*b* disabling the buffer chip 106 and the data on the bus 20*c* is transmitted through the differntial drivers 108 to the external data bus 20*a* during the time interval that the differential drivers 108 are enabled through the buffer 132, which corresponds to the time interval when the flip-flop 122 is set.

When the remote processor senses the data available signal on the DAV lines, it generates an acknowledge signal on the ACK line which is transmitted through the differential receiver 110, the gate 148, which is enabled due to the fact that the counter 116 is in its quiesecent state with the D-bit high, through the gate 150 to strobe the A port of the chip 100. The local processor 7 continually poles the input buffer flag on Port A of the input-/output chip 100, and upon sensing the port A having been strobed, the local processor 7 outputs the next byte of data using the above disclosed sequence.

Outgoing data transmissions to the bus 20 can be as long as required by the local processor 7. The data transmit sequence is shown in FIG. 4B. The "COMMAND" byte from the remote unit, is followed by two bytes of data from the control unit 5.

The six-bit address code, corresponding to bits 2 through 7 of the external data bus 20*a* permits a total of 64 different press control units to be connected to the external bus 20*a*. Each of the press control units, corresponding to the press control unit 5, has its own unique address code set by the switches 104. Any press control unit 5 may be taken off line by use of a switch 104*a* which blocks the comparator 102 from ever sensing an address on the six bits of the bus 20*c* corresponding to the switches 104.

It should be noted that the above described communications protocol requires that whenever a unit strobes a control line, the DAV line or the CMV line, it waits for a command response to the ACK line from the other input on the bus before proceeding.

MOTOR DRIVE ELECTRONICS

Figure 5:
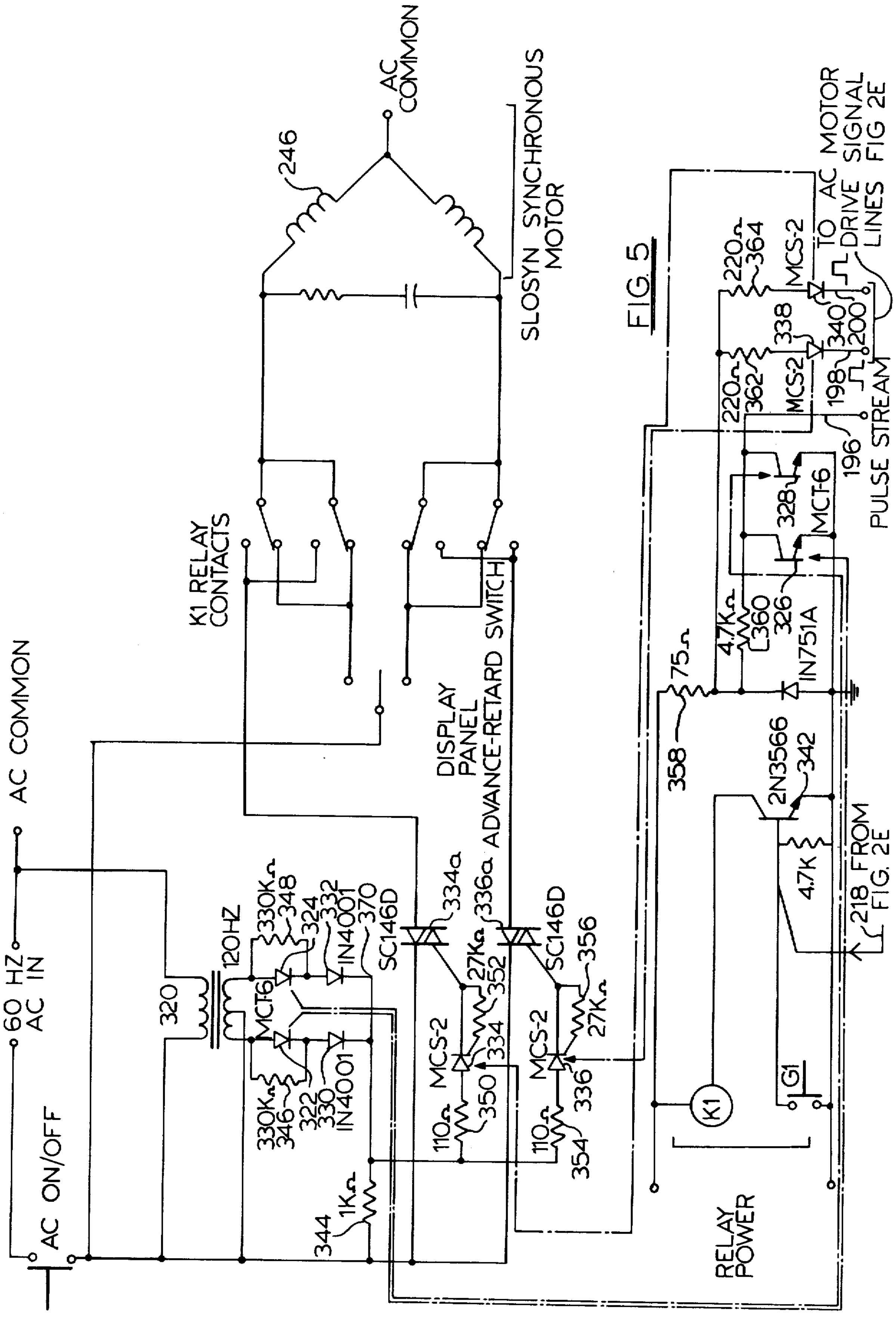
FIG. 5 is a schematic diagram of the AC motor drive electronics.
Figure 6A:
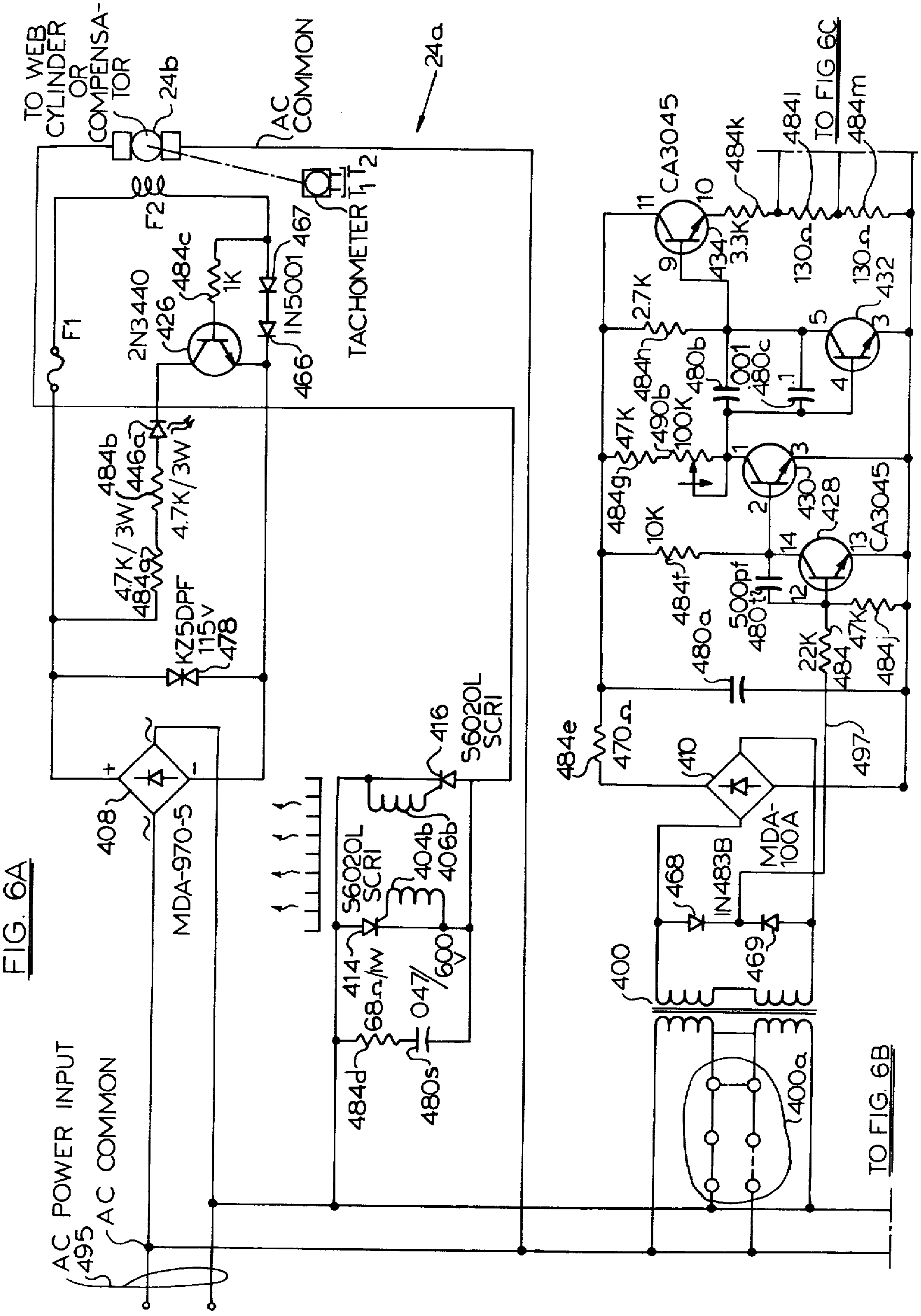
FIG. 6A–6D disclose a schematic diagram of the DC motor drive electronics.
Figure 6B:
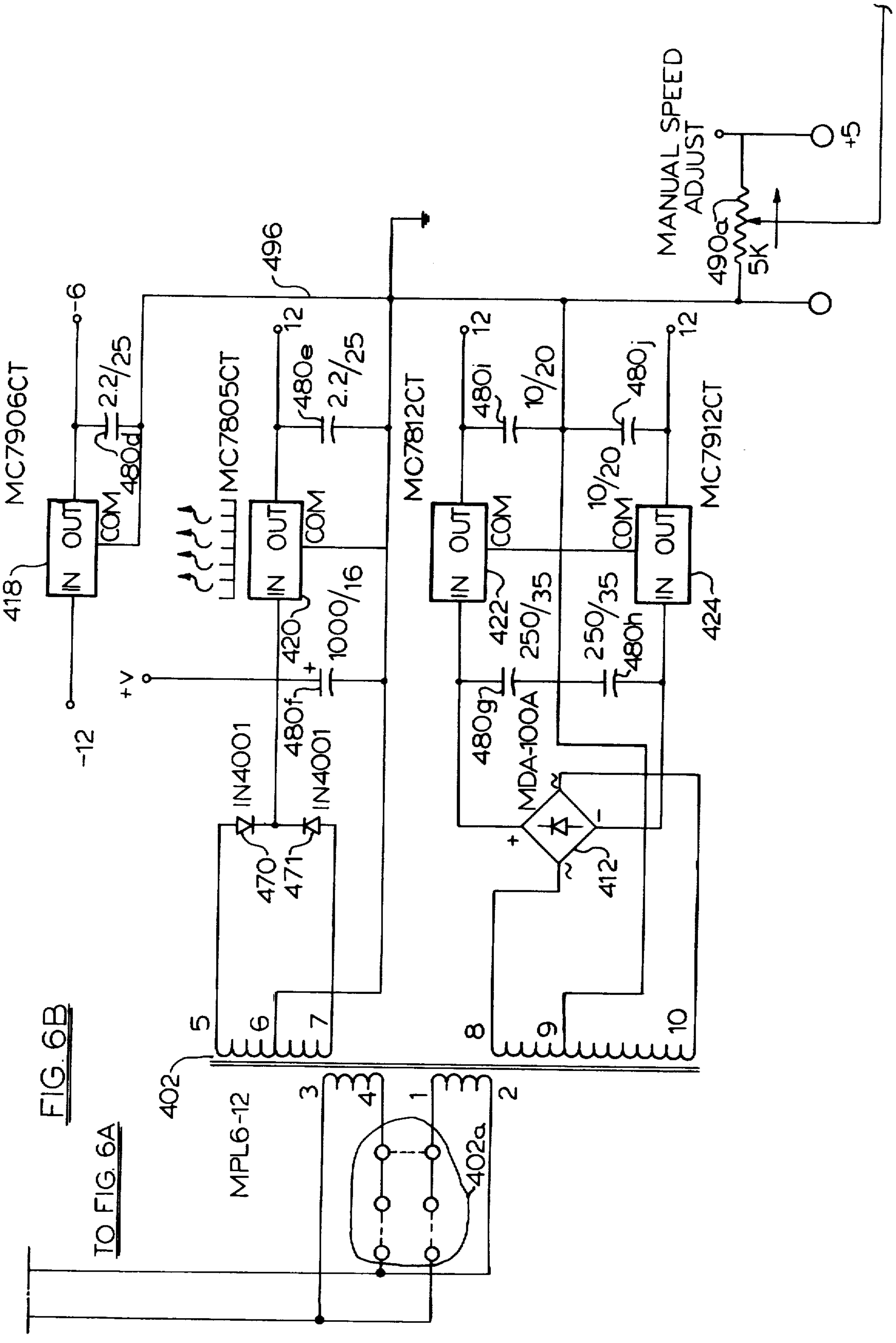
Figure 6C:
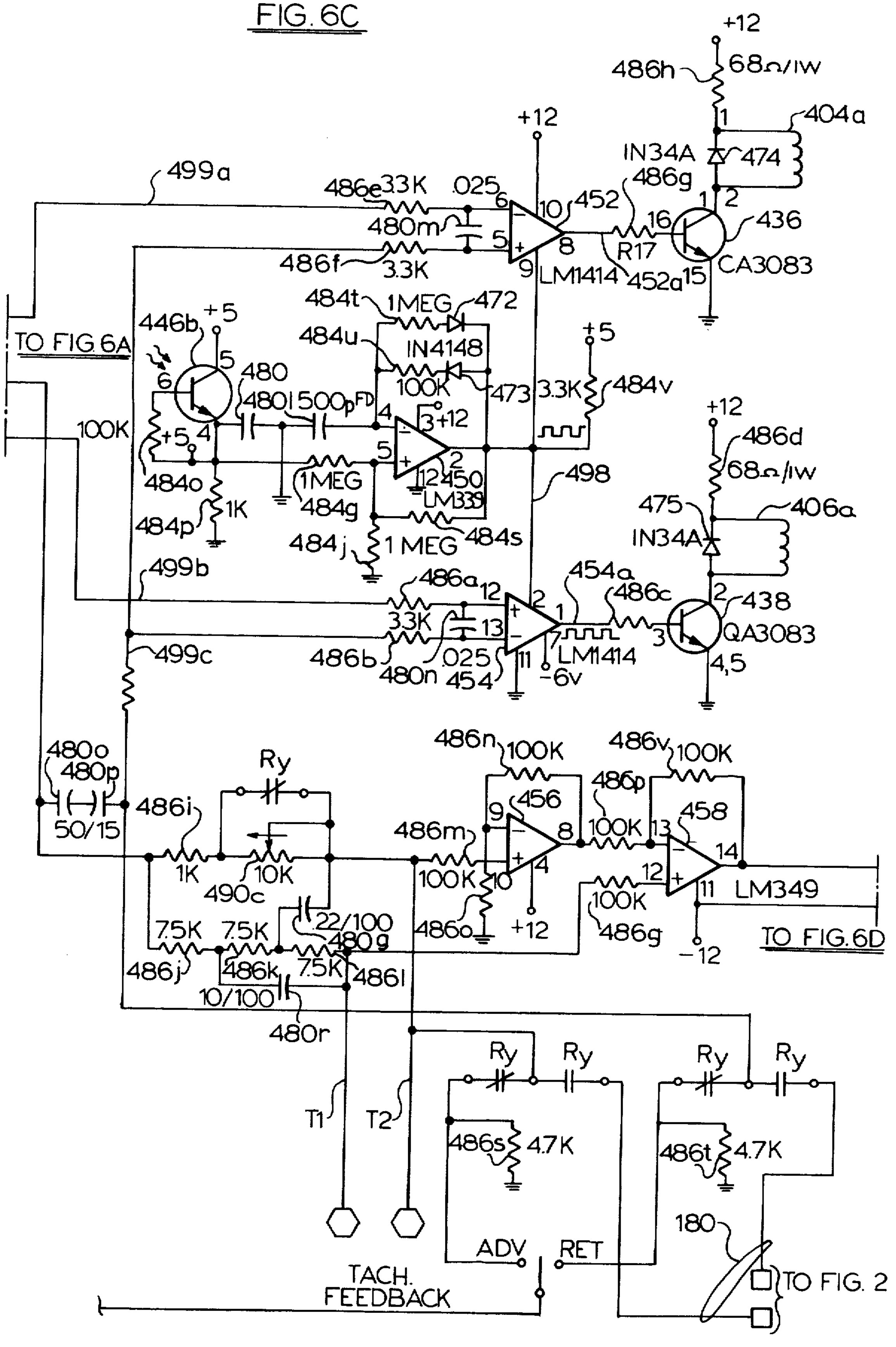
Figure 6D:
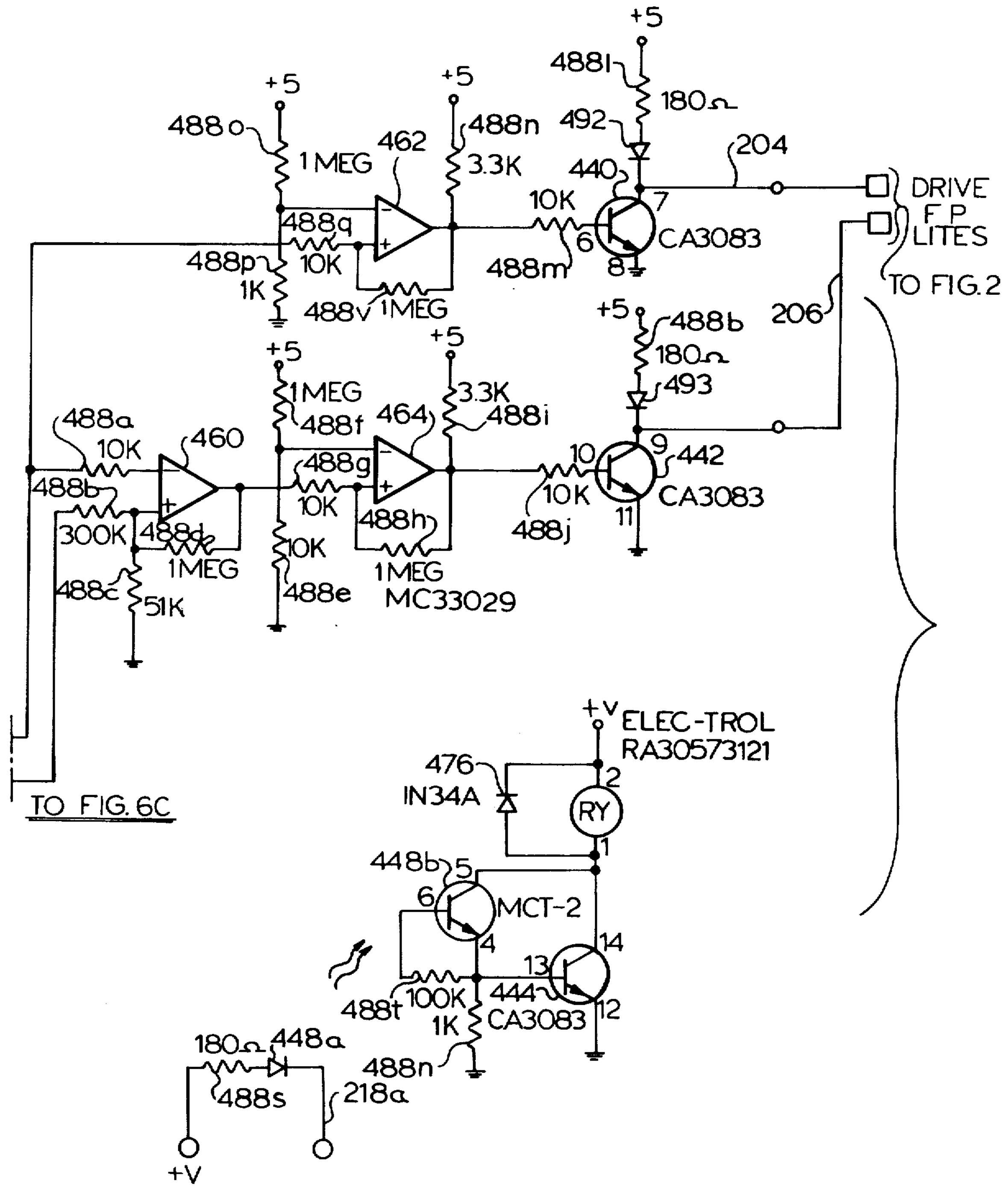

An AC motor may be used as the compensator 24*b* in the press control system 5 of FIG. 2 to minimize the press error. FIG. 5 shows one exemplary AC motor drive circuit. It has been found that a synchronous Slo-Syn motor may be pulsed much like a stepping motor to produce the desired incremental number of steps.

The motor drive circuitry of FIG. 5 includes a transformer 320 with a primary and with a center tapped secondary, photodiodes 322, 324 which are optically coupled to phototransistors 326, 328, rectifier diodes 330, 332, optically triggerable silicon controlled rectifiers 334, 336 which are optically coupled to photodiodes 338, 340, bidirectional driver silicon controlled rectifiers (TRIACs) 334*a*, 336*a*, a motor enabling relay K1, a relay energizing transistor 342, along with biasing and current limiting resistors 344 through 364.

The transformer 320 has its primary connected across a source of 60 Hertz AC voltage and has its secondary wired to the diodes 322, 324, 330 and 332 to form a rectifier. The photodiodes 322, 324 alternately cause the associated phototransistors 326, 328 to conduct, thereby generating a 120 Hertz signal on the line 196 of FIG. 5 which is fed back to the corresponding line on the sheet FIG. 2E. The rectified AC signal on the line 370 is applied through the resistors 350 and 354 to the anodes of the photo silicon controlled rectifiers 334, 336. The cathode of one of the corresponding photodiodes 338, 340 connected to the lines 198, 200 respectively is grounded in synchronism with the voltage on the line 370 at a 120-Hertz rate. The line which is grounded is selected based on the polarity set at the line 182 and the gate 183*a* which enables one of the gates 188, 190. Thus, depending on which gate 188, 190 of FIG. 2E is enabled, that grounded signal on the line 198 or the line 200 causes the associated photodiodes 338, 340 to conduct. The associated photo silicon controlled rectifier 334, 336 is also caused to conduct which in turn triggers an associated driving TRIAC 334*a* and 336*a*. Depending on which of the TRIACs 334*a*, 336*a* is triggered, if the relay coil K1 has been energized the Slo-Syn synchronous motor will rotate either clockwise or counterclockwise.

The relay coil K1 is energized through the transistor 342 via the line 218 from FIG. 2E. So long as the transistor 342 conducts due to the fact that the line 217 from FIG. 2E is high, the relay coil K1 will be energized and will cause the K1 relay contacts of FIG. 3 to assume the energized position which is just opposite to the position shown in FIG. 5. A press go-down contact G1 is also shown in FIG. 3 which can force the relay coil K1 to become deenergized, thereby disconnecting the Slo-Syn synchronous motor from the control system 5.

The display panel advance retard switch is shown in FIG. 5 connected through the contacts of the relay K1 such that if the K1 relay coil is not energized the operator will be able to directly control the compensator motor 24*b*.

DC MOTOR DRIVE ELECTRONICS

An alternate form of the motor drive electronics 24*a* is shown in FIG. 6. The motor drive electronics of FIG. 6 represents a velocity control system for use where the motor 24*b* is a DC motor.

The motor drive electronics of FIG. 6 includes a pair of power transformers 400, 402, a pair of pulse transformers 404, 406, bridge rectifiers 408 through 412, silicon controlled rectifiers (SCR) 414 and 416, voltage regulators 418 through 424, transistors 426 through 444, optically coupled light emitting diode-transistor pairs 446, 448, operational amplifiers 450 through 464, diodes 466 through 476, a transient suppressor 478, capacitors 480*a* through 480*t*, resistors 484*a* through 488*u*, potentiometers 490*a* through 490*c* and light emitting diodes 492, 493.

The motor drive circuitry of FIG. 6 provides a relatively constant field voltage to the motor 24*b*. AC input power is supplied at a pair of terminals 495. The AC input power is rectified in the bridge rectifier 408 and fed through a fuse F1 to the field F2 of the motor 24*b*. With current flowing in the field F2 of the motor 24*b*, the transistor 426 will conduct due to bias from the diodes 466, 467. With the transistor 426 conducting, the light emitting diode 446*a* will conduct and will emit light which is sensed at the base of its corresponding photo-transistor 446*b*. Before a signal can be generated at the armature of the motor 24*b*, it is necessary that there be a field current flowing. The resistors 484*a*, *b* limit the current that flows in the diode 446*a*. The element 478 is a transient suppressor which limits any transients generated by the field F2.

A phase variable, half-wave rectified alternating signal is generated and supplied to the armature of the DC motor 24*b*. One of the SCR's 414, 416 is selectively turned on to produce either a clockwise or a counterclockwise rotation of the armature of the motor 24*b*. The selected SCR 414, 416 is synchronized with the phase of the AC input power. Synchronization is provided by the transistors 428-434.

The power and isolation transformer 400 provides power to the bridge rectifier 410 which in combination with the resistor 484*e* and the capacitor 480*a* forms a floating power supply which is not connected to the DC common at the line 496. A full wave rectifier including the diodes 468, 469 generates a series of 120 Hz pulses on the line 497. The 120 Hz pulses on the line 497 are coupled through the switching transistors 428, 430. The output of the transistor 430 continually restarts a Miller integrator with an emitter-follower output which includes the transistors 432, 434. The output of the Miller integrator circuit at the emitter of the transistor 434 is a 120 Hz saw-tooth wave form which has approximately 1 17 volt variation in the ramp voltage. This 17 volt, 120 Hz ramp signal is used to synchronize the two comparators 452, 454 with the phase of the AC input on the lines 495. The potentiometer 490*b* provides a low end adjustment to the ramp.

The operational amplifier 450 and its associated circuitry form a 1 kHz oscillator which generates 1 kHz, 0 to 5 volt pulse train on a line 498 when the photo transistor 446*b* is enabled, due to the field current. The line 498 is connected to the strobe input of each of the comparators 452, 454. The comparators 452, 454 are enabled whenever there is a pulse on the line 498.

The more positive output from the Miller integrator circuit, at the junction of the resistors 484*k* and 484*l* is connected by a line 499*a* to the negative side of the operational amplifier 452. The more negative side of the output of the integrator-type circuit is connected by a line 499*b* to the positive input of the operational amplifier 454. Velocity error signals on a line 499*c* are connected to the positive input of the operational amplifier 452 and the negative input of the operational amplifier 454. Based on the results of the comparison at the operational amplifiers 452 and 454 either the comparator 452 or the comparator 454 attempts to go high. When strobed at the line 498, the comparator 452 or 454 generates a string of 1 kHz pulses, synchronized with the phase of the AC input voltage.

The synchronized pulse train on line 452*a* or 454*a* causes either the transistor 436 or 438 to switch at a 1 kHz rate. The primary of the pulse transformer 404*a* or 406*a* thus has a repetitive pulse generated across it which in turn is coupled to the secondary 404*b*, 406*b* of the associated transformer to trigger the appropriate SCR 414, 416. Depending on which of the two SCRs 414, 416 is turned on, the armature of the motor 24*b* will turn either one direct-on or the other.

The resistor 484*d* and the capacitor 480*s* limit the application of high speed transients to the two SCR's 414, 416 to prevent spurious turn on.

Tachometer feedback from the DC motor 24*b*, which has a built-in tachometer associated with it, is brought into the servo-electronics 24*a* along a pair of lines T1 and T2. The resistors 486*i* through 486*l*, the potentiometer 490*c* and the capacitors 480*q*, 480*r* form a summing point where the input tachometer feedback from the lines T1, T2 is algebraically added to the input velocity signals coming from either the advance/retard switch at the display panel or from the operational amplifiers 176, 178 along the lines 180 of FIG. 2. If the control system 5 is running in the automatic mode, the relay RY is energized and the relay contacts Ry are switched from their quiescent state. In the automatic mode, the differential analog voltage on the lines 180 can be summed with the tachometer feedback on the lines T1 and T2. If on the other hand, the control system 5 is operating in the manual mode, a voltage from the advance/retard switch at the front panel corresponding to the switch being moved to the advance or retard condition, is summed with the tachometer feedback on the lines T1, T2.

The tachometer feedback signal is a particularly noisy signal. The capacitors 480*o* and 480*p* are used to provide some filtering of the summed error signal. The operational amplifiers 456, 458 are connected as high impedance amplifiers with differential inputs so as to not load the tachometer feedback signal on the lines T1 and T2. Additionally, the operational amplifiers 456, 458 have a high common mode rejection ratio so as to minimize tachometer noise. The operational amplifier 460 is connected as an inverter. The two output operational amplifiers 462, 464 operate as comparators. One of the comparators 462, 464 will provide drive current to its associated output transistor 440, 442 depending on which direction the DC motor 24*b* is actually rotating. If one of the transistors 440 or 442 is conducting, its associated light emitting diode 492, 493 is also conducting and will be emitting light. The emitters of the transistors 440, 442 are connected by the lines 204, 206 to the optically coupled diode-transistor pairs 202 of FIG. 2. The signals on the lines 204, 206 provide a low voltage corresponding to the direction of rotation of the armature of the motor 24*b*. This low voltage enables the corresponding light emitting diode of the diode-transistor pairs 202 to conduct and provides a signal which can be sensed at the input port C of the input port element 164.

Figure 16:
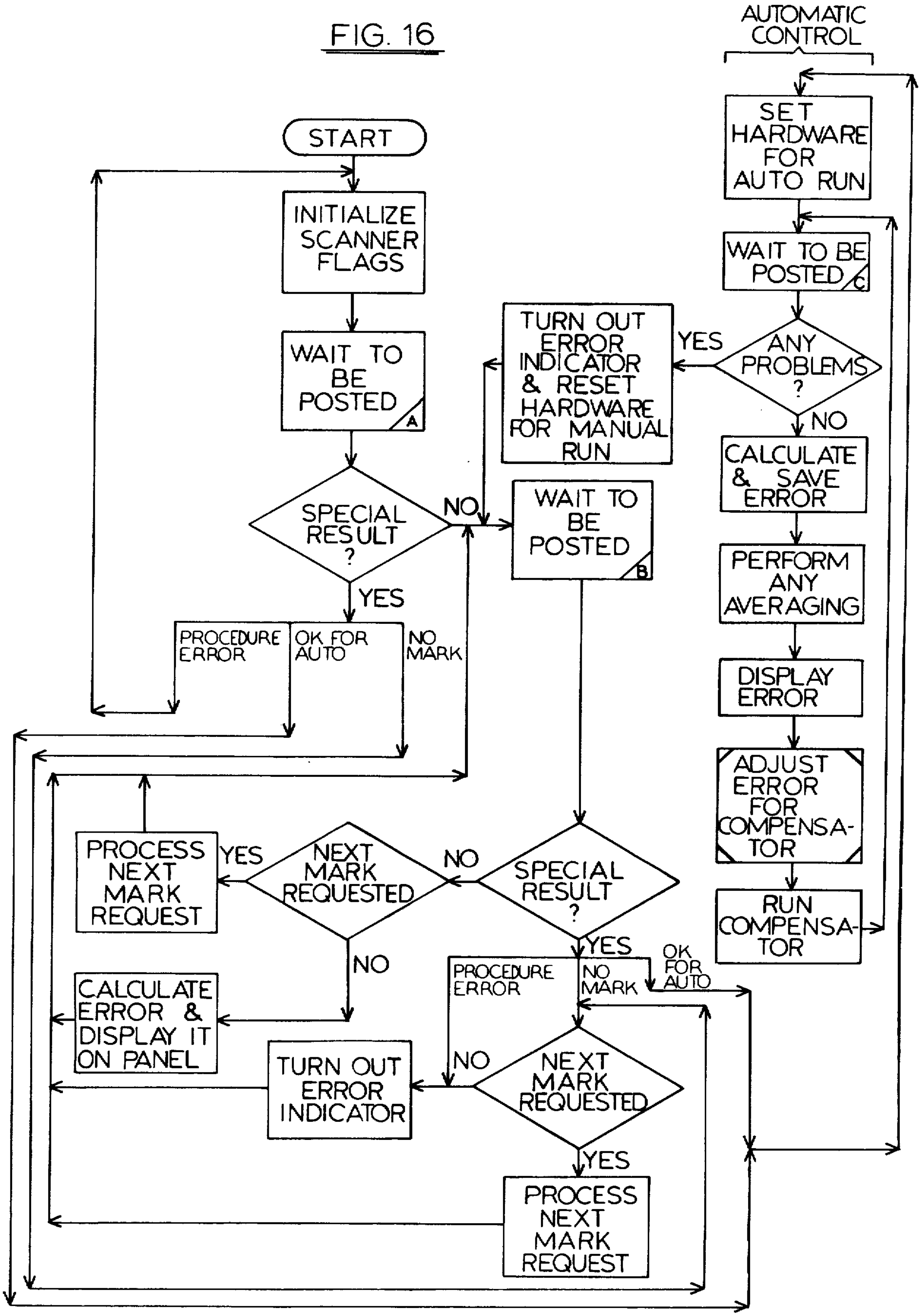
FIG. 16 is a flow chart of the control task.

In order to activate the automatic/manual relay coil RY shown in FIG. 16, the emitter of the photo-transistor 216 in FIG. 2 is grounded and a signal is brought from the collector of the transistor and connected at the line 218*a* of FIG. 16. When the line 218*a* is grounded, the light emitting diode 448*a* conducts and emits light which causes the photo transistor 448*b* to conduct. The transistors 448*b* and 444 are connected as a Darlington pair. When the transistor 448*b* conducts, the transistor 444 conducts. In this case, the relay coil RY has a voltage of approximately V volts applied across it, thereby energizing the relay. In this condition, with the coil RY energized, the associated relay contacts are switched so that the servo system of FIG. 6 receives differential analog signals on the lines 180 from the control system of FIG. 2.

A series of voltages is generated by the regulators 418 through 424. The regulators 418-424 are powered by the power transformer 402 whose output is rectified by the diodes 470, 471 and the bridge rectifier 412. The transformer 402 may be set for 110 or 220 volt operation by adjusting the jumpers 402*a*. The transformer 400 may be set for 110 or 220 volt operation by adjusting the jumpers 400*a*.

It should be noted that the conditioned tachometer feedback signals on the lines 204, 206 provide a signal to the control system 5 which indicates actual rotation of the output shaft of the compensator motor 24*b*. This signal is sensed by the processor 7 and used to enable turning on lights at the operator display panel through the display panel port 21.

OPERATION OF CONDITIONING AND CONTROL CIRCUITS 37

Figure 7:
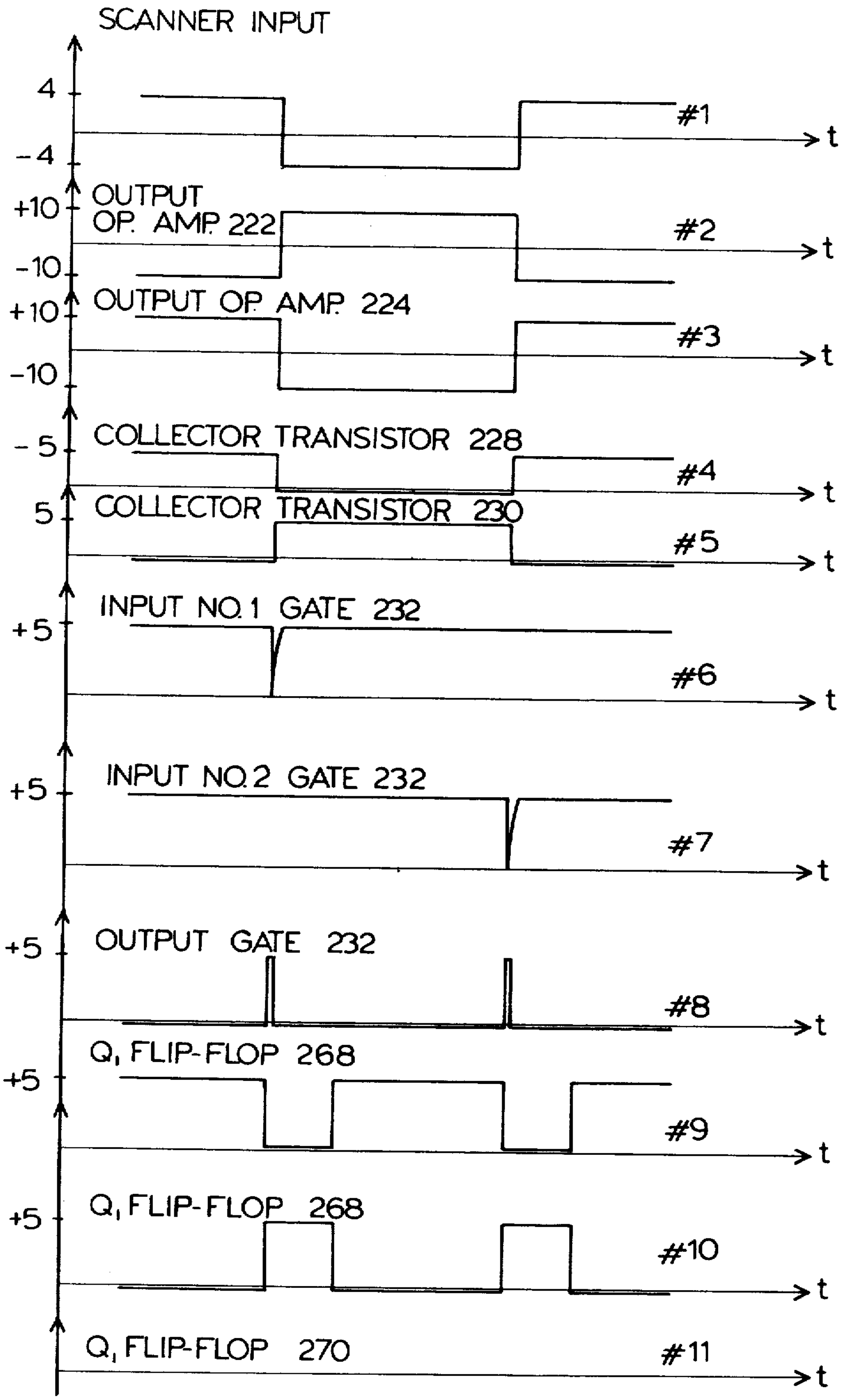
FIG. 7 is a timing diagram disclosing operation of the conditioning and control circuits.

The operation of the conditioning and control circuits 37 will be described with respect to the timing diagram shown in FIG. 7. In FIG. 7, the topmost waveform represents a scanner input on the line 27 from Scanner A to the conditioning and control circuits 37. The waveform shown at the top of FIG. 7 represents an input from a scanner where a black mark on a light web has been sensed. The second waveform on FIG. 7 is the inverted and amplified output of the operational amplifier 222. The third waveform on FIG. 7 is the inverted output from the operational amplifier 224. The output from the operational amplifier 224 has the same polarity as does the signal on the scanner input line 27. The fourth waveform on FIG. 7 is the signal at the collector of the transistor 228. This signal swings between positive five volts and ground. The fifth waveform on FIG. 7 is an inverted signal which is seen at the collector of transistor 230. The sixth waveform on FIG. 7 corresponds to the downgoing signal at the collector of transistor 228 after that signal has been differentiated. The seventh waveform on FIG. 7 corresponds to the downgoing signal at the collector of the transistor 230 after that signal has been differentiated. The eighth waveform on FIG. 7 represents a pair of positive going pulses at the output of the gate 232. Each positive going pulse corresponds to either a leading edge or a trailing edge of the scanner input on the line 27.

Waveform number 9 on FIG. 7 is a downgoing signal from the negated side of flip-flop 268. Flip-flop 268 is the "Mark Sensed" flip-flop and is set each time a pulse appears at the output of the gate 232, provided that the pulse has occurred during the window or inspection zone for Scanner A. Waveform number 10 is the asserted output of the "Mark Sensed" flip-flop 268.

During the time interval which corresponds to the window or inspection zone, the input on a line 51*a* the output of the window counter 51 for Scanner A, to the inverter 266 will be low or approximately zero volts. The output of the gate 266 on a line 266*a* will be high. The signal on the line 266*a* is connected as one of the inputs to the gate 264. The other input to the gate 264 is connected to the output from the Schmitt Trigger gate 232. Thus, the leading or trailing edge pulses generated at the output of the gate 232 are ANDED with the presence of the inspection zone. When there is a pulse at the output of the gate 232 during the inspection zone interval, the gate 264 is enabled and clocks the input to the flip-flop 268. When the flip-flop 268 is set, an interrupt is generated at the interrupt line RST 6.5 corresponding to the Scanner A interrupt by the line 268*b*.

The operation of the conditioning and control circuits associated with the Scanner B are exactly the same as previously discussed for the conditioning and control circuits 37.

OPERATION OF REAL TIME COUNTERS 43 THROUGH 53

The encoder counter 43 associated with Scanner A and the encoder counter 45 associated with Scanner B which are located in the chip 280, are always counted down from a maximum number of encoder counts per revolution of the associated cylinder, either 20,000 or 40,000. The encoder counter 43 and the encoder counter 45 are each set to a maximum number of counts per revolution 20,000 or 40,000 each time a reference signal is sensed on the line 31. During a revolution of the associated press cylinder the counters 43, 45 are counted from their maximum value down to 0. At the end of the current revolution of the press cylinder they are reset to their maximum value and again counted down. If only one scanner, Scanner A is being used, encoder counter 45 does not perform any function. The delay counter 47 associated with Scanner A and which is implemented on the chip 282 in FIG. 2 is gated to start counting from a preset count down to 0 by a pulse transmitted through the gate 265. Whenever the flip-flop 268 has been set, corresponding to a mark having been sensed during a window or an inspection zone, a downgoing signal is transmitted along a line 268*a*, through the gate 265 and to a gate input of the counter 47 triggering the down counting of that counter. The counter 47 is counted down by clock pulses on the line 47 from the press encoder. When the delay counter 47 associated with the Scanner A has counted to 0, it generates the signal on the line 59 which gates the window counter 51 associated with the Scanner A. The window counter 51 is always present to the number of counts corresponding to the length of the inspection zone or the inspection window. The window counter 51 once gated on is counted down to 0 by the encoder pulses on the line 35*b*. An output signal on the line 51*a* from the window counter 51 is coupled through the inverter 266 and provides one input to the gate 264. During the time interval when the window counter 51 associated with Scanner A is being counted to 0, the signal on the line 51*a* is essentially at 0 volts. The output of the inverter 266 is thus high and the signal on the line 266*a* enables the gate 264. Additionally, the high signal on the line 266*a* can be supplied through an inverter 266*b* to provide a window signal to a lateral control circuit corresponding to the control circuit of FIG. 2.

A typical sequence of operation associatable with the encoder counter 43, the delay counter 47, the window counter 51 and the digital processor 7 would includes the following steps: at a selected period of time, the window counter 51 associated with the Scanner A is gated and it starts counting down from its maximum count towards 0. The process of gating the window counter 51 outputs a low signal on the line 51*a*, which is coupled through the inverter 266 and connected by the line 266*a* to the gate 264. The gate 264 is enabled by the high signal on the line 266*a*. The next mark is sensed to generate a positive going pulse at the output of the Schmitt trigger gate 232. This positive going pulse will be coupled through the gate 264 and will clock the flip-flop 268. When the flip-flop 268 is clocked, it is set and applies an upward going signal to the interrupt applying RST 6.5 of the processor 7. The inner applying RST 6.5 is associated with an interrupt having been generated by Scanner A. Simultaneously, on the line 268*a*, the flip-flop 268 will apply a low going signal which is transmitted to the gate 265 and which triggers the delay counter 47 associated with Scanner A. The delay counter 47 had previously been preset to a specified number. The processor 7 in responding to interrupt from the Scanner A puts out an address on the higher order half of the address bus 9*b* with the bits $A_{14}$ and $A_{15}$ set to a "ONE". The bit $A_{14}$ set to a "ONE" is coupled through a line 295*a* to an inverter 296*a* and to the chip select line input of the chip 282. Simultaneously, the output bit on the line $A_{15}$ is coupled through a line 295*b* through the inverter 296*b* to the not chip selected input of the 280 chip. When the elements 280, 282 are not selected the contents of each of the counters, 43, 45, 51 and 47, 49, 53, respectively, are blocked from being counted further by the encoder pulses on the line 47. The processor 7 is now able to interrogate the delay counter 47 associated with the Scanner A to determine what its count was at the time that counter was latched. The latched value of the encoder counter 43 may also be determined by the processor 7. The processor can subtract the initial value from which the delay counter 47 started counting from the latched value just read from the delay counter 47. The purpose of this calculation is to determine the number of counts the counter 47 has been counted down during the time interval between when the flip-flop 268 generated an interrupt signal on the line 268*b* and the time when the processor 7 was able to respond to that interrupt signal. The difference between the initial value of the delay counter 47 and the final value as just read by the digital processor 7 corresponds to the latency interval. The processor can then determine the precise value of the leading edge of the mark, in encoder counts, by adding to the value of the encoder counter 43 which has just been read by the processor 7 the delta calculated instep E above between the initial and the latched valued of the delayed counter 47. The processor 7 can then issue a clear A instruction on the line 268*c* which will reset the two flip-flops 268, 270. (H) The processor 7 can then determine the new value to be set into the delay counter 47 so that when the delay counter 47 has been counted down to 0, the window, which is determined by the window counter 51 will be precisely centered with respect to the now present location of the mark. Assuming that an encoder is being used which generates 20,000 counts per revolution of the associated press cylinder FIG. 8 schematically indicates that the count to be set into the delay counter so that the window will be centered with respect to the location of the most recently detected mark corresponds to the number of encoder counts per revolution, 20,000, minus the present location of the mark minus ½ the window width, the number of counts in the window counter, plus the present location in encoder counts corresponds to the value to which the delay counter 41 should be set. (I) The processor 7 can then load the delay counter 47 with the count which is just been calculated. (J) the processor 7 then initiates down counting of the delay counter 47 by issuing an address on the upper half of the address bus 9*b* which is decoded and which generates a pulse on a line 265*a*, the start delay-A line. This pulse is transmitted through the gate 265 and gates on the delay counter 47 associated with Scanner A.

The above process can be repeated cyclically to continuously monitor the present location of the mark being sensed and also to continuously reset the location of the window so that it continues to be centered around the most recent location of the mark. This is a particularly important feature during transient periods perhaps when the press is speeding up or slowing down where the location of the mark might tend to shift with respect to the window. By dynamically readjusting the location of the window with respect to each sensed mark, the mark will stay within the inspection zone even during these transient intervals.

OVERVIEW OF CONTROL SYSTEM OPERATION

Figure 9:
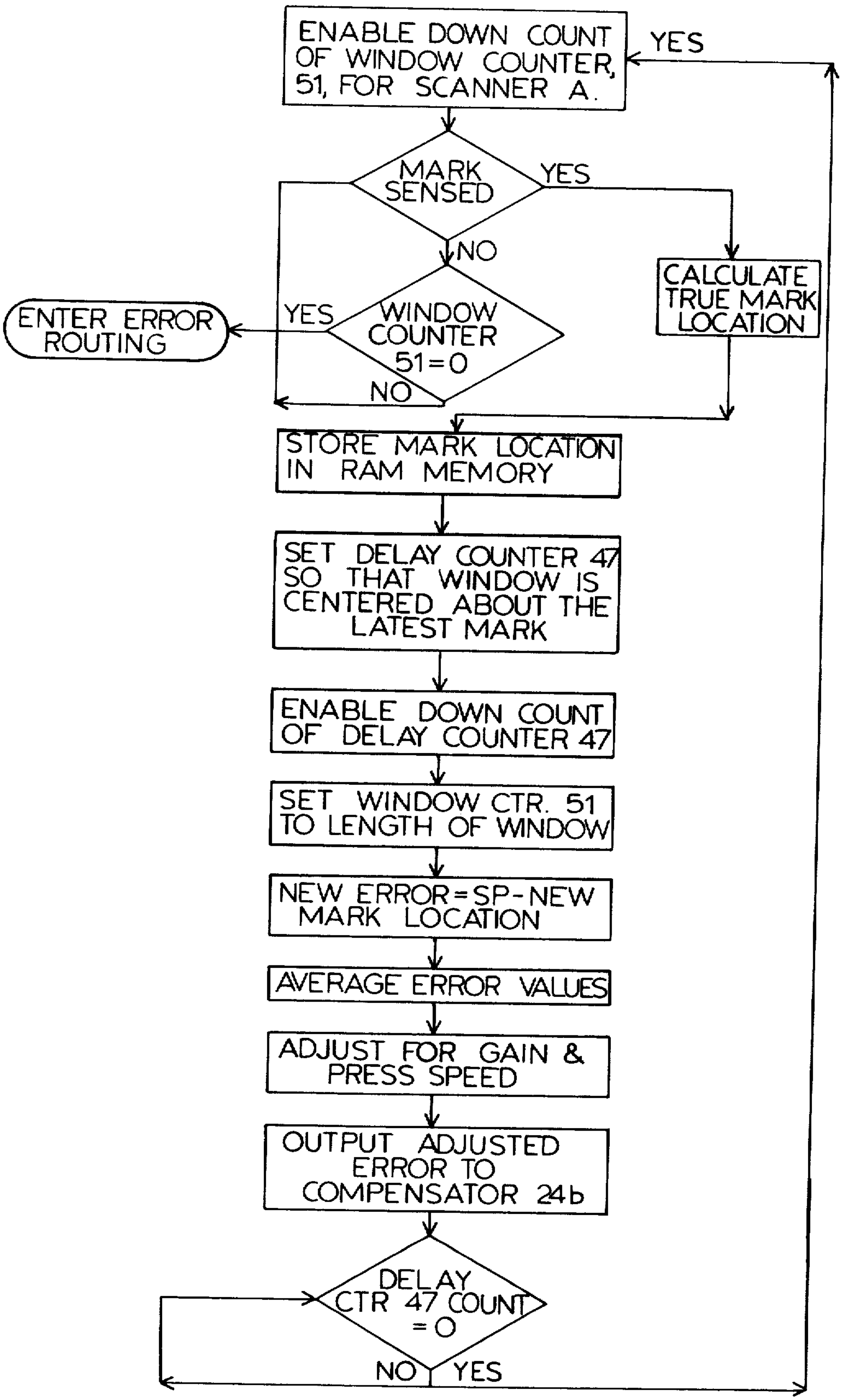
FIG. 9 is a flow diagram of the operation of the control system in the mark-to-reference mode.
Figure 10:
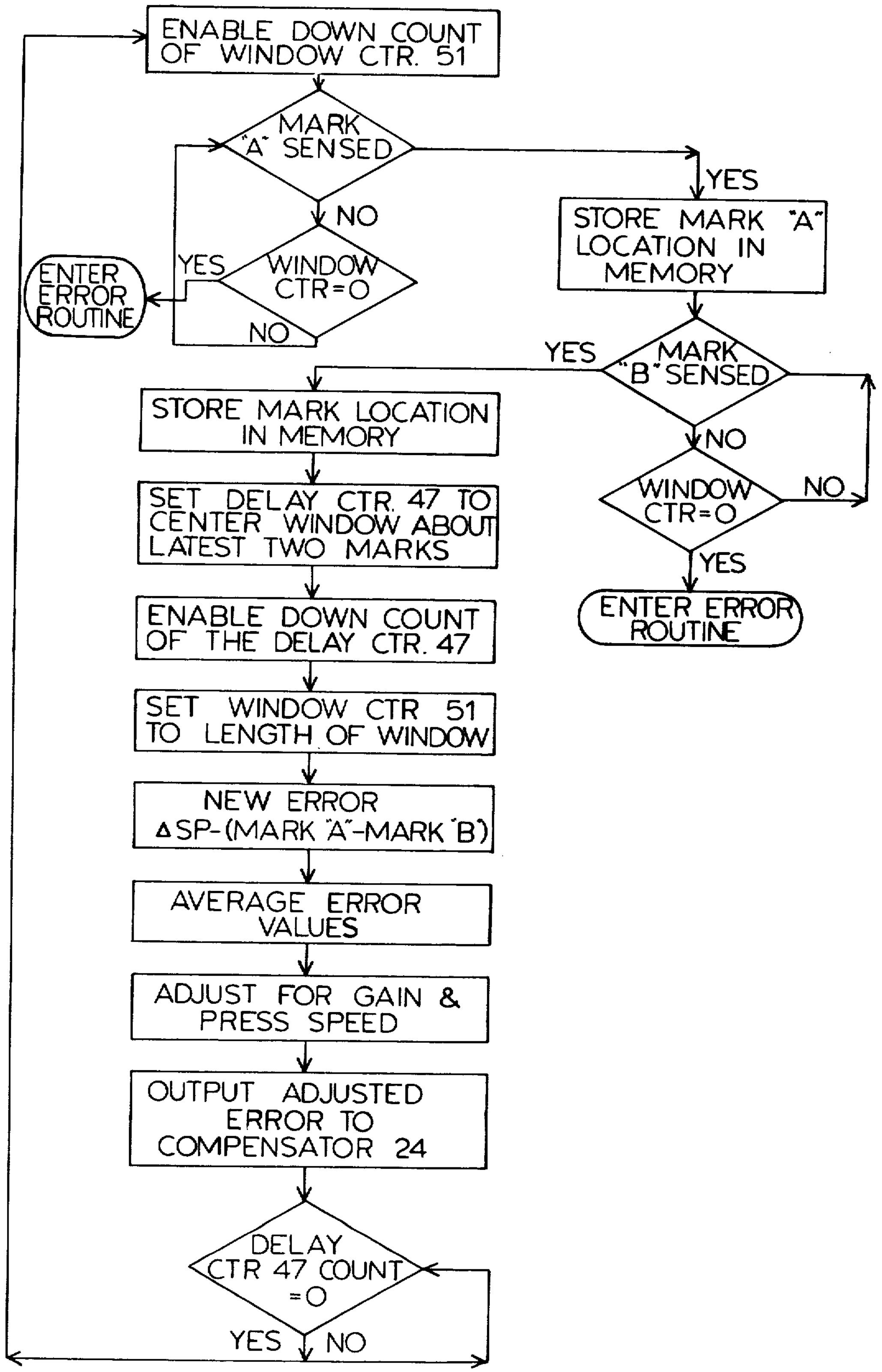
FIG. 10 is a flow diagram of the control system in the single scanner mark-to-mark mode.
Figure 11:
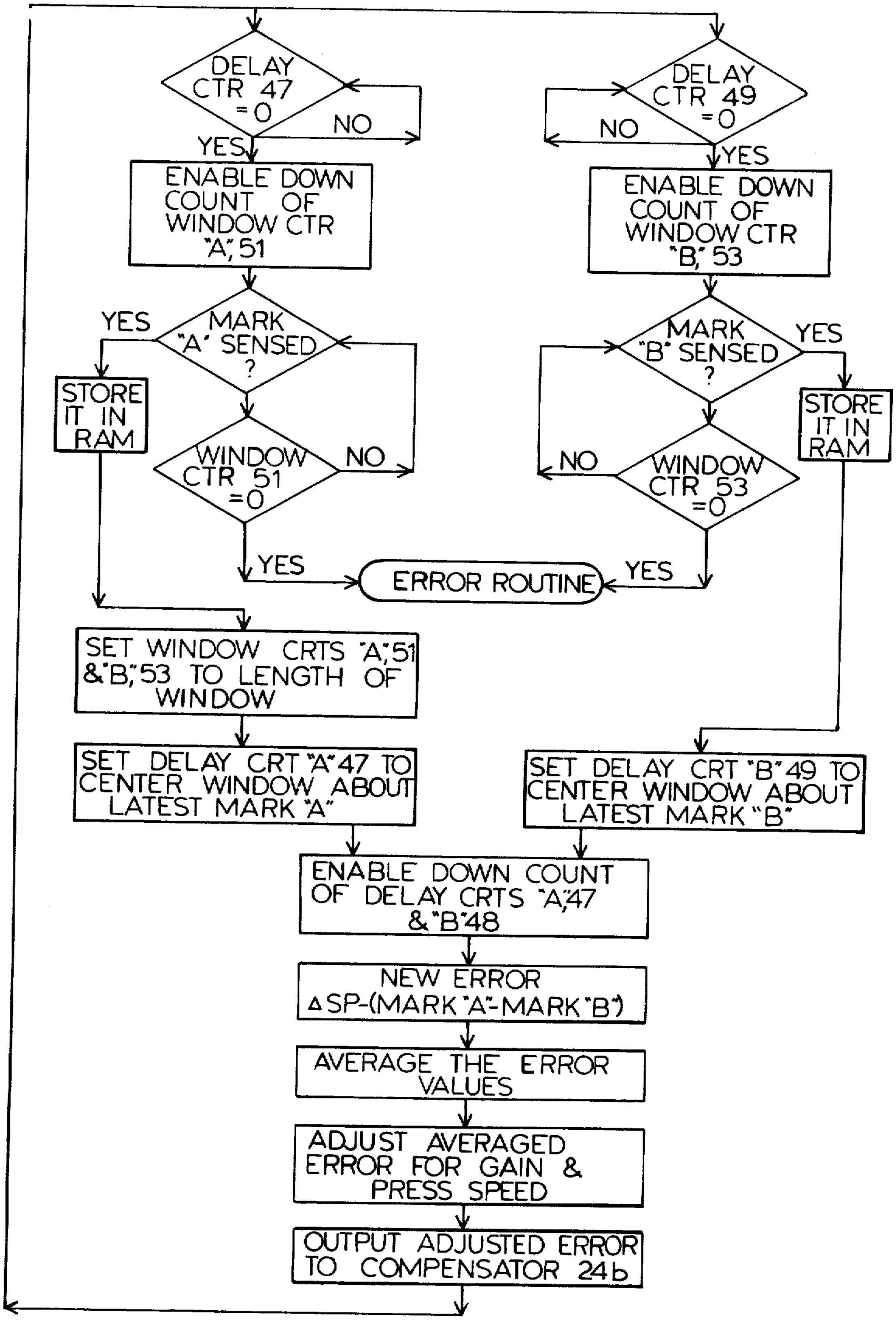
FIG. 11 is a flow diagram of the control system in the dual scanner mark-to-mark module.

FIGS. 9 through 11 disclose the overall operation of several different embodiments of the control system 5. FIG. 9 is a flow diagram of the sequence of operations associated with a mark to reference register control or a mark to reference cut-off control. FIG. 10 is an overall block diagram of a mark-to-mark, signal scanner register control. FIG. 11 is an overall block diagram of a mark-to-mark, dual scanner register control. The register controls of FIG. 9, 10 each uses a single scanner to sense marks on the web which are placed serially one after the other on the web. The circumferential register control of FIG. 11 is for use in installations where two scanners are used, and the marks are placed next to one another on the web.

With reference to FIG. 9, assuming that the control system 5 is running in the automatic mode with a set point previously selected, at a selected point in time, the window counter for Scanner A, 51, is enabled, and it starts to count down due to conditional press encoder signals on the line 47. Subsequently, the control 5 can sense a mark from Scanner A which is transmitted on the line 27 to the conditioning and control circuits 37. This mark must be sensed before the window counter 51 has been counted all the way down to zero.

If the mark has not been sensed before the window counter 51 has been counted to zero, the control system 5 enters an error routine which drops the control system out of the automatic mode by resetting the auto/manual flip-flop 210 and energizing an error, failsafe, light on the front panel.

When a mark has been found, assuming that the window counter 51 has still not counted all the way down to zero, the location of that mark, which is determined based on the count in the encoder counter 43 for Scanner A and a correction as discussed previously to compensate for latency in the response time of the processor 7, is stored in random access memory. The window counter 51 is then reset to the original preselected length of the window. Additionally, the delay counter 47 for Scanner A is set to a calculated initial value such that when the delay counter 47 has been counted down to zero, and the window counter 51 is enabled, the window defined by the time interval it takes to count the window counter 51 from its preset value down to zero will be centered about the location of the latest mark detected by the control system 5. The downcount of the delay counter has been enabled, and conditioned encoder pulses from the line 35*b* start to count down the delay counter 47 for Scanner A.

Subsequently, the processor calculates a new value of error which corresponds to the difference between the prestored set point (SP) and the location of the newest mark detected. Once the latest error value is calculated, an average error value over the last one, two, four or eight cylinder revolutions can be calculated. The number of error values used to determine the average error value is initially selected by the settings of the "AVE" dip switches 89.

Once an average error value has been determined, that value is adjusted for the gain of the system which is initially set by the "GAIN" dip switches 87, and the speed of rotation of the press cylinder whose register is being controlled if the compensator motor 24*b* is a DC motor. If the compensator motor 24*b* is an AC motor used as a stepping motor, only an adjustment for gain is made. The adjusted gain is then output along the data bus 11 to the motor control port 23. The sign of the error value determines the direction in which the motor drive electronics 24*a* causes the motor 24*b* to rotate. In the case where the compensator 24*b* is a DC motor, the signal supplied through the digital to analog converter 170 defines a velocity parameter for that motor. In the case where an AC synchronous motor is used as the compensator motor 24*b*, the error signal output through the motor control port 23 corresponds to a position displacement of the motor.

Subsequent to supplying adjusted error to the compensator 24*b*, the system 5 waits until the delay counter 47 for Scanner A has been counted down to zero. Once the delay counter 47 has been counted down to zero, the window counter 51 is again gated to repeat the control process.

Because of the fact that the delay counter 47 is set dynamically on each revolution the window which is defined by the count set into the window counter 51 for the Scanner A is dynamically readjusted in time as the sensed marks move back and forth along the cylinder due to varying speeds and web conditions.

The block diagram of FIG. 9 corresponds to either a register control wherein a single mark is compared to a reference or corresponds to a cut-off control where a single mark is compared to a reference.

FIG. 10 is a flow diagram which shows the operation of a circumferential mark-to-mark register control, using a single scanner. The information flow, as shown in FIG. 10 assumes that control system 5 is in the automatic mode with a previously established set point. In this case, the previously established set point corresponds to the difference between the two set point marks at the time the set register switch at the front panel was pressed by the operator.

At a selected point in time, the window counter 51 is gated that it can be counted down by the conditioned encoder pulses on the line 35*b*. During the time the window counter 51 is being counted down, the control system 5 can sense a mark. If a mark is sensed, which will be the first mark, before the window counter has been counted down to zero, the location of that mark in encoder counts is stored in a selected location in random access memory. Additionally, a second mark to be sensed so long as the window counter 51 has not been counted down to zero. If a second mark has been sensed, its location in encoder counts, is determined and stored in memory. If the system detects that the window counter has counted down to zero without having detected either a first or a second mark, it will enter the error routine which will light up the failsafe light on the front panel and which will take the system out of the automatic mode by resetting the auto/manual flip-flop 210.

Assuming the two marks have been properly detected during the time the window counter 51 was being counted down to zero, the window counter 51 is then reset to count corresponding to the desired length of the window. Additionally, a value is calculated and set into the delay counter 47 which will be generated by the window counter 51 around the latest two sensed marks. In this mode of operation, the length of the window corresponds to the interval between the two set point marks plus either 124 or 250 encoder counts which can be set initially by the "WINDOW" dip switch 89. The system 5 then enables downcounting of the delay counter 47 by the press encoder pulses.

A new error value is calculated which corresponds to the difference between the offset of the two set point marks (DSP) and the offset between the two marks which have just been sensed. The system 5 can then calculate an average error depending on the selected number 1, 2, 4 or 8 average. Once an average error value has been selected, it can be adjusted for gain and press speed (in the case of a DC motor) and the adjusted error can be output through the motor control port 23, through the motor drive electronics 24*a* to the compensator motor 24*b*. When the system 5 senses that the delay counter 47 for Scanner A has been counted down to zero, it will re-enable downcounting of the window counter 51, thus restarting the loop.

It should be noted that, as in the case of FIG. 9, the mark-to-mark single scanner register control system of FIG. 10 dynamically readjusts the value in the delay counter 47 on a per revolution basis so that the window, to be used in the next revolution, is centered about the two most recently sensed marks. Thus, if the sensed marks start to move with respect to the set point marks, due to variations in press system parameters, the mark sensing window will dynamically follow them, enabling the system 5 to continue to track the location of the mark.

FIG. 11 discloses the information flow in the control 5 when it is used to control register, on a mark-to-mark basis utilizing two Scanners A, B. In this instance, the marks are placed on the web laterally with respect to one another so that two independent Scanners A, B are necessary to detect them. Scanner A is offset laterally with respect to Scanner B. The control system 5, in this mode of operation, senses whether the delay counter 47 for scanner A has been counted down to zero. It also senses whether the delay counter for Scanner B, 49, has been counted down to zero. Whenever the delay counters 47, 49 go to zero, they enable their respective window counters 51, 53. The conditioned press encoder signals on the line 35*b* may then start to count down each of the enable window counters. While the window counter 51 for Scanner A is running, mark A can be sensed. If it is sensed before the window counter 51 has been counted to zero, its location in encoder counters is determined and stored in random access memory. If mark A has not been sensed before the contents of the window counter 51 for Scanner A has been counted down to zero, the system 5 enters an error routine.

turning on the failsafe signal and resetting the automanual flip-flop 210.

While the window counter 53 for the Scanner B is being counted down toward zero, a mark B can be sensed. If the mark B is sensed before the window counter 53 has been counted down to zero, its location in encoder counts is determined and stored in random access memory. If a mark B has not been sensed before the window counter 53 has been counted down to zero, the system 5 enters an error routine corresponding to that previously described.

In this mode of operation, the Scanner A is set to sense a mark which will come later in time than the mark sensed by the Scanner B. Thus, once the mark A has been sensed, implicitly both marks have been sensed, assuming the system is operating properly. After the mark A has been sensed, the window counters 51, 53 are reset corresponding to the preselected length of the window. This is determined by the setting of the "WINDOW" dip switch 89. Subsequently, the delay counters 47 and 49 for Scanners A and B, respectively, are again set with a count such that when they are counted down to zero the windows determined by the window counters 51, 53 will be centered with respect to the two marks A and B just sensed. The two delay counters 47, 49 are then enabled, and the conditioned encoder signals on the line **35*b* are permitted to count the counters 47, 59** down toward zero.

The system 5 can then calculate a new value which corresponds to the difference between the offset of the set point marks (DSP) and the offset between the two marks A and B which have just been sensed. The new error value can be averaged with the previously determined error values, and the averaged error value can then be adjusted for gain and press speed, assuming the compensating motor **24*b* is a DC motor. The adjusted error value can then be output through the motor control port 23, through the motor drive electronics 24*b* to drive the web or cylinder compensator motor 24*b*. The system 5 will then wait until one of the delay counters 47 or 49** has been counted down to zero.

As in the case of the operation of the embodiment shown in FIG. 9 and FIG. 10, the system 5, when operating as shown in FIG. 11, is able to dynamically readjust the location of the window for both Scanner A and Scanner B by dynamically readjusting the values set into the delay counter 47 or the delay counter 49 on a per revolution basis of the printing cylinder.

DESCRIPTION OF THE CONTROL SEQUENCE

FIG. 12 are flow diagrams of the control sequences used by the processor 7. These control sequences are stored unalterable by the processor 7 in the read only memories 67, 69. FIG. 12 is an overall block diagram of the control sequence for the system 5. When power is first applied to the system 5, a power up interrupt is generated, and the processor 7 jumps through location zero to the start of the operating system, which is hard wired into the read-only memory 13. The operating system then executes an initialization sequence which reads the settings of the dip switches 87, 89, sets up the parameters on the real time clock which is located in the input port 17, and zeroes out the 512 bytes of random access memory in the output port 164 and the input port 85. The initialization sequence then returns control to the operating system which then initializes the flags to run the three primary systems tasks, the monitor task, the control task, and the front panel task. The monitor task and the front panel task are each run in sequence after each 10 millisecond real time clock interrupt, or tick, generated by the real time clock in the input port 17. If the monitor task or the front panel task posts the control task or sets appropriate flags, after the monitor task has completed execution of its required operations, the control task will be executed before the front panel task is executed again.

Generally, it is the function of the monitor task to monitor the operation of the real time counters, it is the function of the control task to actually generate the necessary error values and provide output to the motor control port 23, and it is the function of the front panel task to sense switch inputs from the display panel.

FIG. 13 is a block diagram showing an overall view of the six interrupt driven control sequences within the control system 5. The left-most interrupt sequence in FIG. 13 is a power-up interrupt sequence which merely forces the processor 7 to begin executing at location zero. The next interrupt routine is the Scanner B interrupt routine which, when an interrupt signal is sensed on the interrupt line RST 5.5 by the processor 7 due to Scanner B having sensed a mark, the processor 7 is forced to execute the Scanner B interrupt handler sequence starting at location 2C hexadecimal. Similarly, in response to Scanner A having sensed a mark, the Scanner A interrupt routine, due to having sensed the signal at the interrupt port RST 6.5 of the processor 7 forces the processor 7 to start executing the Scanner A interrupt handler routine at location 34, hexadecimal. The real time clock interrupt handler routine responds to a real time clock interrupt on the line RST 7.5 of the processor 7 which forces the processor 7 to start executing the real time clock interrupt routine starting at location 3C hexadecimal. The external bus interrupt handler senses an interrupt generated by the external bus 20 on the line labelled INT of the processor 7 and forces the processor 7 to start executing the external bus interrupt service routine at location 38 hexidecimal. A last interrupt service routine, the power fail interrupt routine a power fail signal on the line labelled TRAP of the processor 7 which forces the processor 7 to start executing the power fail interrupt service routine at the location 24 hexidecimal.

The power up interrupt and the power fail interrupt both turn control over to the operating system. The Scanner A interrupt routine, the Scanner B interrupt routine, the real time clock interrupt routine and the external bus interrupt routine all return control to the routine which is previously being executed at the time the processor 7 detected that respective interrupt.

Figure 14:
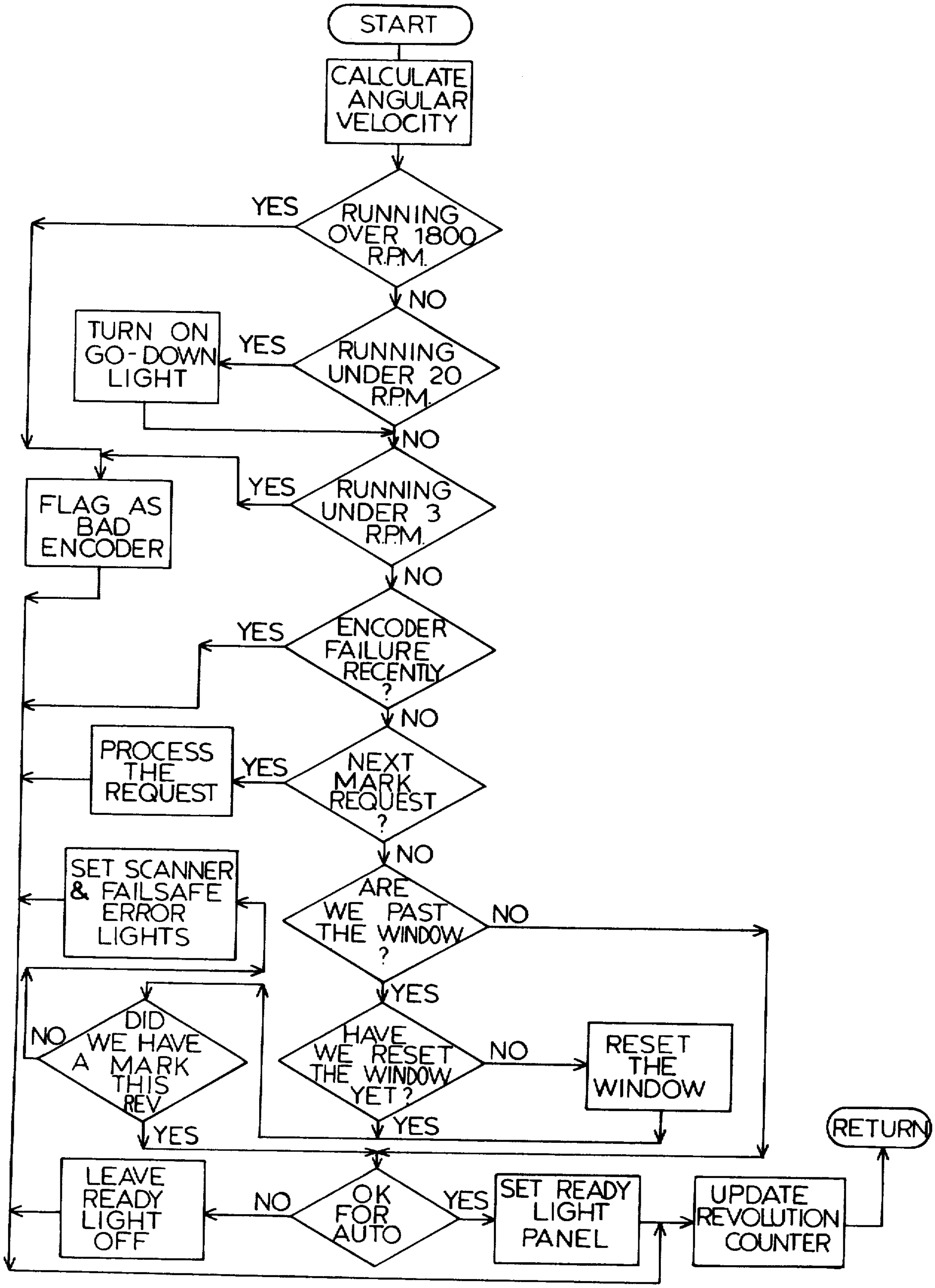
FIG. 14 is a flow chart of the monitor task.

FIG. 14 is a block diagram showing the operation of the monitor task. The monitor task, which is entered from the operating system, first calculates the angular velocity of the associated printing press cylinder. Recall, that the monitor task is executed immediately after each real time clock interrupt. Once the monitor task is started, it reads the value in the encoder counter 43 for Scanner A and compares it to the value previous stored, which was read from the encoder counter 43 of Scanner A the last time the monitor task was executed. Since each real time clock interrupt occurs 10 milliseconds after the previous interrupt, the monitor task is now able to calculate the angular velocity of the associated printing press.

Once this velocity has been calculated using the current value read from the encoder counter 43 from Scanner A and the previous value read from the encoder counter 43 of Scanner A, the monitor task checks to see whether the press is running at over 1800 rpm. Generally speaking, the press will never run over 1800 rpm, and if it does appear to be running over 1800 rpm, the system is probably suffering from a defective encoder. The monitor system than flags a status bit indicating that either the encoder is defective or the press has been stopped and posts the control task. The last thing the monitor does then is update a revolution counter which simply provides a software count of a continuing number of revolutions of the press. The monitor task then returns to the operating system.

If the press does not appear to be running at over 1800 rpm, the monitor system then checks to see whether it is running under 50 rpm. If the press is running under 50 rpm, it turns on the "go down" light on the front panel, indicating that the press is being turned off. In this instance, control is impossible, and the monitor system exits through the same path as if it is sensed that the press was running over 1800 rpm. If the press appears to be running below 1800 rpm but above 50 rpm, the monitor system checks to see whether or not there has been an encoder failure detected during the last 10 times that the monitor task has been run. If during the last 10 milliseconds the monitor has detected that the press has been either running over 1800 rpm or under 50 rpm, it is necessary that the monitor routine be executed a total of 10 times without either condition being detected before it proceeds with its further processing. If there has been a recent encoder failure sensed, the monitor routine merely updates the revolution counter and then exits.

If there have been no recently detected encoder failures, the monitor task then checks to see whether or not the next mark button on the front panel has been depressed. If the monitor routine senses that the next mark button has been depressed, when the system is running in the manual mode, it processes that request by calling a routine which will load the window counter 51 for Scanner A with its maximum count to provide the longest possible window. Then, the monitor routine will check to seen if the next mark has been found. If no mark has been found, the monitor routine exits, updating the revolution counter if appropriate and returns to the monitor. After each real time clock interrupt when the monitor senses that an incompleted next mark request has been made, it will again check to see if a next mark has been found. The monitor will continue trying to find a next mark until one is found. Once the system has found the next mark, corresponding to the Scanner A interrupt routine having been called in response to a signal on the line RST 6.5 of the processor 7, the monitor will post the control task which will cause it to be run by the operating system at the completion of the return from the monitor.

It a next mark has not been requested, the monitor checks to see if the system has gone by the window. That is to say, it checkes to see whether or not the value in the encoder counter 43 for the Scanner A is greater than the sum of one-half of the count which is loaded into the window counter 51 plus the encoder count which had been stored for the mark which was sensed in the last revolution. If the monitor determines that the window has not been closed, it will then go on to see whether or not it should set an auto flag which corresponds to whether or not the auto/manual flip-flop 210 is set to the auto mode and whether or not the speed is above 50 rpm. If the conditions are appropriate to enter the auto mode, the "automatic" indicator light on the front panel will be turned on, if necessary the monitor will updata the revolution counter, and then it will exit.

If, on the other hand, the monitor determines that we have passed the window, it first checks to see whether or not we have reset the window. This corresponds to the process of setting the delay counter 47 for Scanner A and the window counter 51 for Scanner A to the value of the delay counter which will center the window about the most recently detected mark and the value of the window counter 51 to that setting which has been previously read on the dip switch 89. The down counting of the delay counter 47 by the encoder pulses from the press on the line **35*b*** is also enabled. The window is only reset once each revolution, and if it has been set, the monitor checks to see whether or not a mark has been detected this revolution. If so, it posts the control task and then exits.

FIG. 15 is a flow diagram of the front panel task sequence. When started by the operating system, the front panel task performs a debounce test on each of the display panel switch closures which are sensed through the input port 17. The debouncing test includes checking to see if a given switch bit has been on for the past two real time clock interrupts. If so, that is considered a valid switch closure. If not, the switch closure is recorded, but no action is taken on it. If no valid switch closures were indicated, the front panel taks merely decrements a time-out counter which limits the rate of change of the set point by the advance and retard switches on the front panels. In the manual mode, the advance and retard set point switches directly operate the compensator motor 24B. In the automatic mode, the advance and retard set point switches increment and decrement the current set point by an amount set on the "ADVANCE RETARD COARSENESS" dip switch 87. This limits the rate at which an operator can vary the set point of the system.

If a value switch closure has been detected, the front panel task then determines which switch closure has occurred. If the advance or the retard switches have been depressed, the set point is either advanced or retarded, respectively. In the manual mode, this consists of advancing or retarding the motor **24*b* directly. In the automatic mode this consists of incrementing or decrementing the previously stored set point value by the amount determined by the dip switch 87. The auto/manual switch provides a signal which in turn can be used by the processor 7 to set or reset the auto/manual flip-flop 210**.

If the control 5 is in the manual mode, when the front panel task senses that the set register button for the front panel has been depressed, it takes as a new set point the location of the most recently sensed mark, if the system 5 is operating in the mark-to-reference mode, or the offset between the two most recently sensed marks if the system is operating in a mark-to-mark mode. The new set point is established immediately by the front panel task and the operator could continue to run with the control 5 in the manual mode for a period of time if he so chose. At some point when the operator is satisfied with the register of the associated press, he then depresses the auto/manual switch which puts the control 5 in the automatic mode, wherein it will directly control the motor **24*b***.

If the front panel task senses that the next mark switch has been depressed, which is only active when the control system 5 is in the manual mode, it sets a flag which is sensed by the monitor task. The monitor task will then process the next mark request. After the appropriate action has been taken depending on which switch has been depressed, a time-out counter for the advance or retard switch is decremented to limit the rate of change of the current set point. The front panel task then returns control to the operating system.

FIG. 16 is a flow chart of the control task which is called by the operating system based on flags which are set by the monitor task or the front panel task. On power up, the control task initializes flags associated with the scanner status. At that point the control task returns to the operating system and waits until it is called or posted. On return from the operating system, the control task initially checks to see whether or not a special request has been made of it. If a bad encoder has been sensed, corresponding to a procedure error, the control task re-enters its initialization segment, and then subsequently returns to the operating system. If the system 5 has been placed in the automatic mode by the operator, the control task then causes the processor 7 to execute a control sequence which is labelled "automatic control" in FIG. 12. If the control task senses that no mark has been detected, corresponding to the fact that the window has been closed, that is the window counter 51 for Scanner A has been counted down to zero without a mark having been sensed or the window counter 53 for Scanner B has been counted down to zero without a mark being sensed, the control task will then check to see whether or not a next mark has been requested. If so, it returns to the operating system and waits until the monitor task can process that request and post the control task again. If no next mark request has been made, the control task simply turns out the central column of lights on the control panel corresponding to the error indicator and again returns control to the operating system and waits to be posted. If, on return from the operating system, the control task has not detected any special request has been made corresponding to being in the manual mode, it puts itself back in the wait state and waits to be posted and again returns control to the operating system.

When the control task has been called by the operating system in response to either the monitor task or the front panel task, it first checks to see if a special result has been requested. If no mark has been detected, the control task checks to see if a next mark request has been made. If so, it is processed. If a procedure error is detected, the error indicator is turned off and the control task returns to the operating system. If the automatic mode is detected, the control sequence labelled "AUTOMATIC CONTROL" is executed.

Initially, in the "AUTOMATIC CONTROL" sequence the auto/manual flip-flop 210 will be set indicating that the automatic mode has been entered. At this point, the control task again waits to be posted. The control task does not access the real time data represented in the counters 43 through 53 directly. Rather, this is the function of the monitor task. The monitor task determines the position of the marks to be sensed on the web each revolution. Having found the mark or marks, the monitor task posts the control task which returns to entry point C from the operating system.

The control task, from entry point C, checks to see whether there is a hardware problem or whether the operator has released the auto/manual button and returned the control 5 to the manual mode or whether there is an indication that a mark has not been sensed on this revolution. If there are any problems, the control task turns out the error indicator signals, the central column of lights on the operator panel and resets the system hardware, and particularly the auto/manual flip-flop 210 to manual for manual operation. It then returns to the operating system and waits to be posted to re-enter through entry point B.

If there are not problems, the control task then calculates and saves the error. The error calculation is dependent on the mode of operation of the control system 5. The desired control mode is set on the "CONTROL MODE" dip switches 89 and may be read by the processor 7. In a circumferential register-to-register control mode, three different types of control are possible. In a lateral control mode or in a cut-off control mode, there will only be one mode of operation.

Where the control system 5 is being used as a circumferential control and the mode of operation is mark-to-reference, the error calculation is formed by subtracting the present location of the mark from the set point value. If the control system 5 is operating as a circumferential mark-to-mark control module, the difference between the two measured marks is subtracted from the difference between the set point marks to determine the error.

A cut-off control module uses the same error calculation as a circumferential register control module would use in a mark-to-set point control mode.

A lateral register control module would use essentially the same error calculation as would a circumferential mark-to-mark registration system except that in the lateral control system an additional step is necessary to first eliminate any circumferential errors.

Once the control task has calculated and saved the present error, it performs any necessary averaging, and then displays on the central panel of lights on the display panel the fact that there is an error and the fact that the compensator 24b is being driven in a direction to minimize that error. Finally, the control task supplies to the motor control port 23 an eight-bit error consisting of a sign and seven bits of magnitude which is then output through motor control electronics 24a to the compensator 24b.

Figures 17, 19:
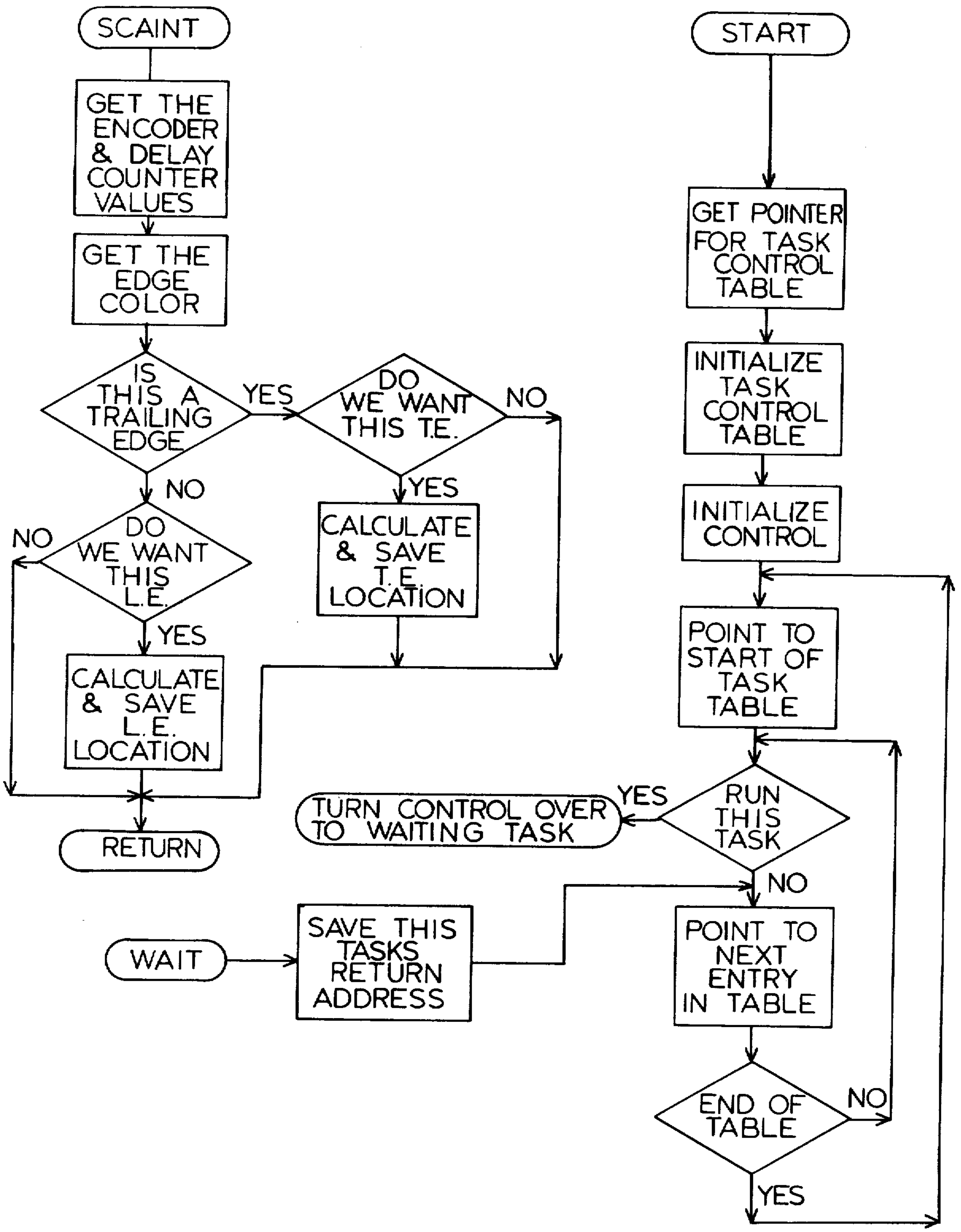
FIG. 17 is a flow chart of the scanner interrupt routine.
FIG. 19 is a flow chart of the operating system.

FIG. 17 is a block diagram of one of the scanner interrupt routines. The Scanner A, interrupt routine and the Scanner B interrupt routine are identical. The two merely respond to different scanner signals. When a scanner interrupt routine is entered in response to having received either a leading edge or a trailing edge from Scanner A on the line 27 or from Scanner B on the line 29, the interrupt routines first latch and then read the values in the encoder counter 43 and the delay counter 47 associated with Scanner A or the encoder counter 45 and the delay counter 49 associated with Scanner B. The scanner interrupt routine than makes a determination, based on the condition of the leading or the trailing edge flip-flop 270 and also on the setting of "WEB COLOR" dip switch 89, whether or not the mark which has been sensed is a light mark on a dark web, or a dark mark on a light web so that it will be possible to make a decision as to whether or not a leading or a trailing edge of the mark has been sensed.

If the edge which has been sensed is a leading edge, and if it is one that is a desired leading edge, the scanner interrupt routine removes the latency time interval which exists between the instant the interrupt occurred due to the scanner signal on the line 27 and the time when the encoder counter 43 for the Scanner A was read. Similarly, if the interrupt routine is for the purpose of handling interrupts in the Scanner B, the latency time interval between when the scanner signal was sensed on the line 29 and when the encoder counter 45 associated with Scanner B was read is removed to determine the true position of the sensed mark with respect to the top dead center position of the cylinder in encoder pulses. Once the correct position of the leading edge of the mark has been determined, the scanner interrupt routine returns control to the interrupted routine.

If the scanner interrupt routine senses that an undesired mark has been sensed within the window, one which either leads or trails the desired mark by more than a preset amount, that leading edge or trailing edge is rejected and the location of that mark is not saved.

Similarly, if the scanner interrupt routine determines that a trailing edge rather than a leading edge has been detected, if that is a desired trailing edge, its true position can be calculated and saved.

Figure 18A:
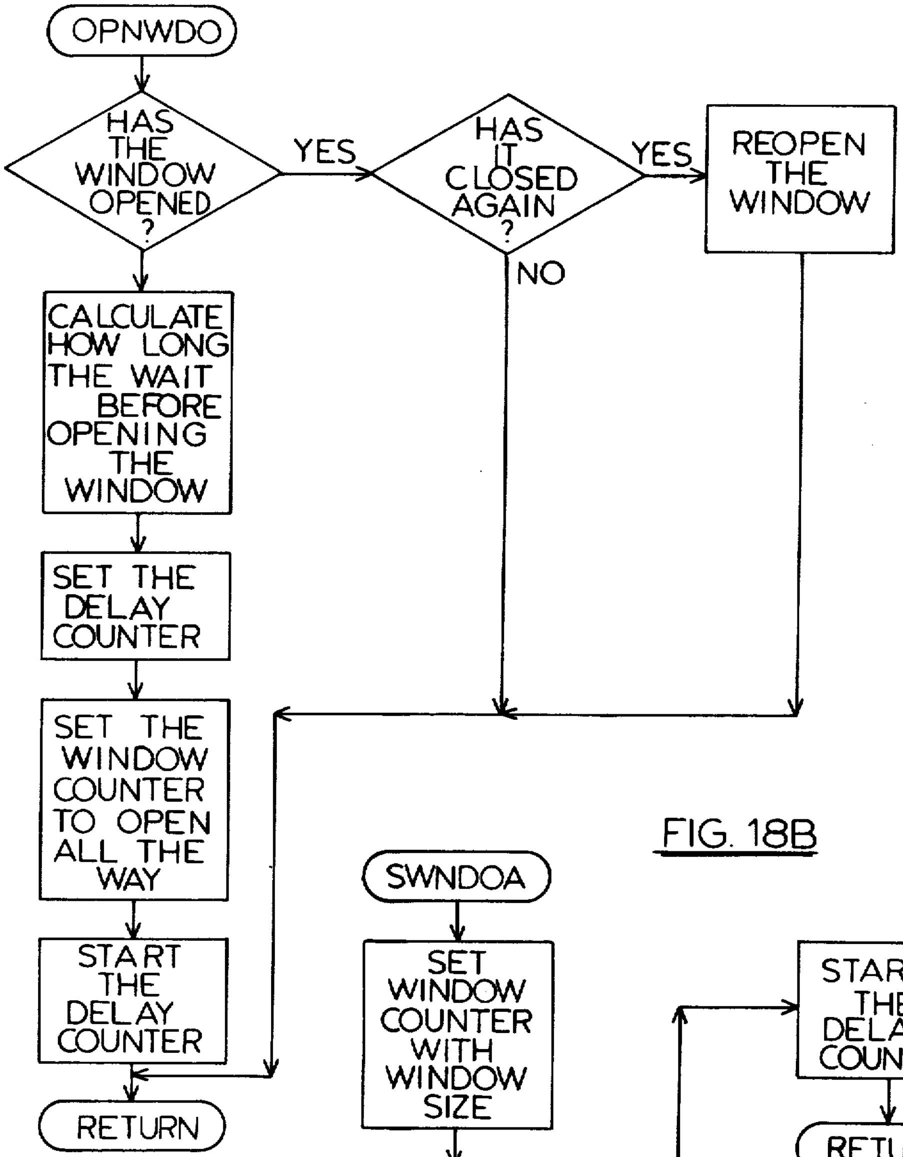
FIG. 18A is a flow chart of the open window routine.

FIG. 18A is a flow chart of the open window routine. The open window routine is a control sequence which is called by the monitor as part of its processing of a "next mark" request. The open window routine first checks to see whether the window, corresponding to the count in the selected window counter 51 or 53 has been opened. If this is the first time through the window routine and the window has as yet not been opened in response to the next mark request, the open window routine determines what the length of the present window is, and sets the appropriate delay counter, 47 or 49, so that its associated window counter, 51 or 53, will not start downcounting until a selected amount of time has occurred after the present mark has been sensed. This is to ensure that we do not start looking for the next mark until the present mark has passed the Scanner A or the Scanner B. The selected window counter, 51 or 53, is then set to its largest possible count. This corresponds to the window being opened as far as possible. The appropriate delay counter, 47 or 49, is then started which will, when it counts to zero, gate the associated window counter, 51 or 53, so that the encoder pulses on the line 35*b* will start counting down the appropriate window counter 51 or 53. At this point, the open window routine then returns to the monitor.

Alternatively, if the open window routine is entered from the monitor, and it senses that the window has already been opened the maximum amount, it simply checks to see whether or not the window is closed. This corresponds to checking whether or not the appropriate window counter, 51 or 53, has counted down to zero. If so, it merely resets the counter 51 or 53 to its maximum value again.

Figure 18B:
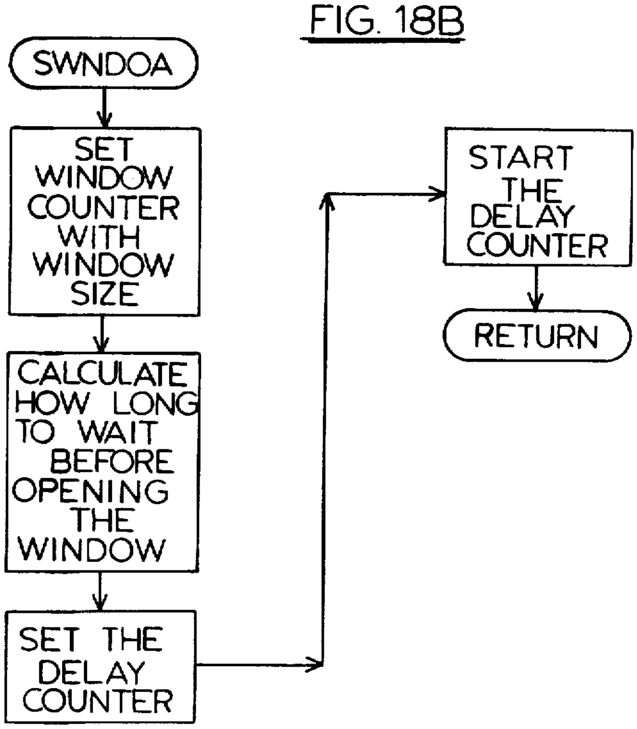
FIG. 18B is a flow chart of the set window routine.

A flow diagram of the set window routine appears in FIG. 18B. There is a set window routine associated with each of the window counters 51, 53. The set the window routine is called by the monitor task on a per revolution basis of the printing cylinder, whenever the monitor task determines that we have passed the window. The set window routine first sets the selected value into the window counter 51 or 53 associated with the Scanner A or the Scanner B. The selected value associated with the window counter 51 or 53 is determined in part by a setting of the "WINDOW" dip switch 89, as well as the control mode. In a mark-to-reference control mode whether a register operation is being carried out or whether a cut-off operation is being carried out, the window counter is merely proportional to the setting on the "WINDOW" dip switch 89. In a mark-to-mark type operation, the window counter 51 or 53 is set to a value which corresponds to the distance for the offset between the two set point marks and the setting on the "WINDOW" dip switch 89. Once the window counter has been set, the delay counter 47 or the delay counter 49 is set with a value such that the window determined by the corresponding window counter 51 or 53 will be centered with respect to the position of the presently detected mark. The delay counter 47 or 49 is then started.

FIG. 19 is a block diagram of the control sequence corresponding to the operating system. On start-up, the operating system gets a pointer for the task control table and initializes the task control table. The operating system then transfers control to a routine which is described in FIG. 20, and which initializes the control 5. Upon return from the initialization routine, the operating system points to the start of the task table, and then checks to see whether the current task should be run. If so, it turns control over to the task, either the monitor, the control task or the front panel task. If that task is not to be run, the operating system then checks the next entry in the table. if that task is to be run, it turns control over to that task. If not, it checks the next entry at the table. When the operating system gets to the end of the table, it goes back to the beginning of the table and starts over. The task table only has three tasks in it, the monitor task, the control task, and the front panel task. On a return from any task which has gone into a wait state, the operating system saves that task's return address and checks the next entry in the table. However, as a practical matter, the panel task and the monitor task once started run to completion except where the processor 7 responds to interrupts. As a result, the front panel and the monitor task each have only one entry point. Only the control task has more than one entry point.

Figure 20:
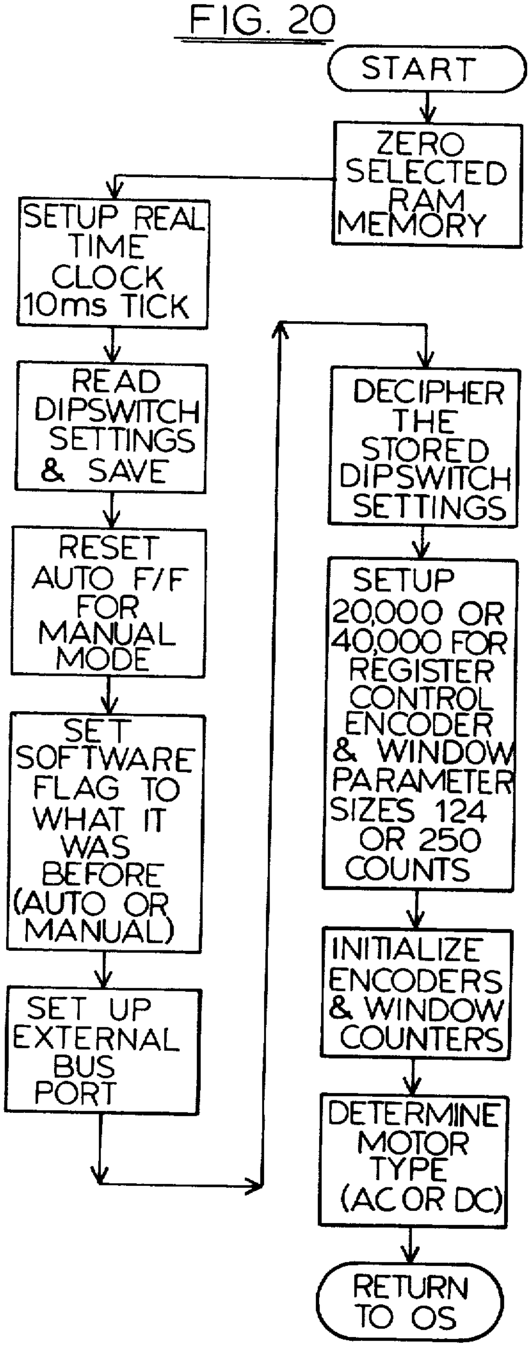
FIG. 20 is a flow chart of the initialization routine.

FIG. 20 is a flow diagram of the hardware initialization routine which initializes the control 5. Upon entry from the operating system, the initialization routine zeroes the random access memory in the output port chip 164 and the input port chip 85. The random access memories 73, 75 are never disturbed. The random access memories 73, 75 are used to store information such as the set point, and other information which is desirable to have available in case of a power failure or a shut-down so that the press can be brought up to its previous operating conditions immediately. The hardware initialization routine then sets up the real time clock in the input port chip 85 to generate an interrupt every 10 milliseconds, and it reads the settings of the cip switches 87, 89 and saves them. Further, the hardware initialization routine resets the control flip-flop 210 to the manual state and then sets a software mode flat, to whatever state it was in, automatic or manual, before the power failed. The initialization routine also sets up the external bus communications port 19. If the control system 5 is being used as a register control unit, it can receive or transmit information along the bus 20. If the control system 5 is being used only as a cut-off unit, the communication bus 20 is replaced with a set of thumbwheel switches which can be used to set up an initial set point for cut-off. The settings of the dip switches 87, 89 are decoded. Using the settings of the dip switches 87, 89 an encoder parameter, either 20,000 or 40,000 pulses per cylinder revolution for register control can be set up, and a window parameter corresponding to either 124 or 250 encoder counts can also be set up. Subsequently, the encoder counters 43, 45 are initialized with the correct 20,000 or 40,000 encoder counts and the window counters 51, 53 are initialized with the correct 124 or 250 encoder counts. The initialization hardware routine also checks to see whether the motor 24B is a DC type motor or an AC type motor. Control is then returned to the operating system.

Figure 21:
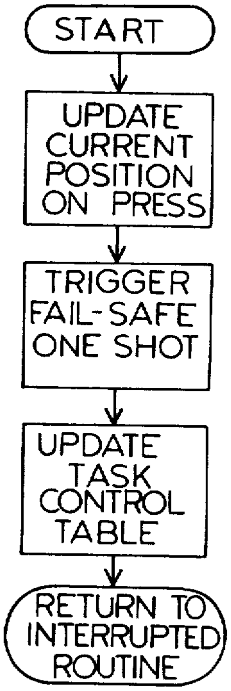
FIG. 21 is a flow chart of the real time clock interrupt routine.

FIG. 21 is a block diagram of the real time clock interrupt routine. When the real time clock counter in the input port chip 85 counts down to zero and generates an interrupt the interrupt handle first saves the old value read from the encoder converter 43 and reads a new value. These two values can be used by the monitor routine to determine press speed. The fail-safe one-shot 212 is also retriggered by a signal from the "SOS" output port of the processor 7. Finally, the routine updates the task control table to indicate that a real time clock interrupt has recently been received. Control is then returned to the interrupted routine.

THE ERROR AVERAGING ROUTINE

The error averaging routine executed by the control task has been designed to optimize the performance of the control system 5 independently of the mode of operation of the control system. The error averaging process can involve 1, 2, 4 or 8 averages which are selected by setting the "AVE" dip switches 89. Based on the selected number of averages, a buffer of length 1, 2, 4 or 8 random access memory locations is maintained, wherein the last 1, 2, 4 or 8 error values, including a sign are stored. Each time a new value of error is calculated by the control task, the newest value is added into a running total which is maintained of the contents of the 1, 2, 4 or 8 location buffer and the oldest value is subtracted out. Thus, a cumulative total of the selected number of averages is maintained. This cumulative total is then divided by the preset number of averages to form an average error.

Once an average error has been formed, a comparison is made between the absolute value of the most recently formed average error and the absolute value of the last error value. The control task then establishes a base error by selecting the smaller of the absolute value of the average error or the absolute value of the latest error as a base value, and takes as a sign the sign of the latest error value. Once the base error has been determined, a dead zone value, determined by the setting of the "DEAD ZONE" dip switches 87, is subtracted off of the magnitude of the base error. The magnitude of the base error could be reduced to zero if it is small. Finally, a comparison is made between the sign of the latest base error and the sign of the previous base error. If the two signs are different, the magnitude of the present base error is set to zero.

The purpose of the above defined process is to provide an average base error which is a damped base error and which will enable the control system 5 to follow variations of the associated printing press more closely and with less overshoot.

Once the adjusted base error with its associated sign has been determined, the control task adjusts that base error to provide optimal performance of the compensator motor 24. Four different gain settings may be entered into the control system 5 through the "GAIN" dip switches 87. If a DC motor is being used as the compensator 24B, the base error value is adjusted before being supplied to the motor drive port by means of the values in Table 2. Depending on the gain set by the dip switches 87 and depending on the sensed press speed, a value is selected off of Table 2. These values are hard-wired into the read-only memory of the control unit 5.

If the base error has a value greater than or equal to 6, the above defined value selected from Table 2 is used directly and output to the motor control port 23 along with the associated sign. If the base value is equal to 5, the above defined value selected from Table 2 is divided by 2 before it is supplied to the motor control port 23. If the magnitude of the base error is equal to 3 or 4, the value selected from Table 2 is divided by 4. If the magnitude of the base error is equal to 1 or 2, the magnitude of the base error selected from Table 2 is divided by 8. If the base error is equal to zero, then the motor is turned off.

Once the adjusted base value is determined based on Table 2, the sign of the unadjusted base error is associated with it. The adjusted base error and sign is then sent to the motor control port 23 which supplies it to the motor drive electronics **24*a* to drive the compensator motor 24*b***.

If the compensator **24*b* is an AC motor, the value of the "GAIN" dip switches 87 is checked. Depending on the value of those switch settings, 1, 2, 3 or 4, the base error is iteratively added to itself as many times as the gain switches are set to. Thus, it is added to itself either once, twice, three times or four times. (This is equivalent to a multiplication of from 1 to 4 based on the settings of the gain switches and the dip switch.) This value, corresponding to displacement steps of the synchronous motor is supplied by the processor to the motor control port 23**.

An error value associated with a DC motor and an error value associated with an AC motor are both calculated by the control task and both are output to the motor control port 23, one after the other. Then, depending on which type of motor is connected to the control system 5, the appropriate error which has been output drives that motor.

PLUG-IN THUMB WHEEL SWITCHES

Figure 22:
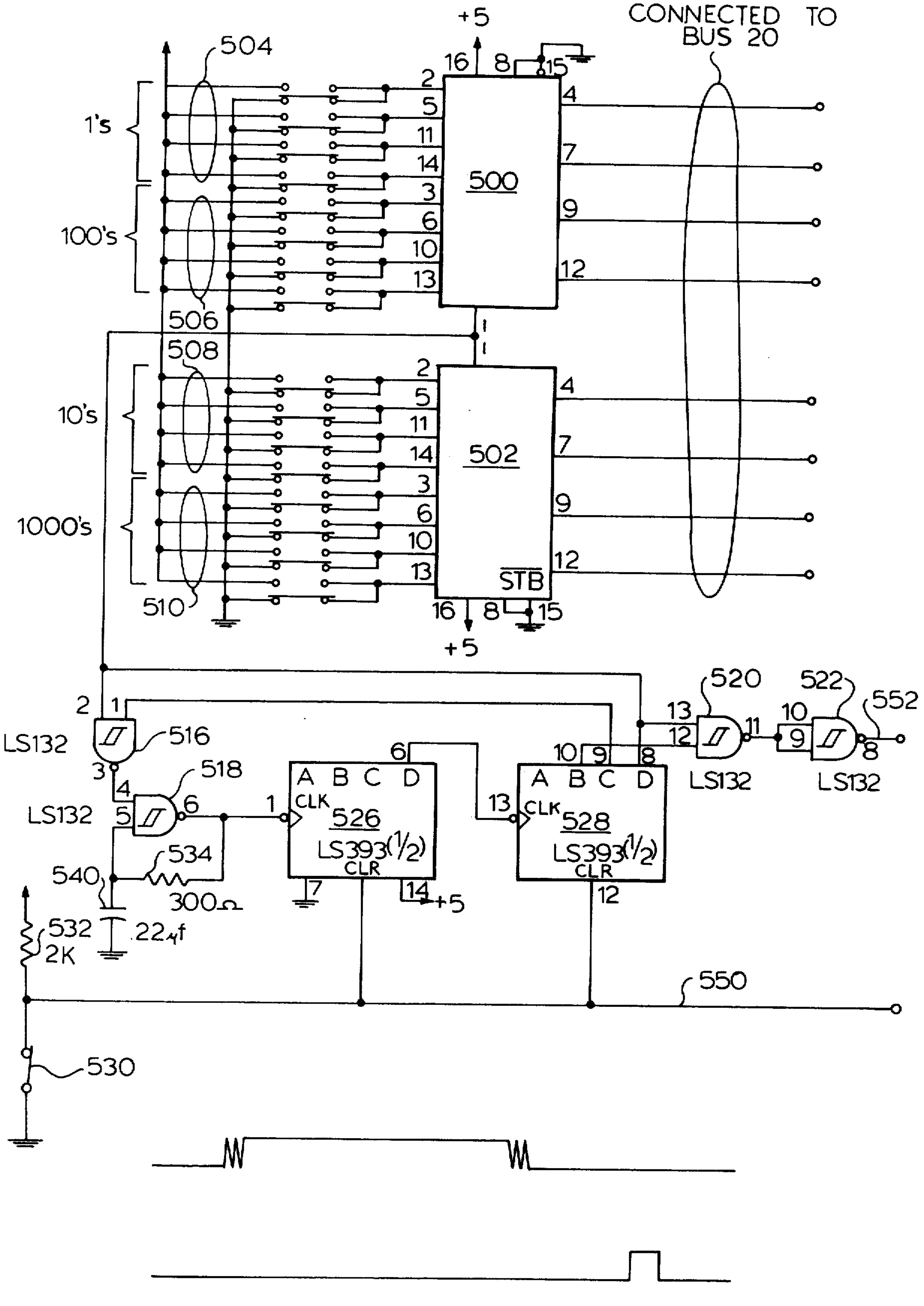
FIG. 22 is a schematic of a plug-in multi-digit switch module usable to establish a set-point.

For those instances, such as in a cut-off control, where it is desirable to be able to introduce an initial set point based on a physical measurement of the web a plug-in thumb wheel module shown schematically in FIG. 22, is available which can be connected to the external bus 20 of the control 5.

As shown in FIG. 22, the plug-in module includes eight four line data selector chips 500, 502, thumb wheel switches 504 through 510, gates 516 through 522, counter elements 526, 528, normally closed control switch 530, resistors 532, 534 and capacitor 540.

The outputs of the data selector chips 500, 502 which include two binary coded decimal numbers are first loaded into the input port A of the input port chip 100 and then into an input port B of the input port chip 100.

When the normally closed switch 530 is opened, a strobe A signal is generated on a line 550 which is connected to device 112 at pins 3 and 6. This provides a signal which strobes the 1's and 10's BCD numbers from the chips 500, 502 into the input port A. Subsequently, the gate 518, the resistor 534, the capacitor 540 and counter elements 526 and 528 generate a strobe B pulse on a line 552 which is connected to device 114 at pins 3 and 6 which strobes the 100's and the 1000's BCD numbers from the data selector chips 500, 502 into the port B of the chip 100.

The processor 7 can then respond to an interrupt signal generated on the line 100*a* due to having loaded the input ports A and B of the chip 100. The value read in through the chip 100 from the set point switches 504 through 510 can be used to establish initial set point value for a cut-off unit.

VISUAL DISPLAY PANEL AND ASSOCIATED DRIVE ELECTRONICS

Figure 23A:
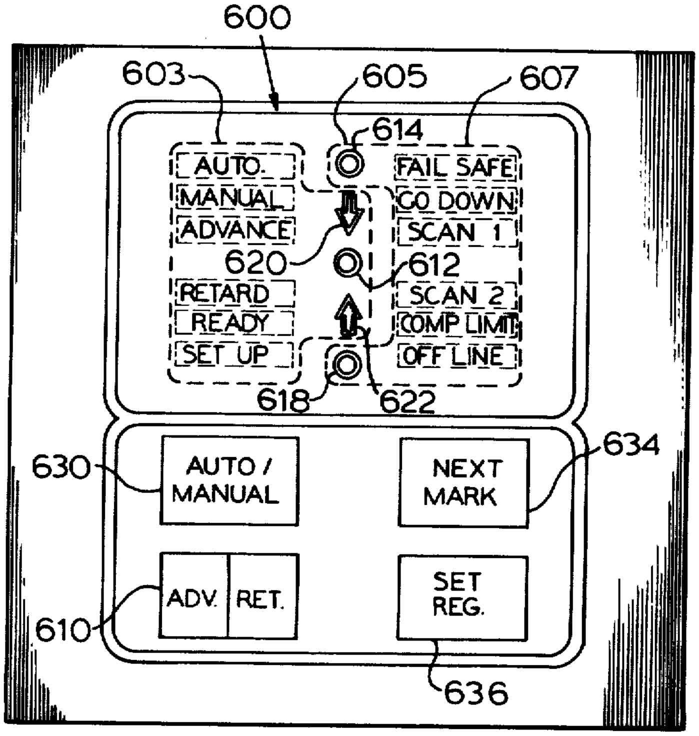
FIG. 23A is a planar frontal view of a display panel for a circumferential control.

FIG. 23*a* is a planar frontal view of a display panel 600 usable with the control system 5 and which is connected to the display panel port 21. The display panel 600 had three columns of lightable indicators 603 through 607. The indicator lights in the columns 603 through 607 are controllable through the display panel port 21 by the digital processor 7.

Each of the indicators in the column 603 displays one aspect of the status of the control system 5. The "auto" indicator is illuminated whenever the control system 5 has sensed that the operator has entered the automatic mode. In the automatic mode, under normal operating conditions, the web or cylinder compensator motor 24*b* is continuously attempting to minimize the error between the set point and the sensed web indicia. The "manual" indicator is illuminated whenever the control system 5 is operating in the manual mode. In the manual mode, the control system 5 is merely monitoring the difference between the sensed indicia on the web and the current set point. One of the indicators "advance", "retard" is illuminated whenever the control system 5 is operated in the manual mode, and whenever the two-position advance/retard switch 610 is depressed from its quiescent condition to indicate to the control system 5 that the motor 24*b* is to be either advanced or retarded. The "ready" indicator is illuminated whenever the control system 5 is receiving press encoder pulses, cylinder reference signals and web scanner signals.

The "set-up" indicator is illuminated whenever the compensator has been moved to a predetermined set-up position.

In the column 607 each of the indicators indicates some abnormal status of the control system 5. The "fail-safe" indicator is illuminated whenever the control system 5 is not receiving all the necessary input signals or the press speed drops below 50 RPM. The "go-down" indicator is illuminated whenever the press is running below 50 RPM. The "scan one" or "scan two" indicators are illuminated whenever the control system 5 does not receive a scanner input signal is not received during a window. The "comp limit" indicator is illuminated whenever the compensator motor has moved the compensator against a limit switch.

The "off line" indicator is illuminated whenever the control system 5 has been taken off line with respect to the external control bus 20. This is accomplished by closing the switch 104*a* thus insuring that the control system 5 will never respond to the appearance of its address on the parallel eight-bit external data bus 28.

The center column of indicators 605 is illuminated by the processor 7 to indicate whether or not the associated printing press or cut-off unit is out of register and to indicate which direction the web or cylinder compensator motor 24*b* is attempting to move to bring the system back into register. The central indicator 612 is a green indicator which is turned on whenever the control system 5 senses that the associated printing press or cut-off unit is running in register. The top and bottom indicators 614, 618 are red indicators which are illuminated by the processor 7 whenever an out-of-register condition is sensed. The arrows 620, 622 are illuminated whenever the processor 7 is attempting to bring the associated press or cut-off unit back into register.

Each of the indicators in the columns 603 through 607 is a backlite indicator which is not visible to the operator under normal lighting conditions until the associated backlighting source of illumination has been turned on by the processor 7.

In the lower half of the panel 600, will be found the AUTO/MANUAL switch 630 which is a spring loaded momentary push button switch which the operator can manually depress to enter the automatic mode or to return to the manual mode. A NEXT MARK switch 634 is a spring loaded push-button type switch, which an operator manually depresses, in manual mode, to indicate to the processor 7 that it should select the next mark it detects as a set point. A SET REG. push-button 636 is a spring loaded push-button switch which the operator manually depresses when in the manual mode to inform the processor 7 that the mark, or marks, currently being sensed are to be taken as the set point. Each of the switches 610, 630 through 636, is connected to the set of wires 91 and can be sensed through the port C of the switch input port 85.

Figure 23B:
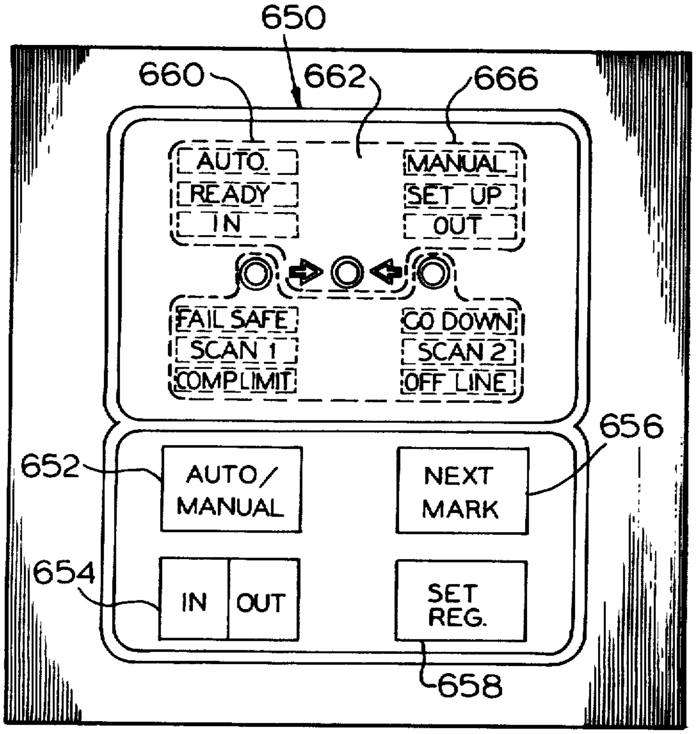
FIG. 23B is a planar frontal view of a display panel for a lateral register control.

FIG. 23*b* is a front planar view of a lateral register operator display panel 650. A display panel 650 is very comparable to the panel 600. The panel 650 includes a set of switches 652 through 658 which have the same functions as the corresponding set of switches 610, 630 through 636 of the display panel 600. In the panel 650, the switch 654 is labelled "IN/OUT". This switch corresponds in function to the ADVANCE/RETARD switch 610 of the panel 600. A different label has been utilized to emphasize the lateral change being brought about in the associated printing press or cut-off unit by depressing the switch 654. A set of three indicator columns 660, 662 and 666 corresponds to the set of indicator columns 603 through 607 of the display panel 600. The indicators in the columns 660, 666, correspond to the same set of indicators previously discussed in the columns 603 through 607. In the case of the lateral register control display panel 650, the out-of-register or in-register condition is shown by the horizontal set of lights and arrows 662, which also emphasizes the lateral nature of that control operation.

Figure 24:
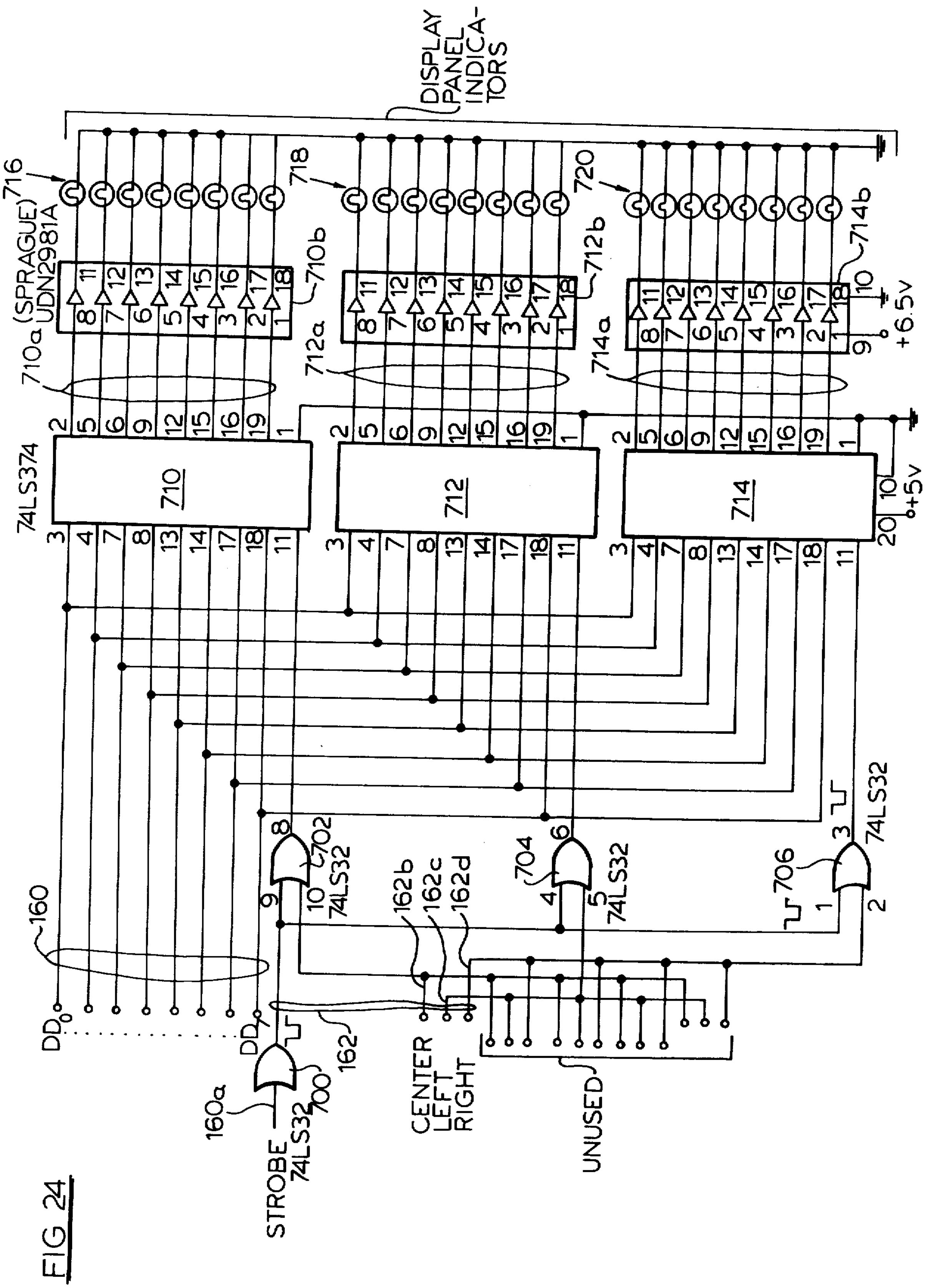
FIG. 24 is a schematic of the drive electronics connected between the control system of FIG. 2 and either the display panel FIG. 23A or the display panel FIG. 23B to drive the indicator lights.

FIG. 24 is a schematic of the drive electronics which are to be connected between the control system 5 of FIG. 2 and the display panel indicator lights of either FIG. 23*a* or FIG. 23*b*. FIG. 24 shows a set of data lines DD0 through DD7, 160, corresponding to the eight data lines 160 of FIG. 2E. Bits which are output through the output bus 160 by the processor 7, which are set to a 1, correspond to lights in the column 603 through 607 or 660 through 666, which are to be lit. Also, shown in FIG. 24 is a set of control lines 162, corresponding to the decoded address control lines 162 of FIG. 2D. The three lines 162 labelled center, left, right of FIG. 24 identify which column of lights is to be lit on the panel 600, 650.

The CENTER line 162*b* corresponds to an address which is generated by the processor 7 whenever the center column of lights 605 or 662 on the front panel 600, 650 is to be lit. The indicator LEFT line 162*c* corresponds to a decoded address from FIG. 2 which has essentially zero volts on it whenever the left-most column of lights 603 or 660 is to be lit. The RIGHT line 162*d* in FIG. 24 has a low voltage on it whenever the right-most column 607 or 666 is to be lit. The strobe line 162*a* of FIG. 24 has a low-going pulse on it whenever one of the addresses 162*b* through 162*d* has been selected and is also low. The drive circuitry of FIG. 24 includes further a set of positive OR gates 700, 702, 704 and 706. Each of the gates 702 through 706 functions as an AND gate in this instance, and generates a positive-going output on the trailing edge of the strobe signal on the line 162*a*. The output of the gate 702 or 704 or 706 is a clock input for a corresponding eight-bit register element 710 through 714. When clocked by one of the gates 702 through 706, the corresponding register element 710 through 714 stores in a series of parallel D-flip-flops the bit pattern on the lines 160. These bits are output through a set of parallel lines 710*a*, 712*a* or 714*a* through a set of buffer driver elements 710*b*, 712*b* or 714*b* to drive one of the sets of lights 716, 718, 720. the set of lights 716 corresponds to the column 605 or 662. The set of lights 718 corresponds to the column 603 or 660. The set of lights 720 corresponds to the column 607 or 666.

It should be noted that while the control system 5 has been described in terms of having various alternate functions such as a circumferential register control function or a lateral register control function, the control system 5 is also capable of performing both a circumferential and a lateral register control function within the same unit. To accomplish this, two circumferential marks could be sensed by Scanner A and two lateral marks could be sensed by Scanner B. The processor 7 could execute both the circumferential command sequence and the lateral command sequence based on having received interrupt signals from the two sensors. Error signals could be supplied to two motors through the two motor drive ports shown in FIG. 2.

A plurality of the control systems 5, each member of the plurality being associated with one of a serially arranged group of press units, may be connected together via the external eight-bit parallel data bus 20. Each of the control systems 5 which is linked to the parallel data bus 20 can send information to a remote means for supervision along the data bus 20 or can receive information from the remote means for supervision from the data bus 20. A selected digital processor 7, which is communicating with the remote means for supervision via the data bus 20, which is a means for transmission of selected data, has associated therewith manually setable address selection means 104. Additionally, there is a disabling means 104*a* associated with each processor 7 which can take that control system 5 off of the external bus 20. When the disabling means 104*a* is operational, the associated control system 5 will not sense its address when it appears on the bus 20. A means for linking which could consist of a set of parallel wires connecting the data bus 20 between each member 5 of the plurality of control systems and a remote means for supervision will enable each of the control systems 5 to communicate with the remote means for supervision. The remote means for supervision could include a programmed digital processor or could be a hard wired device for receiving and transmitting data to and from the control systems 5.

One particularly important use of the remote means for supervision is to be able to send a new set of parameters to an addressed control system 5 to alter its control characteristics. These might include the size of the counts which are to be loaded into the window counters, such as the counters 51 or 53, or perhaps information to vary the preselected gain of a given control system 5. Alternately, each of the control systems 5 which is linked to the remote means for supervision can be interrogated by that remote means for supervision to determine what is control parameters are and among other things what the size of the error is between the set point and the marks currently being sensed.

Attached hereto is a Table 3 which is a listing of the control codes which would be inserted into the read-only memory 13 to cause the control system 5 to function as a circumferential register control. The circumferential register control program of Table 3 can function in either a mark-to-reference mode or a mark-to-mark mode of the types discussed previously in the specification. The mode of operation is determined by setting the base characteristics on the input port 17. Table 3 has a series of addresses whose four most significant hexidecimal digits will be found in the left-most column of Table 3. The least significant hexidecimal digit is represented by the top-most row in Table 3 extending horizontally from zero to F. The control code to be stored at each location defined by the left-most three hexidecimal digits in Table 3 in combination with the least significant hexidecimal digit, extending horizontally across the top-most row of Table 3, will be found at the intersection of the row determined by the most significant three hexidecimal digits and the column determined by the least significant hexidecimal digit.

Table 4 represents a set of hexidecimal control codes which are inserted into the read-only memory 13 to cause the control system 5 to act in a mark-to-reference cut-off control mode as discussed previously. Table 4 is read exactly the same way as Table 3. Those entries in either Table 3 or Table 4 where no hexidecimal digits are shown represent storage locations in the read-only memory 13 which are not used.

APPENDIX A

| INSTRUCTION MNEMONIC | HEX VALUE | NAME | DESCRIPTION |
|---|---|---|---|
| AB(L) | A4 | Add Byte (Low) | Adds addressed operand to LACC (8-bit op.) |
| AI(L) | AC | Add Immed. (Low) | Adds address field to LACC (16-bit op.) |

| | | | |
|---|---|---|---|
| AR | DN | Add Reg. | Adds N-th register contents to ACC (16-bit op.) |
| A1 | 2E | Add One | Adds 1 to ACC (16-bit op.) |
| B | 24,28,2C | Branch | Branch to LSB (+256,-256,±0) |
| BAL | 30-33 | Branch And Link | Used to call subroutines (PC to Reg. 0, 1, 2, or 3) |
| BE | 35,39,3D | Branch Equal | Branches if EQ set (See B) |
| BH | 36,3A,3E | Branch High | Branch if EQ and LO are reset (See B) |
| BNE | 34,38,3C | Branch Not Equal | Branch if EQ reset (See B) |
| BNL | 37,3B,3F | Branch Not Low | Branch if LO reset (See B) |
| BR | 20-23 | Branch Reg. | See RTN |
| CB(L) | A0 | Compare Byte (Low) | Addressed byte compared to LACC (8-bit op.) |
| CI(L) | A8 | Compare Immed. (Low) | Address field compared to LACC (8-bit op.) |
| CLA | 25 | Clear Acc. | ACC reset to all zeroes (16-bit op.) |
| GI | A9 | Group Immed. | Selects one of 16 register groups (also controls interrupts) |
| IC | 2D | Input Carry | Generate carry into ALU |
| IN | 26 | Input | Read into LACC from addressed device (8-bit op.) |
| J | 0N,1N | Jump | Jump (forward or back) to PC(15-4),N |
| JE | 4N,5N | Jump Equal | Jump if EQ set (See J) |
| JNE | 6N,7N | Jump Not Equal | Jump if EQ reset (See J) |
| LB(L) | A6 | Load Byte (L) | Load addressed byte into LACC (8-bit op.) |
| LI | AE | Load Immed. | Load address field into LACC |
| LN | 98-9F | Load Indirect | Load byte addressed by reg. 8-F into LACC (8-bit op.) |
| LR | EN | Load Register | Load register N into ACC (16-bit op.) |
| LRB | FN | Load Reg./ Bump | Load reg. N into ACC and increment; ACC to Reg. N (N=4-7,C-F) (16-bit op.) |
| LRD | FN | Load Reg./Decr. | Load reg. N into ACC and decrement; ACC to Reg. N (N=0-3,8-B) (16-bit op.) |
| NB(L) | A3 | And Byte (Low) | AND addressed byte into LACC. (8-bit op.) |
| NI(L) | AB | And Immed.(Low) | AND address field into LACC (8-bit op.) |
| OB(L) | A7 | Or Byte (Low) | OR addressed byte into LACC (8-bit op.) |
| OI(L) | AF | Or Immed.(Low) | OR address field into LACC (8-bit op.) |
| OUT | 27 | Output | Write LACC to addressed device |
| RTN | 20-23 | Return | Used to return to calling program (See BAL) |
| SB(L) | A2 | Subtract Byte (Low) | Subtract addressed byte from LACC (8-bit op.) |
| SHL | 2B | Shift Left | Shift ACC one bit left (16-bit op.) |

| | | | |
|---|---|---|---|
| SHR | 2F | Shift Right | Shift ACC one bit right (16-bit op.) |
| SI(L) | AA | Subtract Immed.(Low) | Subtract address field from LACC (16-bit op.) |
| SR | CN | Subtract Reg. | Subtract reg. N from ACC (16-bit op.) |
| STB(L) | A1 | Store Byte(Low) | Store LACC at address (8-bit op.) |
| STN | B8-BF | Store Indirect | Store LACC at address in Reg. 8-F |
| STR | 8N | Store Reg | Store ACC in Reg. N (16-bit op.) |
| S1 | 2A | Subtract One | Subtract 1 from ACC (16-bit op.) |
| TP | 9N | Test/Preserve | Test N-th bit in LACC (N=0-7) |
| TR | BN | Test/Reset | Test and reset N-th bit in LACC |
| TRA | 29 | Transpose | Interchange HACC and LACC |
| XB(L) | A5 | XOR Byte (Low) | Exclusive-OR addressed byte into LACC (8-bit op.) |
| XI(L) | AD | XOR Immed. (Low) | Exclusive-OR address field into LACC (8-bit op.) |

Notes: ACC (Accumulator) is 16-bit output register from arithmetic-logic unit

- LACC signifies herein the low ACC byte; HACC, the high byte
  - all single byte operations are into low byte
  - register operations are 16-bit (two-byte)
- 8-bit operations do not affect HACC EQ (equal) is a flag which is set:

if ACC=0 after register AND or XOR operations;
if ACC (low byte)=0 after single byte operation;
if a tested bit is 0;
if bits set by OR were all 0's;
if input carry = 0;
if compare operands are equal;
if bit shifted out of ACC = 0;
if 8th bit of data during IN or OUT = 0.

LO (low) is a flag which is set: (always reset by IN, OUT, IC)

if ACC bit 16=1 after register operation;
if ACC bit 8=1 after single byte operations;
if logic operation produces all ones in LACC;
if all bits other than tested bit = 0;
if ACC=0 after shift operation;
if compare operand is greater than ACC low byte.

| | | |
|---|---|---|
| BC | Branch on Carry | Branches if carry is set |
| BCT | Branch on Count | Reg. decremented and branch if not zero result |
| BHA | Branch on High ACC | Used after compare |
| BL | Branch on Low | Branches if LO is set |

| | | |
|---|---|---|
| BLA | Branch on Low ACC | See BNC; used after compare |
| BNC | Branch Not Carry | Branches if carry is reset |
| BNLA | Branch on Not Low ACC | See BC; used after compare |
| BNZ | Branch Not Zero | Branches if previous result was not zero |
| BR | Branch via Register | Same as RTN instruction |
| BU | Branch Unconditionally | Same as BAL instruction |
| CIL | Compare Immed. Low | Uses low byte of indicated constant in CI address field |
| DC | Define Constant | Reserves space for constant |
| EXP2 | Express In powers of 2 | Opcode set to binary |
| JC | Jump on Carry | See BC |
| JL | Jump on Low | See BL |
| JNC | Jump on No Carry | See BNC |
| JNH | Jump Not High | See BNH |
| LA | Load Address | Generates sequence LIH, TRA, LIL |
| LBD | Load Byte Double | Bytes at addr. and addr. +1 to ACC |
| LID | Load Immed. Double | Same as LA |
| LIH | Load Immed. High | Uses high byte of constant in LI address field |
| LIL | Load Immed. Low | Uses low byte of constant in LI address field |
| NOP | No Operation | Dummy instruction - skipped |
| RAL | Rotate ACC Left | Generates sequence SHL, IC, A1 |
| SCTI | Set Count Immed. | Generates CLA, LI, STR |
| SHLM | Shift Left Multiple | Shifts specified number of times to left |
| SHRM | Shift Right Multiple | Shifts specified number of times to right |
| SRG | Set Register Group | Same as GI |
| STDB | Store Byte Double | ACC to addr. +1 and addr. |
| TPB | Test & Preserve Bit | Generates sequence LB, TP |
| TRB | Test & Reset Bit | Generates sequence LB, TR, STB |
| TRMB | Test & Reset Multiple Bits | Same as TRB but specifies multiple bits |
| TRMR | Test/Reset Mult. Bits in Reg. | Generates LR, NI, STR |
| TS | Test and Set | Same as OI instruction |
| TSB | Test & Set Byte | Same as TS but byte is specified in addition to bit |
| TSMB | Test & Set Multiple Bytes | Same as TS but specifies multiple Bits |
| TSMR | Test & Set Mult. Bits in Reg. | Generates LR, OI, STR |
| LZI | Zero & Load Immed. | Generates CLA, LI |

NOTES: (Label) DC * causes the present location (*) to be associated with the label.

L and H, in general, are suffixes indicating low or high byte when 16 bit operands are addressed.

B0977017 B-1

APPENDIX B

| ADDR | INSTR | OP1 | OP2 | LABEL | MNEMONIC | INSTR |
|---|---|---|---|---|---|---|
| 7FD6 | A628 | 0228 | | | LBL | STAT4 |
| 7FD8 | 94 | 0004 | | | TP | SICE2 |
| 7FD9 | 43 | 7FE3 | | | JE | DRUMEND |
| 7FDA | E9 | 0009 | | | LR | BR2 |
| 7FDB | 94 | 0004 | | | TP | PRINTD |
| 7FDC | 43 | 7FE3 | | | JE | DRUMEND |
| 7FDD | F3 | 0003 | | | LRD | TRAY# |
| 7FDE | 03 | 7FE3 | | | J | DRUMEND |
| . . . | | | | | | |
| 9CBF | E9 | 0009 | | | LR | BR2 |
| 9CC0 | 94 | 0004 | | | TP | PRINTD |
| 9CC1 | 64 | 9CC4 | | | JNE | ERROR1 |
| 9CC2 | 25 | | | | CLA | |
| 9CC3 | 04 | 9CD4 | | | J | ERROR2 |
| | | | | ERROR1 | LA | $IGNUMBR |
| 9CC4 | AE04 | 0466 | | | | |
| 9CC6 | 29 | | | | | |
| 9CC7 | AE66 | 0466 | | | | |
| 9CC9 | 8C | 000C | | | STR | CUTPRO |
| 9CCA | 2E | | | | A1 | |
| 9CCB | 8D | 000D | | | STR | INPRO |
| 9CCC | 9C | 000C | | | LN | CUTPRO |
| 9CCD | 29 | | | | TRA | |
| 9CCE | 9D | 000D | | | LN | INPRO |
| 9CCF | 2F | | | | SHR | |
| 9CD0 | C3 | 0003 | | | SR | TRAY# |
| | | | | | SRG | GROUPEX2 |
| 9CD1 | A9D2 | 00D2 | | | | |
| 9CD3 | CE | 000E | | | SR | EXIT# |
| | | | | ERROR2 | SRG | GROUPEX2 |
| 9CD4 | A9D2 | 00D2 | | | | |
| 9CD6 | 85 | 0005 | | | STR | REMAKE# |
| . . . | | | | | | |

```
9D0A   A9DB     00D8
9D0C   25                           CLA
9D0D   330000   0003   0000         BAL       THREE,
                                              ORGRW
9D10   AE01     0001                LI        REWIND1
9D12   330000   0003   0000         BAL       THREE,
                                              ORGRW
                                    SRG       SCT/32
9D15   A9C5     00C5
9D17   A6B7     00B7                LBL       SCT+16+
                                              PORTPC
9D19   A80F     000F                N1        15
9D1B   A1B7     00B7                STBL      SCT+16+
                                              PORTPC
                                    SRG       GROUPPR
9D1D   A9D0     00D0
                                    TSMR      BR4,
                                              P(SVCA)
9D1F   E8       0008
9D20   AF04     0004
9D22   88       0008
9D23   3280A0   0002   A080         BAL       PPINTR,
                                              ORGCR
                                    TRMR      BR4,
                                              P(SVCA)
9D26   E8       0008
9D27   B2       0002
9D28   88       0008
                                    SRG       GROUPEX2
9D29   A9D2     0002
9D2B   E3       0003                LR        SKIP1ST#
                                    SRG       GROUPPR
9D2C   A9D0     00D0
9D2E   BE       000E                STR       SKIPNUMB
9D2F   DE       000E                AR        SKIPNUMB
9D30   60       9D40                JNE       ERROR11
9D40   A695     0295       ERROR11  LBL       ENDFILL
9D42   29                           TRA
9D43   AE06     0006                LI        AD1
```

```
9D45    8F       000F                     STR      UNITS
9D46    9F       000F                     LN       UNITS
9D47    A495     0295                     ABL      ENDFILL
9D49    A195     0295                     STBL     ENDFILL
9D4B    A199     0299                     STBL     ENDPRINT
9D4D    A098     0298                     CBL      ENDPAGE
9D4F    3F53     9D53                     BNL      ERROR13
9D51    2C6B     9D6B                     B        ERROR15
9D53    A298     0298           ERROR13   SBL      ENDPAGE
9D55    A497     0297                     ABL      BEGPAGE
9D57    A195     0295                     STBL     ENDFILL
9D59    A199     0299                     STBL     ENDPRINT
                                          TSMR     BR4,
                                                   P(SVCA)
9D5B    E8       0008
9D5C    AF04     0004
9D5E    88       0008
                                          SRG      GROUPPC
9D5F    A9D1     00D1
                                          PPSVC    PC
                                          LI     $CA1038+
                                                 $CA2038+
                                                 $CA3038+
                                                 $CA4038+
                                                 $CA5038+
                                                 $CA6038+
                                                 $CA7038+
9D61    AE38     0038                            $CA8038
9D63    302364   0000   6423              BAL    0,SUPERPC
                                          SRG      GROUPPR
9D66    A9D0     00D0
                                          TRMR     BR4,
                                                   P(SVCA)
9D68    E8       0008
9D69    B2       0002
9D6A    88       0008
9D6B    EE       000E           ERROR15   LR       SKIPNUMB
9D6C    2A                                S1
9D6D    8E       000E                     STR      SKIPNUMB
```

```
9D6E   3C40   9D40                BNE     ERROR11
. . .
9E21   EF     000F     MOVE3      LR      UNITS
9E22   AE06   0006                LI      AD1
9E24   8E     000F                STR     UNITS
9E25   9F     000F                LN      UNITS
9E26   A495   0295                ABL     ENDFILL
9E28   A098   0298                CBL     ENDPAGE
9E2A   3F30   9E30                BNL     MOVE6
9E2C   A195   0295     MOVE4      STBL    ENDFILL
9E2E   2422   9F22                B       MOVEEND
9E30   A298   0298     MOVE6      SBL     ENDPAGE
9E32   A497   0297                ABL     BEGPAGE
9E34   1C     9E2C                J       MOVE4
                       MOVE8      SRG     GROUPEX2

9E35   A9D2   00D2
9E37   B5     0005                LR      REMAKE#
9E38   D5     0005                AR      REMAKE#
9E39   65     9E45                JNE     MOVE9
9E3A   E9     0009                LR      SKIP2NC#
9E3B   D9     0009                AR      SKIP2ND#
9E3C   3D4F   9E4F                BE      MOVE9A
9E3E   F9     0009                LRD     SKIP2NC#
9E3F   A9D0   00D0

9E41   2C21   9E21                B       MOVE3
9E43   2422   9F22     MOVEENDX   B       MOVEEND
9E45   E5     0005     MOVE9      LR      REMAKE#
9E46   2A                         S1
9E47   85     0005                STR     REMAKE#
                                  SRG     GROUPPR

9E48   A9D0   00D0
9E4A   6F     9E4F                JNE     MOVE9A
9E4B   E7     0007                LR      BR1
9E4C   AF10   0004                TS      ERRCHNGF
9E4E   87     0007                STR     BR1
. . .
A8CB   E6     0006     CHAR5      LR      PRINTINT
A8CC   2E                         A1
A8CD   86     0006                STR     PRINTINT
```

```
                                            SRG       GROUPSU
. . .
A8EA    A619    0219              CHAR6     LBL       BYTE3
A8EC    92      0002                        TP        CW
A8ED    48      A8FB                        JE        CHAR7
A8EE    EF      000F                        LR        UNITS
A8EF    AE09    0009                        LI        SUP
A8F1    8F      000F                        STR       UNITS
A8F2    9F      000F                        LN        UNITS
A8F3    96      0006                        TP        ECFP
A8F4    3553    A953                        BE        ENDC
A8F6    2411    A911                        B         CHAR8
                                  CHAR7     LA        $IGNUMBR
A8F8    AE04    0466
A8FA    29
A8FB    AE66    0466
A8FD    8F      000F                        STR       UNITS
A8FE    9F      000F                        LN        UNITS
A8FF    29                                  TRA
A900    A60F    020F                        LBL       UNITS+
                                                      GROUPPR*32
A902    2E                                  A1
A903    A10F    020F                        STBL      UNITS+
                                                      GROUPPR*32
A905    AB0D    0000                        CI        0
A907    6D      A90D                        JNE       CHAR7A
A908    A61F    021F                        LBL       UNITS+
                                                      GROUPPR*
                                                      32+16
A90A    2E                                  A1
A90B    A11F    021F                        STBL      UNITS+
                                                      GROUPPR*
                                                      32+16
A90D    9F      000F              CHAR7A    LN        UNITS
A90E    C6      0006                        SR        PRINTINT
A90F    BE53    A953                        BH        ENDC
A911    25                        CHAR8     CLA
A912    86      0006                        STR       PRINTINT
. . .
A925    F5      0005              CHAR9     LRB       NUMSETS
```

```
A926  AB0F  000F             NI    15
A928  A80A  000A             CI    10
A92A  E5    0005             LR    NUMSETS
A92B  69    A939             JNE   CHAR11
A92C  AC10  0010             A1    16
A92E  ABF0  00F0             NI    X'F0'
A930  A8A0  00A0             CI    X'A0'
A932  68    A938             JNE   CHAR10
A933  AB00  0000             NI    0
A935  29                     TRA
A936  2E                     A1
A937  29                     TRA
A938  B5    0005   CHAR10    STR   NUMSETS
. . .
AC47  EA    0008             LR    FLCNTLR
AC48  90    0000             TP    DUPLEXLT
AC49  40    AC4C             JE    BUMPEXIT
AC4A  94    0004             TP    SIDE2
AC4B  40    AC50             JE    BUMPTRAY
                   BUMPEXIT  SRG   GROUPEX2
AC4C  A9D2  00D2
AC4E  FE    000E             LRB   EXIT#
AC4F  05    AC55             J     BUMPNCT
                   BUMPTRAY  SRGM  GROUPPR
AC50  A990  0090   BUMPTRAY  G1    $MASKCN+GROUPPR
AC52  E3    0003             LR    TRAY#
AC53  2E                     A1    ***
AC54  B3    0003             STR   TRAY#
            AC55   BUMPNOT   DC    *
                             SRGU  GROUPPR
AC55  A910  0010             GI    $MASKCFF+GROUPPR
AC57  25                     CLA   ***
AC58  DA    000A             AR    LOSTPAGE
                             SRG   GROUPCD
AC59  A9D1  00D1
AC5B  61    AC61             JNE   CHECKCW
AC5C  A607  0207             LBL   BYTE1
AC5E  95    0005             TP    STCPPRTF
AC5F  3C7C  AC7C             BNE   RSTEXIT
```

```
AC61  A519  0219   CHECKCW  LBL    BYTE3
AC63  92    0002            TP     CW
AC64  3080  AC80            BNE    NCEXRST
                   CKEXITIG LA     $IGNUMBR
AC66  AE04  0466
AC68  29
AC69  AE66  0466
AC6B  8E    000E            STR    TEMPINDR
AC6C  9E    000E            LN     TEMPINDR
AC6D  29                    TRA    ***
AC6E  81    0001            STR    BAL1
AC6F  FE    000E            LRB    TEMPINDR
AC70  E1    0001            LR     BAL1
AC71  9E    000E            LN     TEMPINDR
AC72  8E    000E            STR    TEMPINDR
AC73  E8    0008            LR     FLCNTLR
AC74  90    0000            TP     DUPLEXLT
AC75  EE    000E            LR     TEMPINDR
AC76  48    AC78            JE     EXEQ$IG
AC77  2F                    SHR    ***
                   EXEQ$IG  SRG    GROUPEX2
AC78  A9D2  00D2
AC7A  CE    000E            SR     EXIT#
AC7B  60    AC80            JNE    NOEXRST
                   RSTEXIT  SRG    GROUPEX2
AC7C  A9D2  00D2
AC7E  25                    CLA    ***
AC7F  8E    000E            STR    EXIT#
            AC80   NOEXRST  DC     *
                            SRG    GROUPEX2
AC80  A9D2  00D2
AC82  25                    CLA    ***
AC83  D4    0004            AR     ACRBINE#
AC84  4E    AC8E            JE     CHKBLANK
AC85  2A                    S1     ***
AC86  84    0004            STR    ACRBINH#
                            TSMBL  CPYCNTLB,
                                   P(ACRBINHF)
```

```
AC87   A628    0028                      LB     $REK074
                                         01     $CA1075+
                                                $CA2075+
                                                $CA3075+
                                                $CA4075+
                                                $CA5075+
                                                $CA6075+
                                                $CA7075+
AC89   AF80    0080                             $CA8075
AC8B   A128    0028                      STB    $REK074
AC8D   0E      AC9E                      J          SHIFTBB
AC8E   A642    0242            CHKBLANK  LBL        BILCNTLB
AC90   90      0000                      TP         0
AC91   49      AC99                      JE         CKRSTBIN
                                         TSMBL      CPYCNTLB,
                                                    P(ACRBINHF)
AC92   A628    C028                      LB     $REK077
                                         01     $CA1078+
                                                $CA2078+
                                                $CA3078+
                                                $CA4078+
                                                $CA5078+
                                                $CA6078+
                                                $CA7078+
AC94   AF80    0080                             $CA8078
AC96   A128    0028                      STB    $REK077
AC98   0E      AC9E                      J          SHIFTBB
                               OKRSTBIN  TRMBL      CPYCNTLB,
                                                    P(ACRBINHF)
AC99   A628    0028            OKRSTBIN  LB     $REK080
AC9B   B7      0007                      TR     ACRBINHF
AC9C   A128    0028                      STB    $REK08C
AC9E   25                      SHIFTBB   CLA        ***
AC9F   A642    0242                      LBL        BILCNTLB
ACA1   2F                                SHR        ***
ACA2   A142    0242                      STBL       BILCNTLB
. . .
AD3A   32D6BB  0002    BBD6              BAL        BAL2,
                                                    PDIPPER
```

```
. . .
AE59   A991     0091                    GI   $MASKON+GROUPCD
AE5B   ED       000D                    LR        CCNTIMR
AE5C   B5       0005                    TR        FORCERRF
AE5D   3D65     AE65                    BE        PPATH1
AE5F   BD       000D                    STR       CONTIMR
                                        SRGU      GROUPCD
AE60   A911     0011                    GI   $MASKOFF+GROUPCD
                                        AlF       ('&SYSPARM'
                                                  (3,2) EQ
                                                  'HK').AJR5
                               .AJR5    ANOP
                                        AlF       ('&SYSPARM'
                                                  (3,2) NE 'HK')
                                                  .AJR15
AE62   31B3BC   0001   BCB8             BAL       BAL1,
                                                  PRECSMAL
. . .
B0BF   31B8BC   0001   BCB8   CHNGERR   BAL       BAL1,
                                                  PRECSMAL
                              .AJR14    ANOP
B0C2   24CE     B10E                    B         SIDEONEX
B0C4   26A1     00A1          SIDETWO   IN        $STATUS
B0C6   96       0006                    TP        CIDTF
B0C7   3DDF     B0DF                    BE        CHNGOK
B0C9   31B4BB   0001   BBB4             BAL       BAL1,
                                                  NUMSETS1
                                        LA        $IGNUMBR
B0CC   AE04     0466
B0CE   29
B0CF   AE66     0466
B0D1   8E       000E                    STR       TEMPINDR
B0D2   9E       000E                    LN        TEMPINDR
B0D3   29                               TRA       ***
B0D4   B1       0001                    STR       BAL1
B0D5   FE       000F                    LRB       TEMPINDR
B0D6   E1       0001                    LR        BAL1
B0D7   9E       00DE                    LN        TEMPINDR
                                        SRG       GROUPPR
```

```
B0D8    A9D0    00D0      STR     PRINTINT
B0DA    86      0006      SRG     GROUPCD
B0DB    A9D1    00D1      B       CHNGERR
B0DD    2CBF              LBL     BYTE2
. . .
B64B    A609    0209      TP      PRINTD
B64D    94      0004      BE      CISMPLX
B64E    B093    B693      IN      $STATUS
B650    26A1    00A1      TP      CIDTF
B652    96      0006      BNE     INTWAIT1
B653    BC85    B685      LBL     BYTE3
B655    A619    0219      N1      P(CW,CR)
B657    AB06    0006      BE      INTWAIT1
B659    B085    B685      LBL     BYTE1
B65B    A607    0207      TP      STCPPRTF
B65D    95      0005      BNE     INTWAIT1
B65E    BC85    B685      LBL     BYTE3
B660    A619    0219      TP      CW
B662    92      0002      BE      COPY INTD
B663    B080    B680      TR      P
B665    84      0004      BE      COPY INTD
B666    BD80    B680      STBL    BYTE3
B668    A119    0219      SRG     GROUPEX2

B66A    A9D2    00D2      CLA     ***
B66C    25                STR     SKIP1ST#
B66D    83      0003      LR      EXIT#
B66E    8E      000F      SHL     ***
B66F    2B                STR     SKIP2ND#
B670    89      0009      SRGM    GROUPPR

B671    A990    0090      GI      $MASKCN+
                                  GROUPPR

B673    86      0006      STR     PRINTINT

. . .
BA7F    E8      0008      LR      FLCNTLR
BA80    94      0004      TP      SIDE2
BA81    BD95    BA95      BE      INIT2
BA83    26A1    00A1      IN      $STATUS
BA85    96      0006      TP      CIDTF
```

```
BA86   65     BA95             JNE    INIT2
                               SRGM   GROUPCD
BA87   A991   0091             GI     $MASKON+
                                      GROUPCD
                               TSMR   CONTIMR,
                                      P(FORCERRF)
BA89   ED     000D
BA8A   AF20   0020
BA8C   BD     000D
                               SRGU   GROUPCD
BA8D   A911   0011             CI     $MASKOFF+
                                      GROUPCD
BA8F   AE04   0004             LI     CALSCON
BA91   2779   0079             OUT    $DEVML79
BA93   2CE8   BAE8             B      INITEND
              BA95     INIT2   DC     *
BA95   EC     000C             LR     SOFTJOBR
BA96   AF04   0002             TS     $INITREQ
BA98   A12C   022C             STBL   $JOBFLGB
                               AIF    ('&SYSPARM'
                                      (3,2) NE 'HK')
                                      .AJR12
BA9A   A652   0252             LBL    AJRBYTE
BA9C   B0     0000             TR     BLNKPGF
BA9D   3DD6   BAD6             BE     INITBEND
BA9F   A152   0252             STBL   AJRBYTE
BAA1   A9D0   00D0             SRG    GROUPPR
BAA3   25                      CLA    ***
BAA4   DA     000A             AR     LOSTPAGE
BAA5   3DB9   BAB9             BE     SETBINHF
BAA7   2A                      SI     ***
BAA8   BDC1   BAC1             BE     SETBINH0
BAAA   2A                      SI     ***
BAAB   BDC6   BAC6             BE     SETBINH1
BAAD   2A                      SI     ***
BAAE   3DCB   BACB             BE     SETBINH2
BAB0   2A                      SI     ***
BAB1   3DD0   BAD0             BE     SETBINH3
```

```
BAB3   A642   0242              LBL     BILCNTLB
BAB5   AF10   0004              TS      4
BAB7   2CD4   BAD4              B       INITBIND
                       SETBINHF TSMBL   CPYCNTLB,
                                        P(ACRBINHF)
BAB9   A628   0028     SETBINHF LB      $REK837
                                01      $CA1838+
                                        $CA2838+
                                        $CA3838+
                                        $CA4838+
                                        $CA5838+
                                        $CA6838+
                                        $CA7838+
BABB   AF80   0080                      $CA8838
BABD   A128   0028              STB     $REK837
BABF   2CD6   BAD6              B       INITBEND
BAC1   A642   0242     SETBINH0 LBL     BILCNTLB
BAC3   AF01   0000              TS      0
BAC5   04     BAD4              J       INITBIND
BAC6   A642   0242     SETBINH1 LBL     BILCNTLB
BAC8   AF02   0001              TS      1
BACA   04     BAD4              J       INITBIND
BACB   A642   0242     SETBINH2 LBL     BILCNTLB
BACD   AF04   0002              TS      2
BACF   04     BAD4              J       INITBIND
BAD0   A642   0242     SETBINH3 LBL     BILCNTLB
BAD2   AF03   0003              TS      3
BAD4   A142   0242     INITBIND STBL    BILCNTLB
                       INITBEND SRG     GROUPCD
BAD6   A9D1   00D1
. . .
                                SRGM    GROUPEX2
BB0F   A992   0092              GI      $MASKON+
                                        GROUPEX2
BB11   25                       CLA     ***
BB12   D4     0004              AR      ACRBINH#
BB13   4C     BB1C              JE      ACTBKBL
BB14   2A                       SI      ***
BB15   84     0004              STR     ACRBINH#
```

```
                                        SRG     GROUPCD
BB16   A9D1     00D1
                                        TSMR    FLCNTLR,
                                                P(ACRBINHF)
BB18   E8       0008
BB19   AF80     0080
BB1B   88       0008
. . .
                                        SRGM    GROUPPR
BBF6   A990     0090                    GI    $MASKON+
                                              GROUPPR
BBF8   A619     0219                    LBL     BYTE3
BBFA   92       0002                    TP      CW
BBFB   B52F     BC2F                    BE      TWOTHRUN
BBFD   B4       0004                    TR      P
BBFE   A119     0219                    STBL    BYTE3
BC00   E9       0009                    LR      BR2
BC01   94       0004                    TP      PRINTD
BC02   B022     BC22                    BE      PCWSIMP
                                        SRGU    GROUPCD
BC04   A911     0011                    GI    $MASKOFF+
                                              GROUPCD
BC06   26A1     00A1                    IN      $STATUS
BC08   96       0006                    TP      CIDTF
BC09   47       BC17                    JE      NOCMPRQD
BC0A   91       0001                    TP      NOTREADY
BC0B   40       BC10                    JE      DUMP
                                        TRMR    STATER,
                                                P(DODIPF)
BC0C   EF       000F
BC0D   B7       0007
BC0E   BF       000F
BC0F   07       BC17                    J       NODMPRQD
BC10   31818B   0001   BB81   DUMP      BAL     BAL1,DDPTS
                                        TSMR    FLONTLR,
                                                P(ACRBINHF)
BC13   E8       0008
BC14   AF80     0080
BC16   B8       0008
```

```
                                        NODMPRQD SRG  GROUPEX2
BC17   A9D2     00D2
BC19   25                                        CLA  ***
BC1A   83       0003                             STR  SKIP1ST#
BC1B   BE       000E                             LR   EXIT#
BC1C   2B                                        SHL  ***
BC1D   89       0009                             STR  SKIP2ND#
                                                 SRG  GROUPPR
BC1E   A9D0     00D0
BC20   86       0006                             STR  PRINTINT
. . .
BC3E   A9D0     00D0
BC40   25                                        CLA  ***
BC41   D6       00D6                             AR   PRINTINT
                                                 SRG  GROUPCD
BC42   A9D1     00D1
BC44   B8       BC48                             JNE  NODECSET
BC45   31B4BB   0001     BBB4                    BAL  BAL1,
                                                      NUMSETS1
                BC48                    NODECSET DC   *
                                                 SRG  GROUPPR
BC48   A9D0     0000
BC4A   E3       0003                             LR   TRAY#
                                                 SRG  GROUPEX2
BC4B   A9D2     00D2
BC4D   B3       0003                             STR  SKIP1ST#
BC4E   EE       00DE                             LR   EXIT#
BC4F   2B                                        SHL  ***
BC50   89       0009                             STR  SKIP2ND#
                                                 SRG  GROUPPR
BC51   A9D0     00D0
BC53   03       0003                             AR   TRAY#
BC54   86       0006                             STR  PRINTINT
BC55   A628     0228                             LBL  CPYCNTLB
BC57   94       0004                             TP   SIDE2
BC58   48       BC68                             JE   PEREX
BC59   EA       000A                             LR   LOSTPAGE
                                                 SRG  GROUPEX2
BC5A   A9D2     00D2
```

```
BC5C  D4    00D4                AR    ACRBINH#
BC5D  B4    0004                STR   ACRBINH#
BC5E  A628  0228                LBL   CPYCNTLB
BC60  AF80  0007                TS    ACRBINHF
BC62  68    BC68                JNE   NODECST1
BC63  A128  0228                STBL  CPYCNTLB
BC65  E4    0004                LR    ACRBINH#
BC66  2A                        S1    ***
BC67  84    0004                STR   ACRBINH#
            BC68      NODECST1  DC    *
                      PEREX     SRG   GROUPCD
BC68  A9D1  00D1
BC6A  2CA3  BCA3                B     PERE
. . .
                      PRECSMAL  SRGM  GROUPPR
BCB8  A990  0090      PRECSMAL  GI    $MASKON+
                                      GROUPPR
BCBA  25                        CLA   ***
BCBB  83    0003                STR   TRAY#
BCBC  E6    0006                LR    PRINTINT
                                SRGU  GROUPEX2
BCBD  A912  0012                GI    $MASKOFF+
                                      GROUPEX2
BCBF  D4    0004                AR    ACRBINH#
BCC0  B4    0004                STR   ACRBINH#
BCC1  A628  0228                LBL   CPYCNTLB
BCC3  AF80  0007                TS    ACRBINHF
BCC5  6B    BCCB                JNE   NODECST2
BCC6  A128  0228                STBL  CPYCNTLB
BCC8  E4    0004                LR    ACRBINH#
BCC9  2A                        SI    ***
BCCA  84    0004                STR   ACRBINH#
            BCCB      NODECST2  DC    *
BCCB  25                        CLA   ***
BCCC  83    0003                STR   SKIP1ST#
BCCD  85    0005                STR   REMAKE#
BCCE  89    0009                STR   SKIP2ND#
BCCF  BE    000E                STR   EXIT#
                                SRGM  GROUPPR
```

```
BCD0  A990  0090        GI    $MASKON+
                              GROUPPR
BCD2  B6    0006        STR        PRINTINT
BCD3  A142  0242        STBL       BILCNTLB
                        TRMBL      AJRBYTE,
                                   P(BLNKPGE)
BCD5  A652  0052        LB    $REK912
BCD7  B0    0000        TR    BLNKPGE
BCD8  A152  0052        STB   $REK912
. . .
BDE5  E8    0008        LR         FLONTLR
BDE6  B7    0007        TR         ACRBINHF
BDE7  88    0008        STR        FLONTLR
BDE8  4E    BDEE        JE         NEXTTIME
BDE9  A9D2  00D2
BDEB  F4    0004        LRB        ACFBINH#
                        SRG        GROUPCD .
BDEC  A9D1  00D1
```

While various modifications and suggestions might be proposed by those skilled in the art, it will be understood that we wish to include within the patent warranted hereon all such modifications and suggestions and changes as reasonably come within our contribution to the art.

We claim as our invention:

1. A control system for determining the relative location of an indicia on a web, detected by a means for sensing, with respect to a set-point as the web moves in a selected direction across a rotating cylinder in a printing or cut-off unit, the control system comprising:

means for selecting an inspection window length, for each revolution of the cylinder, said selected inspection window length corresponds to a selected amount of rotation of the cylinder;

means for enabling the means for sensing starting at a previously selected cylinder position and for said selected amount of cylinder rotation corresponding to said length of said inspection window;

means for determining the location of an indicia on the web sensed while the means for sensing was enabled;

means for storing said determined location of the sensed indicia;

means for establishing a selected cylinder position, to be used during the next revolution of the cylinder;

said selected cylinder position corresponds to said determined location of the sensed web indicia reduced by a selected amount of cylinder rotation;

means for comparing the set-point to said determined location of the sensed indicia.

2. The control system according to claim 1 including further:

a parallel, bidirectional, means for transmission of data connected between said means for determining the location of the indicia on the web and said means for storing.

3. The control system according to claim 2 including further:

means for selecting a new set-point corresponding to a selected point located anywhere on the circumference of the cylinder.

4. The control system according to claim 3 including further:

means for communication, connected to said means for transmission of data, to receive selected data from or to transmit selected data to a means for supervision.

5. The control system according to claim 3 including further:

means for forming an error value, with a sign, proportional to the difference between the set-point and said determined location of the sensed indicia;

means for sensing said error value and for driving a means for compensation connected to the printing or cut-off unit, so as to minimize said error value.

6. The control system according to claim 5 wherein said means for forming an error value includes:

means for forming a running average error, with a sign, based on the latest error value and a selected number of error values formed during each of a corresponding number of prior revolutions of the cylinder.

7. The control system according to claim 6 wherein said means for forming a running average includes further:

means to compare the magnitude of the running average error to the magnitude of the most recent error value and to select the smaller magnitude as a base error value and to associate the sign of the most recent error value with the base error value.

8. The control system according to claim 6 wherein said means for forming an error value includes further:

means for adjusting said running average error value to compensate for the rotary speed of the cylinder and for a preselected system gain.

9. The control system according to claim 4 including further:

means to store selected control system parameters during a time interval when power has been removed from said control system to permit said control system to be restarted with said selected parameters once power has been restored.

10. A control system for determining the relative location of members of a plurality of marks previously placed on a moving web, with respect to a set point, the marks are sensed by a web sensor as the web moves in a selected direction across a rotating cylinder, the control system comprising:

means to establish a length of an inspection window, corresponding to a selected amount of cylinder rotation, for each revolution of the cylinder;

means to enable the web sensor, starting when a reference mark on the cylinder is at a previously selected point during the present rotation of the cylinder, and for an amount of rotation corresponding to said length of said inspection window;

means for determining the location of a sensed mark from said plurality of marks on the web sensed during the time interval when the web sensor is enabled;

means for determining a selected point to be used to enable the web sensor during the next revolution of the cylinder;

means for comparing the set-point to said determined location of the sensed mark.

11. The control system according to claim 10, including:

manually operable means to establish a new set-point and wherein said means to establish the length of an inspection window includes means to dynamically enlarge the length of the inspection window to a selected maximum value while a new set-point is being established.

12. The control system according to claim 11, wherein:

said means to establish the length of an inspection window includes means to dynamically shorten the length of the inspection window from said selected maximum value to a preselected, smaller, value, once a new set-point has been established.

13. The control system according to claim 10, including:

means for receiving selected operating parameters from a selected supervisory apparatus and means for sending selected operating parameters to the supervisory apparatus.

14. The control system according to claim 13, including a manually setable means for establishing an initial set of control system operating parameters.

15. The control system according to claim 13, including:

means to form an error value based on a difference between the set-point and the determined location of the sensed mark and, drive means, connected to a compensator element which is adapted to vary the relative location of the sensed mark with respect to the set-point, said drive means is responsive to said error value to adjust the compensator element so as to minimize said error value.

16. The control system according to claim 10, wherein the set-point corresponds to a difference between two selected set-point marks and wherein members of two pluralities of marks on the web are to be sensed, the control system comprising further:

means for determining the location of a second sensed mark, from said second plurality of marks, sensed during the time interval when the web sensor is enabled;

means for forming a difference between said two determined locations and for comparing that difference to the difference between the two selected set-point marks.

17. The control system according to claim 16 including further:

means to form an error value based on a difference between said two determined locations and the difference between the two selected-set-point marks;

drive means, connected to compensator means adapted to vary the difference between said two determined locations, said drive means is responsive to said error value to adjust the compensator means to minimize said error value.

18. A control system for determining the relative location of an indicia on a web, detected by a means for sensing, with respect to a set-point as the web moves in a selected direction across a rotating cylinder in a printing or cut-off unit, the control system comprising:

means for digital processing;

bidirectional, parallel means for data communication connected to said digital processor;

means for storing a plurality of selected command sequences, said means for storing is connected to said means for data communication;

said means for storing said command sequences is adapted such that each of said selected command sequences is accessible by said processor but said command sequences can not be altered by said digital processor;

read-write means for storing data, said read-write means for storing is connected to said means for data communication, said read-write means for storing stores selected data such that each piece of selected data is accessible and alterable by said processor;

manually setable data input means, connected to said means for data communication, and adapted to be manually setable to establish selected operating parameters;

bidirectional external communication means, connected to said bidirectional parallel means for data communication, and adapted to transmit selected data to or receive selected data from an external means for supervision;

means for supplying an error signal to a drive means, said means for supplying is connected to said bidirectional means for data communication;

means for continuously determining the location of the cylinder with respect to a reference, connected to said bidirectional means for data communication;

first means for establishing an amount of cylinder rotation during which the means for sensing is to be enabled, said first means is connected to said bidirectional means for data communication and is dynamically alterable by said digital processor during each revolution of the cylinder;

first means for determining a selected rotary position of the cylinder at which the means for sensing is to be enabled during a given revolution of the cylinder, said first means for determining is connected to said bidirectional means for data communication and is dynamically alterable by said digital processor during each revolution of the cylinder;

said means for digital processing is adapted to cooperate with said read-write means for storing data, said first means for establishing and said first means for determining to:

enable the means for sensing starting from said selected rotary position of the cylinder for a period of time corresponding to the amount of cylinder rotation established by said first means for establishing, to, subsequently determine the location of the indicia on the web detected while the means for sensing is enabled, to subsequently compare the setpoint to the determined location of the indicia on the web and to subsequently determine a selected rotary position of the cylinder, to be used by said first means for determining on the next revolution of the cylinder, as the rotary position at which the sensing means is to be enabled.

19. The control system according to claim 18 for determining the off-set between two indicia on the web detected by the means for sensing and a second means for sensing and for comparing the off-set to the off-set between the set-point and a second set-point, the control system including further:

second means for establishing an amount of cylinder rotation during which the second means for sensing is to be enabled, said second means is connected to said bidirectional means for data communication and is dynamically alterable by said digital processor during each revolution of the cylinder;

second means for determining a second selected rotary position of the cylinder at which the second means for sensing is to be enabled, during a given revolution of the cylinder;

said second means for determining is connected to said bidirectional means for data communication and is dynamically alterable by said digital processor during each revolution of the cylinder;

said means digital processing is further adapted to:

enable the second means for sensing starting from said second selected rotary position of the cylinder for a period of time corresponding to the amount of cylinder rotation established by said second means for establishing, to subsequently determine the location of the second indicia on the web detected while the second means for sensing is enabled, to subsequently compare the offset between the set-point and a second set-point to the offset between the determined locations of the first and second indicia on the web, and to subsequently determine first and second selected rotary positions of the cylinder, to be used by said first and second means for determining on the next revolution on the cylinder, as the rotary position at which the sensing means and the second sensing means are to be enabled.

20. A method to continuously control the location of a plurality of marks on a web, sensed by a web sensor, with respect to a set point as the web moves in a selected direction across a rotating cylinder comprising the steps of:

selecting, for each revolution of the cylinder, an amount of cylinder rotation during which the web will be examined for the presence of a mark;

enabling the web sensor at a previously determined cylinder position for the selected amount of cylinder rotation;

sensing a mark while the web sensor is enabled;

determining the position of the mark sensed while the web sensor is enabled;

comparing the position of the sensed mark to the set-point;

adjusting a compensation means to minimize any difference between the position of the sensed mark and the set-point; and determining a cylinder position, whereat the web sensor is to be enabled on the next revolution of the cylinder, based on the most recently determined location of the sensed mark on the web.

21. The method according to claim 20, wherein the step of adjusting the compensator means includes the steps of:

forming an error value, having a sign and a magnitude, based on the difference between the location of the sensed mark and the set point;

averaging the most recent error value with error values determined during a selected number of previous, consecutive, cylinder rotations;

comparing the magnitude of the most recently formed average error to the magnitude of the most recent error value and selecting the smaller magnitude as a base error value;

associating with the base error the sign of the most recent error value;

comparing the sign of the most recently formed base error to the sign of the base error formed during the preceding revolution of the cylinder and setting the magnitude of the present base error to zero if said two signs are different;

modifying the average error value based on at least a preselected value of system gain;

driving the compensation means, based on the modified average error value, to minimize the difference between the set-point and the position of the sensed mark.

22. The method according to claim 21, wherein the average error value is modified, based on both the sensed speed of the cylinder and the pre-selected value of system gain.

23. A method of mark-to-mark register control to control the difference between corresponding members of two pluralities of marks on a web, sensed by first and second web sensors, as compared to the difference between two set-point marks as the web moves in a selected direction across a rotating cylinder comprising the steps of:

selecting for each revolution of the cylinder, first and second amounts of cylinder rotation during which the web will be examined for the presence of a mark;

enabling the first web sensor at a first, previously determined, cylinder position for the first amount of cylinder rotation;

determining the position of a mark, in the first plurality of marks, sensed while the first sensor is enabled;

enabling the second web sensor at a second, previously determined, cylinder position for the second amount of cylinder rotation;

determining the position of a mark, in the second plurality of marks sensed while the second sensor is enabled;

forming a difference between the positions of the two sensed marks;

comparing the formed difference in the positions of said two sensed marks to the difference in the positions of the two set-point marks;

adjusting a compensation means to minimize any variation between the two compared differences;

determining first and second cylinder positions whereat the first and second web sensors are to be enabled on the next revolution of the cylinder, based on the most recently determined locations of the sensed marks on the web.

24. The control system according to claim 18 wherein said means for supplying an error signal to a drive means comprises:

electronic means to rotate an output shaft of a compensator motor through an angular displacement proportional to the magnitude of said error signal.

25. The control system according to claim 18 wherein said means for supplying an error signal comprises:

electronic servo means to rotate an output shaft of a compensator motor at an angular velocity proportional to the magnitude of said error signal.

26. The control system according to claim 25, wherein said electronic servo means includes feedback means to supply a signal to said means for digital processing indicating actual rotation of the output shaft of the compensator motor.

27. A multi-computer press control system for use with a plurality of serially arranged press units adapted to apply indicia of various colors to a moving web including:

a plurality of digital processing units;

each member of said plurality is associated with a press unit and includes at least, digital means for processing;

digital storage means;

means for sensing a set of manually input control system parameters;

means for sensing, in real-time, signals from the associated press unit;

bidirectional, digital, parallel bus means for communication connected to, said digital means for processing, said digital storage means, said means for sensing a set of manually input control system parameters, and said means for sensing in real-time;

means for transmission of selected data, under the control of said digital means for processing, connected to said parallel bus means, each of said means for transmission includes a manually setable address selection means adapted to be manually set to specify a selected address for said control unit;

means for linking, adapted to be connected to said means for transmission of each of said press control units;

means for supervision, connected to said means for linking, and adapted to transmit an address, along said means for linking, to be sensed by a press control unit with a corresponding, preset address, said means for supervision includes means to transmit a command to said addressed press control unit requesting said addressed press control unit to send selected data to said supervisory means or to receive selected data from said supervisory means.

28. The press control system according to claim 27 wherein:

at least some of said digital processing units include means for driving a compensator motor connected to the associated press unit to minimize registration errors in the associated press unit.

29. The press control system according to claim 27 wherein said adddress selection means includes manually setable means to inhibit recognition of said previously selected address.

30. The press control system according to claim 27 wherein an addressed digital processing unit includes means to sense a command, sent by said means for supervision, to send selected data to said means for supervision;

collect said requested, selected, data and transmit said data to said means for supervision.

31. The press control system according to claim 27 wherein an addressed digital processing unit includes means:

to sense a command, sent by said means for supervision, to receive selected data from said means for supervision, to receive said selected data from said means for supervision and to replace previous parameter values of said addressed digital processing unit with said received data from said means for supervision.

32. The press control system according to claim 30 wherein:

a selected one of said digital processing units is a quality control monitoring unit and includes:

means to sense the registration of indicia of various colors previously applied to the web, means to store data indicative of said sensed registration connected to said means to sense the registration, and upon sensing a command sent by said supervisory means, to send selected data, to send said stored data indicative of said sensed registration to said means for supervision.

33. The press control system according to claim 32, wherein said means for supervision includes means for visually displaying said data indicative of said sensed registration.

34. The press control system according to claim 31, wherein said means for supervision includes manually setable means to enter said selected data to be sent from said means for supervision to said addressed digital processing unit.

* * * * *